US012748568B2

(12) United States Patent
Gruber et al.

(10) Patent No.: US 12,748,568 B2
(45) Date of Patent: Sep. 29, 2026

(54) MULTI-MODAL INTERFACES

(71) Applicant: Apple Inc., Cupertino, CA (US)

(72) Inventors: Thomas R. Gruber, Santa Cruz, CA (US); Mohammed A. Tayyeb, Seattle, WA (US); Ron C. Santos, San Jose, CA (US); Madhusudan Chinthakunta, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 18/653,896

(22) Filed: May 2, 2024

(65) Prior Publication Data

US 2024/0281206 A1 Aug. 22, 2024

Related U.S. Application Data

(63) Continuation of application No. 17/555,030, filed on Dec. 17, 2021, now Pat. No. 12,014,118, which is a (Continued)

(51) Int. Cl.
*G06F 3/16* (2006.01)
*G06F 3/04817* (2022.01)
(Continued)

(52) U.S. Cl.
CPC .......... *G06F 3/167* (2013.01); *G06F 3/04817* (2013.01); *G06F 3/0482* (2013.01);
(Continued)

(58) Field of Classification Search
CPC .... G06F 3/167; G06F 3/04817; G06F 3/0482; G06F 3/0488; G06F 2203/0381; G10L 15/26; G10L 15/22
See application file for complete search history.

(56) References Cited

U.S. PATENT DOCUMENTS 6,603,397 B2 8/2003 Bronson
6,721,409 B1 4/2004 Dell et al.
(Continued)

FOREIGN PATENT DOCUMENTS

AU 2014100581 B4 9/2014
AU 2015203483 A1 7/2015
(Continued)

OTHER PUBLICATIONS

Decision to Grant received for European Patent Application No. 18726271.2, mailed on Apr. 3, 2025, 3 pages.
(Continued)

*Primary Examiner* — Cao H Nguyen
(74) *Attorney, Agent, or Firm* — YHE Law LLP

(57) ABSTRACT

Systems and processes for operating an intelligent automated assistant to perform intelligent list reading are provided. In accordance with one example, a method includes, at an electronic device having one or more processors, receiving a first user input of a first input type, the first user input including a plurality of words; displaying, on the touch-sensitive display, the plurality of words; receiving a second user input of a second input type indicating a selection of a word of the plurality of words, the second input type different than the first input type; receiving a third user input; modifying the selected word based on the third user input to provide a modified one or more words; and displaying, on the touch-sensitive display, the modified one or more words.

24 Claims, 21 Drawing Sheets

Related U.S. Application Data continuation of application No. 15/917,410, filed on Mar. 9, 2018, now Pat. No. 11,231,903.

(60) Provisional application No. 62/506,571, filed on May 15, 2017.

(51) Int. Cl.
*G06F 3/0482* (2013.01)
*G06F 3/0488* (2022.01)
*G10L 15/26* (2006.01)

(52) U.S. Cl.
CPC .... *G06F 3/0488* (2013.01); *G06F 2203/0381* (2013.01); *G10L 15/26* (2013.01)

(56) References Cited

U.S. PATENT DOCUMENTS

| | | | |
|---|---|---|---|
| 7,007,298 | B1 | 2/2006 | Shinzaki et al. |
| 7,117,152 | B1 | 10/2006 | Mukherji et al. |
| 7,492,913 | B2 | 2/2009 | Connor et al. |
| 8,055,296 | B1 | 11/2011 | Persson et al. |
| 8,170,966 | B1 | 5/2012 | Musat et al. |
| 8,280,438 | B2 | 10/2012 | Barbera |
| 8,290,772 | B1 | 10/2012 | Cohen et al. |
| 8,473,485 | B2 | 6/2013 | Wong et al. |
| 8,626,681 | B1 | 1/2014 | Jurca et al. |
| 8,630,841 | B2 | 1/2014 | Van Caldwell et al. |
| 8,635,073 | B2 | 1/2014 | Chang |
| 8,638,363 | B2 | 1/2014 | King et al. |
| 8,639,516 | B2 | 1/2014 | Lindahl et al. |
| 8,645,128 | B1 | 2/2014 | Agiomyrgiannakis |
| 8,645,137 | B2 | 2/2014 | Bellegarda et al. |
| 8,645,138 | B1 | 2/2014 | Weinstein et al. |
| 8,654,936 | B1 | 2/2014 | Eslambolchi et al. |
| 8,655,646 | B2 | 2/2014 | Lee et al. |
| 8,655,901 | B1 | 2/2014 | Li et al. |
| 8,660,843 | B2 | 2/2014 | Falcon et al. |
| 8,660,849 | B2 | 2/2014 | Gruber et al. |
| 8,660,924 | B2 | 2/2014 | Hoch et al. |
| 8,660,970 | B1 | 2/2014 | Fiedorowicz |
| 8,661,112 | B2 | 2/2014 | Creamer et al. |
| 8,661,340 | B2 | 2/2014 | Goldsmith et al. |
| 8,670,979 | B2 | 3/2014 | Gruber et al. |
| 8,675,084 | B2 | 3/2014 | Bolton et al. |
| 8,676,273 | B1 | 3/2014 | Fujisaki |
| 8,676,583 | B2 | 3/2014 | Gupta et al. |
| 8,676,904 | B2 | 3/2014 | Lindahl |
| 8,677,377 | B2 | 3/2014 | Cheyer et al. |
| 8,681,950 | B2 | 3/2014 | Vlack et al. |
| 8,682,667 | B2 | 3/2014 | Haughay |
| 8,687,777 | B1 | 4/2014 | Lavian et al. |
| 8,688,446 | B2 | 4/2014 | Yanagihara |
| 8,688,453 | B1 | 4/2014 | Joshi et al. |
| 8,689,135 | B2 | 4/2014 | Portele et al. |
| 8,694,322 | B2 | 4/2014 | Snitkovskiy et al. |
| 8,695,074 | B2 | 4/2014 | Saraf et al. |
| 8,696,364 | B2 | 4/2014 | Cohen |
| 8,706,472 | B2 | 4/2014 | Ramerth et al. |
| 8,706,474 | B2 | 4/2014 | Blume et al. |
| 8,706,503 | B2 | 4/2014 | Cheyer et al. |
| 8,707,195 | B2 | 4/2014 | Fleizach et al. |
| 8,707,419 | B2 | 4/2014 | Kurapati et al. |
| 8,712,778 | B1 | 4/2014 | Thenthiruperai |
| 8,713,119 | B2 | 4/2014 | Lindahl et al. |
| 8,713,418 | B2 | 4/2014 | King et al. |
| 8,719,006 | B2 | 5/2014 | Bellegarda |
| 8,719,014 | B2 | 5/2014 | Wagner |
| 8,719,039 | B1 | 5/2014 | Sharifi |
| 8,731,610 | B2 | 5/2014 | Appaji |
| 8,731,912 | B1 | 5/2014 | Tickner et al. |
| 8,731,942 | B2 | 5/2014 | Cheyer et al. |
| 8,739,208 | B2 | 5/2014 | Davis et al. |
| 8,744,852 | B1 | 6/2014 | Seymour et al. |
| 8,751,971 | B2 | 6/2014 | Fleizach et al. |
| 8,760,537 | B2 | 6/2014 | Johnson et al. |
| 8,762,145 | B2 | 6/2014 | Ouchi et al. |
| 8,762,156 | B2 | 6/2014 | Chen |
| 8,762,469 | B2 | 6/2014 | Lindahl |
| 8,768,693 | B2 | 7/2014 | Somekh et al. |
| 8,768,702 | B2 | 7/2014 | Mason et al. |
| 8,775,154 | B2 | 7/2014 | Clinchant et al. |
| 8,775,177 | B1 | 7/2014 | Heigold et al. |
| 8,775,341 | B1 | 7/2014 | Commons |
| 8,775,931 | B2 | 7/2014 | Fux et al. |
| 8,781,456 | B2 | 7/2014 | Prociw |
| 8,781,841 | B1 | 7/2014 | Wang |
| 8,788,271 | B2 | 7/2014 | James et al. |
| 8,793,301 | B2 | 7/2014 | Wegenkittl et al. |
| 8,798,255 | B2 | 8/2014 | Lubowich et al. |
| 8,798,995 | B1 | 8/2014 | Edara |
| 8,799,000 | B2 | 8/2014 | Guzzoni et al. |
| 8,805,684 | B1 | 8/2014 | Aleksic et al. |
| 8,805,690 | B1 | 8/2014 | Lebeau et al. |
| 8,812,299 | B1 | 8/2014 | Su |
| 8,812,302 | B2 | 8/2014 | Xiao et al. |
| 8,812,321 | B2 | 8/2014 | Gilbert et al. |
| 8,823,507 | B1 | 9/2014 | Touloumtzis |
| 8,823,793 | B2 | 9/2014 | Clayton et al. |
| 8,825,474 | B1 | 9/2014 | Zhai et al. |
| 8,831,947 | B2 | 9/2014 | Wasserblat et al. |
| 8,831,949 | B1 | 9/2014 | Smith et al. |
| 8,838,457 | B2 | 9/2014 | Cerra et al. |
| 8,843,369 | B1 | 9/2014 | Sharifi |
| 8,855,915 | B2 | 10/2014 | Furuhata et al. |
| 8,861,925 | B1 | 10/2014 | Ohme |
| 8,862,252 | B2 | 10/2014 | Rottler et al. |
| 8,868,111 | B1 | 10/2014 | Kahn et al. |
| 8,868,400 | B2 | 10/2014 | Susarla et al. |
| 8,868,409 | B1 | 10/2014 | Mengibar et al. |
| 8,868,431 | B2 | 10/2014 | Yamazaki et al. |
| 8,868,469 | B2 | 10/2014 | Xu et al. |
| 8,868,529 | B2 | 10/2014 | Lerenc |
| 8,880,405 | B2 | 11/2014 | Cerra et al. |
| 8,886,534 | B2 | 11/2014 | Nakano et al. |
| 8,886,540 | B2 | 11/2014 | Cerra et al. |
| 8,886,541 | B2 | 11/2014 | Friedlander |
| 8,892,446 | B2 | 11/2014 | Cheyer et al. |
| 8,893,023 | B2 | 11/2014 | Perry et al. |
| 8,897,822 | B2 | 11/2014 | Martin |
| 8,898,064 | B1 | 11/2014 | Thomas et al. |
| 8,898,568 | B2 | 11/2014 | Bull et al. |
| 8,903,716 | B2 | 12/2014 | Chen et al. |
| 8,909,693 | B2 | 12/2014 | Frissora et al. |
| 8,918,321 | B2 | 12/2014 | Czahor |
| 8,922,485 | B1 | 12/2014 | Lloyd |
| 8,930,176 | B2 | 1/2015 | Li et al. |
| 8,930,191 | B2 | 1/2015 | Gruber et al. |
| 8,938,394 | B1 | 1/2015 | Faaborg et al. |
| 8,938,450 | B2 | 1/2015 | Spivack et al. |
| 8,938,688 | B2 | 1/2015 | Bradford et al. |
| 8,942,986 | B2 | 1/2015 | Cheyer et al. |
| 8,943,423 | B2 | 1/2015 | Merrill et al. |
| 8,954,440 | B1 | 2/2015 | Gattani et al. |
| 8,964,947 | B1 | 2/2015 | Noolu et al. |
| 8,965,770 | B2 | 2/2015 | Petrushin |
| 8,972,240 | B2 | 3/2015 | Brockett et al. |
| 8,972,432 | B2 | 3/2015 | Shaw et al. |
| 8,972,878 | B2 | 3/2015 | Mohler et al. |
| 8,976,063 | B1 | 3/2015 | Hawkins et al. |
| 8,976,108 | B2 | 3/2015 | Hawkins et al. |
| 8,977,255 | B2 | 3/2015 | Freeman et al. |
| 8,983,383 | B1 | 3/2015 | Haskin |
| 8,984,098 | B1 | 3/2015 | Tomkins et al. |
| 8,989,713 | B2 | 3/2015 | Doulton |
| 8,990,235 | B2 | 3/2015 | King et al. |
| 8,994,660 | B2 | 3/2015 | Neels et al. |
| 8,995,972 | B1 | 3/2015 | Cronin |
| 8,996,350 | B1 | 3/2015 | Dub et al. |
| 8,996,376 | B2 | 3/2015 | Fleizach et al. |
| 8,996,381 | B2 | 3/2015 | Mozer et al. |
| 8,996,550 | B2 | 3/2015 | Ko et al. |
| 8,996,639 | B1 | 3/2015 | Faaborg et al. |
| 9,002,714 | B2 | 4/2015 | Kim et al. |

(56) References Cited

U.S. PATENT DOCUMENTS

| | | | |
|---|---|---|---|
| 9,009,046 | B1 | 4/2015 | Stewart |
| 9,013,992 | B2 | 4/2015 | Perkins |
| 9,015,036 | B2 | 4/2015 | Karov Zangvil et al. |
| 9,020,804 | B2 | 4/2015 | Barbaiani et al. |
| 9,026,425 | B2 | 5/2015 | Nikoulina et al. |
| 9,026,426 | B2 | 5/2015 | Wu et al. |
| 9,031,834 | B2 | 5/2015 | Coorman et al. |
| 9,031,970 | B1 | 5/2015 | Das et al. |
| 9,037,967 | B1 | 5/2015 | Al-Jefri et al. |
| 9,043,208 | B2 | 5/2015 | Koch et al. |
| 9,043,210 | B1 | 5/2015 | Adcock et al. |
| 9,043,211 | B2 | 5/2015 | Haiut et al. |
| 9,043,319 | B1 | 5/2015 | Burns et al. |
| 9,046,932 | B2 | 6/2015 | Medlock et al. |
| 9,049,255 | B2 | 6/2015 | Macfarlane et al. |
| 9,049,295 | B1 | 6/2015 | Cooper et al. |
| 9,053,706 | B2 | 6/2015 | Jitkoff et al. |
| 9,058,105 | B2 | 6/2015 | Drory et al. |
| 9,058,332 | B1 | 6/2015 | Darby et al. |
| 9,058,811 | B2 | 6/2015 | Wang et al. |
| 9,063,979 | B2 | 6/2015 | Chiu et al. |
| 9,064,495 | B1 | 6/2015 | Torok et al. |
| 9,065,660 | B2 | 6/2015 | Ellis et al. |
| 9,070,247 | B2 | 6/2015 | Kuhn et al. |
| 9,070,366 | B1 | 6/2015 | Mathias et al. |
| 9,071,701 | B2 | 6/2015 | Donaldson et al. |
| 9,075,435 | B1 | 7/2015 | Noble et al. |
| 9,075,824 | B2 | 7/2015 | Gordo et al. |
| 9,076,448 | B2 | 7/2015 | Bennett et al. |
| 9,076,450 | B1 | 7/2015 | Sadek et al. |
| 9,081,411 | B2 | 7/2015 | Kalns et al. |
| 9,081,482 | B1 | 7/2015 | Zhai et al. |
| 9,082,402 | B2 | 7/2015 | Yadgar et al. |
| 9,083,581 | B1 | 7/2015 | Addepalli et al. |
| 9,087,508 | B1 | 7/2015 | Dzik |
| 9,092,433 | B2 | 7/2015 | Rodriguez |
| 9,092,789 | B2 | 7/2015 | Anshul |
| 9,094,576 | B1 | 7/2015 | Karakotsios |
| 9,094,636 | B1 | 7/2015 | Sanders et al. |
| 9,098,467 | B1 | 8/2015 | Blanksteen et al. |
| 9,101,279 | B2 | 8/2015 | Ritchey et al. |
| 9,110,635 | B2 | 8/2015 | Knox et al. |
| 9,112,984 | B2 | 8/2015 | Sejnoha et al. |
| 9,117,212 | B2 | 8/2015 | Sheets et al. |
| 9,117,447 | B2 | 8/2015 | Gruber et al. |
| 9,122,697 | B1 | 9/2015 | Bono et al. |
| 9,123,338 | B1 | 9/2015 | Sanders et al. |
| 9,143,907 | B1 | 9/2015 | Caldwell et al. |
| 9,159,319 | B1 | 10/2015 | Hoffmeister |
| 9,164,983 | B2 | 10/2015 | Liu et al. |
| 9,171,541 | B2 | 10/2015 | Kennewick et al. |
| 9,171,546 | B1 | 10/2015 | Pike |
| 9,172,747 | B2 | 10/2015 | Walters et al. |
| 9,183,845 | B1 | 11/2015 | Gopalakrishnan et al. |
| 9,190,062 | B2 | 11/2015 | Haughay |
| 9,196,245 | B2 | 11/2015 | Larcheveque et al. |
| 9,197,848 | B2 | 11/2015 | Felkai et al. |
| 9,201,955 | B1 | 12/2015 | Quintao et al. |
| 9,202,520 | B1 | 12/2015 | Tang |
| 9,208,153 | B1 | 12/2015 | Zaveri et al. |
| 9,213,754 | B1 | 12/2015 | Zhang et al. |
| 9,214,137 | B2 | 12/2015 | Bala et al. |
| 9,218,122 | B2 | 12/2015 | Thomas et al. |
| 9,218,809 | B2 | 12/2015 | Bellegarda et al. |
| 9,218,819 | B1 | 12/2015 | Stekkelpak et al. |
| 9,223,529 | B1 | 12/2015 | Khafizova |
| 9,223,537 | B2 | 12/2015 | Brown et al. |
| 9,230,561 | B2 | 1/2016 | Ostermann et al. |
| 9,232,293 | B1 | 1/2016 | Hanson |
| 9,236,047 | B2 | 1/2016 | Rasmussen |
| 9,241,073 | B1 | 1/2016 | Rensburg et al. |
| 9,245,151 | B2 | 1/2016 | Lebeau et al. |
| 9,245,388 | B2 | 1/2016 | Poulos et al. |
| 9,246,984 | B2 | 1/2016 | Zises |
| 9,247,377 | B2 | 1/2016 | Pai et al. |
| 9,247,525 | B2 | 1/2016 | Jacobs et al. |
| 9,250,703 | B2 | 2/2016 | Hernandez-Abrego et al. |
| 9,251,713 | B1 | 2/2016 | Giovanniello et al. |
| 9,251,787 | B1 | 2/2016 | Hart et al. |
| 9,255,812 | B2 | 2/2016 | Maeoka et al. |
| 9,256,596 | B2 | 2/2016 | Nissan et al. |
| 9,257,120 | B1 | 2/2016 | Guevara et al. |
| 9,258,604 | B1 | 2/2016 | Bilobrov et al. |
| 9,262,412 | B2 | 2/2016 | Yang et al. |
| 9,262,612 | B2 | 2/2016 | Cheyer |
| 9,263,058 | B2 | 2/2016 | Huang et al. |
| 9,274,598 | B2 | 3/2016 | Beymer et al. |
| 9,280,535 | B2 | 3/2016 | Varma et al. |
| 9,282,211 | B2 | 3/2016 | Osawa |
| 9,286,727 | B2 | 3/2016 | Kim et al. |
| 9,286,910 | B1 | 3/2016 | Li et al. |
| 9,292,487 | B1 | 3/2016 | Weber |
| 9,292,489 | B1 | 3/2016 | Sak et al. |
| 9,292,492 | B2 | 3/2016 | Sarikaya et al. |
| 9,298,358 | B1 | 3/2016 | Wilden et al. |
| 9,299,344 | B2 | 3/2016 | Braho et al. |
| 9,300,718 | B2 | 3/2016 | Khanna |
| 9,301,256 | B2 | 3/2016 | Mohan et al. |
| 9,305,543 | B2 | 4/2016 | Fleizach et al. |
| 9,305,548 | B2 | 4/2016 | Kennewick et al. |
| 9,311,308 | B2 | 4/2016 | Sankarasubramaniam et al. |
| 9,311,912 | B1 | 4/2016 | Swietlinski et al. |
| 9,313,317 | B1 | 4/2016 | Lebeau et al. |
| 9,318,108 | B2 | 4/2016 | Gruber et al. |
| 9,325,809 | B1 | 4/2016 | Barros et al. |
| 9,325,842 | B1 | 4/2016 | Siddiqi et al. |
| 9,330,659 | B2 | 5/2016 | Ju et al. |
| 9,330,668 | B2 | 5/2016 | Nanavati et al. |
| 9,330,720 | B2 | 5/2016 | Lee |
| 9,335,983 | B2 | 5/2016 | Breiner et al. |
| 9,338,057 | B2 | 5/2016 | Jangra et al. |
| 9,338,242 | B1 | 5/2016 | Suchland et al. |
| 9,338,493 | B2 | 5/2016 | Van Os et al. |
| 9,342,829 | B2 | 5/2016 | Zhou et al. |
| 9,342,930 | B1 | 5/2016 | Kraft et al. |
| 9,349,368 | B1 | 5/2016 | Lebeau et al. |
| 9,355,472 | B2 | 5/2016 | Kocienda et al. |
| 9,361,084 | B1 | 6/2016 | Costa |
| 9,361,625 | B2 | 6/2016 | Parker et al. |
| 9,367,541 | B1 | 6/2016 | Servan et al. |
| 9,368,114 | B2 | 6/2016 | Larson et al. |
| 9,377,865 | B2 | 6/2016 | Berenson et al. |
| 9,377,871 | B2 | 6/2016 | Waddell et al. |
| 9,378,456 | B2 | 6/2016 | White et al. |
| 9,378,740 | B1 | 6/2016 | Rosen et al. |
| 9,380,155 | B1 | 6/2016 | Reding et al. |
| 9,383,827 | B1 * | 7/2016 | Faaborg ................. G11B 27/00 |
| 9,384,185 | B2 | 7/2016 | Medlock et al. |
| 9,390,726 | B1 | 7/2016 | Smus et al. |
| 9,396,722 | B2 | 7/2016 | Chung et al. |
| 9,400,779 | B2 | 7/2016 | Convertino et al. |
| 9,401,140 | B1 | 7/2016 | Weber et al. |
| 9,401,147 | B2 | 7/2016 | Jitkoff et al. |
| 9,405,741 | B1 | 8/2016 | Schaaf et al. |
| 9,406,224 | B1 | 8/2016 | Sanders et al. |
| 9,406,299 | B2 | 8/2016 | Gollan et al. |
| 9,408,182 | B1 | 8/2016 | Hurley et al. |
| 9,412,392 | B2 | 8/2016 | Lindahl |
| 9,418,650 | B2 | 8/2016 | Bharadwaj et al. |
| 9,423,266 | B2 | 8/2016 | Clark et al. |
| 9,424,246 | B2 | 8/2016 | Spencer et al. |
| 9,424,840 | B1 | 8/2016 | Hart et al. |
| 9,431,021 | B1 | 8/2016 | Scalise et al. |
| 9,432,499 | B2 | 8/2016 | Hajdu et al. |
| 9,436,918 | B2 | 9/2016 | Pantel et al. |
| 9,437,186 | B1 | 9/2016 | Liu et al. |
| 9,437,189 | B2 | 9/2016 | Epstein et al. |
| 9,442,687 | B2 | 9/2016 | Park et al. |
| 9,443,527 | B1 | 9/2016 | Watanabe et al. |
| 9,445,230 | B1 | 9/2016 | Sipher et al. |
| 9,454,599 | B2 | 9/2016 | Golden et al. |
| 9,454,957 | B1 | 9/2016 | Mathias et al. |
| 9,460,713 | B1 | 10/2016 | Mengibar et al. |
| 9,465,798 | B2 | 10/2016 | Lin |

(56) References Cited

U.S. PATENT DOCUMENTS 9,465,833 B2 10/2016 Aravamudan et al.
9,465,864 B2 10/2016 Hu et al.
9,466,027 B2 10/2016 Byrne et al.
9,466,121 B2 10/2016 Yang et al.
9,466,294 B1 10/2016 Tunstall-Pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,483,529 B1 11/2016 Pasoi et al.
9,484,021 B1 11/2016 Mairesse et al.
9,485,286 B1 11/2016 Sellier et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,516,014 B2 12/2016 Zafiroglu et al.
9,519,453 B2 12/2016 Perkuhn et al.
9,524,355 B2 12/2016 Forbes et al.
9,529,500 B1 12/2016 Gauci et al.
9,531,803 B2 12/2016 Chen et al.
9,531,823 B1 12/2016 Suchland et al.
9,531,862 B1 12/2016 Vadodaria
9,535,906 B2 1/2017 Lee et al.
9,536,518 B2 1/2017 Itoh et al.
9,536,527 B1 1/2017 Carlson
9,536,544 B2 1/2017 Ostermann et al.
9,547,647 B2 1/2017 Badaskar
9,548,050 B2 1/2017 Gruber et al.
9,548,053 B1 1/2017 Basye et al.
9,548,979 B1 1/2017 Johnson et al.
9,569,549 B1 2/2017 Jenkins et al.
9,571,645 B2 2/2017 Quast et al.
9,571,995 B1 2/2017 Scheer et al.
9,574,894 B1 2/2017 Karakotsios et al.
9,575,964 B2 2/2017 Yadgar et al.
9,576,575 B2 2/2017 Heide
9,578,173 B2 2/2017 Sanghavi et al.
9,584,946 B1 2/2017 Lyren et al.
9,586,318 B2 3/2017 Djugash et al.
9,602,946 B2 3/2017 Karkkainen et al.
9,606,986 B2 3/2017 Bellegarda
9,607,612 B2 3/2017 Deleeuw
9,612,999 B2 4/2017 Prakah-Asante et al.
9,619,200 B2 4/2017 Chakladar et al.
9,619,459 B2 4/2017 Hebert et al.
9,620,113 B2 4/2017 Kennewick et al.
9,620,126 B2 4/2017 Chiba
9,626,695 B2 4/2017 Balasubramanian et al.
9,626,799 B2 4/2017 McArdle et al.
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,633,674 B2 4/2017 Sinha
9,646,313 B2 5/2017 Kim et al.
9,648,107 B1 5/2017 Penilla et al.
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Liu et al.
9,665,662 B1 5/2017 Gautam et al.
9,668,121 B2 5/2017 Naik et al.
9,672,725 B2 6/2017 Dotan-Cohen et al.
9,672,822 B2 6/2017 Brown et al.
9,678,664 B2 6/2017 Zhai et al.
9,679,570 B1 6/2017 Edara
9,690,542 B2 6/2017 Reddy et al.
9,691,161 B1 6/2017 Yalniz et al.
9,691,378 B1 6/2017 Meyers et al.
9,691,384 B1 6/2017 Wang et al.
9,696,963 B2 7/2017 Son et al.
9,697,016 B2 7/2017 Jacob
9,697,822 B1 7/2017 Naik et al.
9,697,827 B1 7/2017 Lilly et al.
9,697,828 B1 7/2017 Prasad et al.
9,697,829 B1 7/2017 Tickner et al.
9,698,999 B2 7/2017 Mutagi
9,711,148 B1 7/2017 Sharifi et al.
9,720,907 B2 8/2017 Bangalore et al.
9,721,566 B2 8/2017 Newendorp et al.
9,721,570 B1 8/2017 Beal et al.
9,723,130 B2 8/2017 Rand
9,734,817 B1 8/2017 Putrycz
9,734,839 B1 8/2017 Adams
9,741,343 B1 8/2017 Miles et al.
9,747,083 B1 8/2017 Roman et al.
9,747,093 B2 8/2017 Latino et al.
9,754,591 B1 9/2017 Kumar et al.
9,755,605 B1 9/2017 Li et al.
9,760,566 B2 9/2017 Heck et al.
9,767,710 B2 9/2017 Lee et al.
9,772,994 B2 9/2017 Karov et al.
9,786,271 B1 10/2017 Combs et al.
9,792,907 B2 10/2017 Bocklet et al.
9,798,719 B2 10/2017 Karov et al.
9,812,128 B2 11/2017 Mixter et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,824,379 B2 11/2017 Khandelwal et al.
9,824,691 B1 11/2017 Montero et al.
9,824,692 B1 11/2017 Khoury et al.
9,830,044 B2 11/2017 Brown et al.
9,830,449 B1 11/2017 Wagner
9,842,168 B2 12/2017 Heck et al.
9,842,584 B1 12/2017 Hart et al.
9,846,685 B2 12/2017 Li
9,846,836 B2 12/2017 Gao et al.
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,891,811 B2 2/2018 Federighi et al.
9,892,732 B1 2/2018 Tian et al.
9,911,415 B2 3/2018 Vanblon et al.
9,916,839 B1 3/2018 Scalise et al.
9,922,642 B2 3/2018 Pitschel et al.
9,928,835 B1 3/2018 Tang
9,934,777 B1 4/2018 Joseph et al.
9,934,785 B1 4/2018 Hulaud
9,940,616 B1 4/2018 Morgan et al.
9,946,862 B2 4/2018 Yun et al.
9,948,728 B2 4/2018 Linn et al.
9,953,634 B1 4/2018 Pearce et al.
9,959,129 B2 5/2018 Kannan et al.
9,959,506 B1 5/2018 Karppanen
9,959,867 B2 5/2018 Lindahl
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,972,304 B2 5/2018 Paulik et al.
9,972,318 B1 5/2018 Kelly et al.
9,983,785 B2 5/2018 Wong et al.
9,984,686 B1 5/2018 Mutagi et al.
9,986,419 B2 5/2018 Naik et al.
9,990,129 B2 6/2018 Yang et al.
9,990,176 B1 6/2018 Gray
9,990,921 B2 6/2018 Vanblon et al.
9,990,926 B1 6/2018 Pearce
9,996,626 B1 6/2018 Bailey et al.
9,998,552 B1 6/2018 Ledet
10,001,817 B2 6/2018 Zambetti et al.
10,009,666 B1 6/2018 Van Scheltinga et al.
10,013,416 B1 7/2018 Bhardwaj et al.
10,013,654 B1 7/2018 Levy et al.
10,013,979 B1 7/2018 Roman et al.
10,019,436 B2 7/2018 Huang
10,025,378 B2 7/2018 Venable et al.

(56) References Cited

U.S. PATENT DOCUMENTS

| | | | |
|---|---|---|---|
| 10,026,209 | B1 | 7/2018 | Dagley et al. |
| 10,026,401 | B1 | 7/2018 | Mutagi et al. |
| 10,027,662 | B1 | 7/2018 | Mutagi et al. |
| 10,032,451 | B1 | 7/2018 | Mamkina et al. |
| 10,032,455 | B2 | 7/2018 | Newman et al. |
| 10,037,758 | B2 | 7/2018 | Jing et al. |
| 10,043,516 | B2 | 8/2018 | Saddler et al. |
| 10,048,748 | B2 | 8/2018 | Sridharan et al. |
| 10,049,161 | B2 | 8/2018 | Kaneko |
| 10,049,663 | B2 | 8/2018 | Orr et al. |
| 10,049,668 | B2 | 8/2018 | Huang et al. |
| 10,055,390 | B2 | 8/2018 | Sharifi et al. |
| 10,055,681 | B2 | 8/2018 | Brown et al. |
| 10,068,570 | B2 | 9/2018 | Dai et al. |
| 10,074,360 | B2 | 9/2018 | Kim |
| 10,074,371 | B1 | 9/2018 | Wang et al. |
| 10,078,487 | B2 | 9/2018 | Gruber et al. |
| 10,083,213 | B1 | 9/2018 | Podgorny et al. |
| 10,083,688 | B2 | 9/2018 | Piernot et al. |
| 10,083,690 | B2 | 9/2018 | Giuli et al. |
| 10,088,972 | B2 | 10/2018 | Brown et al. |
| 10,089,072 | B2 | 10/2018 | Piersol et al. |
| 10,089,393 | B2 | 10/2018 | Agarwal et al. |
| 10,089,983 | B1 | 10/2018 | Gella et al. |
| 10,096,319 | B1 | 10/2018 | Jin et al. |
| 10,101,887 | B2 | 10/2018 | Bernstein et al. |
| 10,102,359 | B2 | 10/2018 | Cheyer |
| 10,102,851 | B1 | 10/2018 | Kiss et al. |
| 10,115,055 | B2 | 10/2018 | Weiss et al. |
| 10,127,901 | B2 | 11/2018 | Zhao et al. |
| 10,127,908 | B1 | 11/2018 | Deller et al. |
| 10,127,926 | B2 | 11/2018 | James |
| 10,134,425 | B1 | 11/2018 | Johnson, Jr. |
| 10,135,965 | B2 | 11/2018 | Woolsey et al. |
| 10,140,845 | B1 | 11/2018 | Knas |
| 10,142,222 | B1 | 11/2018 | Zhang |
| 10,146,923 | B2 | 12/2018 | Pitkänen et al. |
| 10,147,421 | B2 | 12/2018 | Liddell et al. |
| 10,147,441 | B1 | 12/2018 | Pogue et al. |
| 10,149,156 | B1 | 12/2018 | Tiku et al. |
| 10,158,728 | B1 | 12/2018 | Vanblon et al. |
| 10,162,512 | B2 | 12/2018 | Seo et al. |
| 10,162,817 | B2 | 12/2018 | Schlesinger et al. |
| 10,169,329 | B2 | 1/2019 | Futrell et al. |
| 10,170,123 | B2 | 1/2019 | Orr et al. |
| 10,170,135 | B1 | 1/2019 | Pearce et al. |
| 10,175,879 | B2 | 1/2019 | Missig et al. |
| 10,176,167 | B2 | 1/2019 | Evermann |
| 10,176,802 | B1 | 1/2019 | Ladhak et al. |
| 10,176,808 | B1 | 1/2019 | Lovitt et al. |
| 10,178,301 | B1 | 1/2019 | Welbourne et al. |
| 10,185,542 | B2 | 1/2019 | Carson et al. |
| 10,186,254 | B2 | 1/2019 | Williams et al. |
| 10,186,266 | B1 | 1/2019 | Devaraj et al. |
| 10,191,627 | B2 | 1/2019 | Cieplinski et al. |
| 10,191,646 | B2 | 1/2019 | Zambetti et al. |
| 10,191,718 | B2 | 1/2019 | Rhee et al. |
| 10,192,546 | B1 | 1/2019 | Piersol et al. |
| 10,192,552 | B2 | 1/2019 | Raitio et al. |
| 10,192,557 | B2 | 1/2019 | Lee et al. |
| 10,193,840 | B1 | 1/2019 | Dar |
| 10,198,877 | B1 | 2/2019 | Maltsev et al. |
| 10,199,051 | B2 | 2/2019 | Binder et al. |
| 10,200,824 | B2 | 2/2019 | Gross et al. |
| 10,204,627 | B2 | 2/2019 | Nitz et al. |
| 10,210,860 | B1 | 2/2019 | Ward et al. |
| 10,216,351 | B2 | 2/2019 | Yang |
| 10,216,832 | B2 | 2/2019 | Bangalore et al. |
| 10,223,066 | B2 | 3/2019 | Martel et al. |
| 10,224,030 | B1 | 3/2019 | Kiss et al. |
| 10,225,711 | B2 | 3/2019 | Parks et al. |
| 10,228,904 | B2 | 3/2019 | Raux |
| 10,229,109 | B1 | 3/2019 | Cherepanov et al. |
| 10,229,356 | B1 | 3/2019 | Liu et al. |
| 10,229,680 | B1 | 3/2019 | Gillespie et al. |
| 10,236,016 | B1 | 3/2019 | Li et al. |
| 10,237,711 | B2 | 3/2019 | Linn et al. |
| 10,241,644 | B2 | 3/2019 | Gruber et al. |
| 10,242,501 | B1 | 3/2019 | Pusch et al. |
| 10,248,308 | B2 | 4/2019 | Karunamuni et al. |
| 10,248,771 | B1 | 4/2019 | Ziraknejad et al. |
| 10,249,300 | B2 | 4/2019 | Booker et al. |
| 10,249,305 | B2 | 4/2019 | Yu |
| 10,255,922 | B1 | 4/2019 | Sharifi et al. |
| 10,257,314 | B2 | 4/2019 | Agrawal et al. |
| 10,261,672 | B1 | 4/2019 | Dolbakian et al. |
| 10,261,830 | B2 | 4/2019 | Gupta et al. |
| 10,269,345 | B2 | 4/2019 | Castillo Sanchez et al. |
| 10,271,093 | B1 | 4/2019 | Jobanputra et al. |
| 10,275,513 | B1 | 4/2019 | Cowan et al. |
| 10,282,737 | B2 | 5/2019 | Clark et al. |
| 10,283,111 | B1 | 5/2019 | Mairesse et al. |
| 10,289,205 | B1 | 5/2019 | Sumter et al. |
| 10,291,066 | B1 | 5/2019 | Leabman et al. |
| 10,296,160 | B2 | 5/2019 | Shah et al. |
| 10,297,253 | B2 | 5/2019 | Walker, II et al. |
| 10,303,715 | B2 | 5/2019 | Graham et al. |
| 10,303,772 | B2 | 5/2019 | Hosn et al. |
| 10,304,463 | B2 | 5/2019 | Mixter et al. |
| 10,311,482 | B2 | 6/2019 | Baldwin |
| 10,311,871 | B2 | 6/2019 | Newendorp et al. |
| 10,317,992 | B2 | 6/2019 | Prokofieva et al. |
| 10,325,598 | B2 | 6/2019 | Basye et al. |
| 10,331,312 | B2 | 6/2019 | Napolitano et al. |
| 10,332,509 | B2 | 6/2019 | Catanzaro et al. |
| 10,332,513 | B1 | 6/2019 | D'souza et al. |
| 10,332,518 | B2 | 6/2019 | Garg et al. |
| 10,339,224 | B2 | 7/2019 | Fukuoka |
| 10,339,714 | B2 | 7/2019 | Corso et al. |
| 10,339,721 | B1 | 7/2019 | Dascola et al. |
| 10,339,925 | B1 | 7/2019 | Rastrow et al. |
| 10,346,540 | B2 | 7/2019 | Karov et al. |
| 10,346,541 | B1 | 7/2019 | Phillips et al. |
| 10,346,753 | B2 | 7/2019 | Soon-Shiong et al. |
| 10,346,878 | B1 | 7/2019 | Ostermann et al. |
| 10,353,975 | B2 | 7/2019 | Oh et al. |
| 10,354,168 | B2 | 7/2019 | Bluche |
| 10,354,677 | B2 | 7/2019 | Mohamed et al. |
| 10,356,243 | B2 | 7/2019 | Sanghavi et al. |
| 10,360,305 | B2 | 7/2019 | Larcheveque et al. |
| 10,360,716 | B1 | 7/2019 | Van Der Meulen et al. |
| 10,365,887 | B1 | 7/2019 | Mulherkar |
| 10,366,160 | B2 | 7/2019 | Castelli et al. |
| 10,366,692 | B1 | 7/2019 | Adams et al. |
| 10,372,814 | B2 | 8/2019 | Gliozzo et al. |
| 10,372,881 | B2 | 8/2019 | Ingrassia et al. |
| 10,373,381 | B2 | 8/2019 | Nuernberger et al. |
| 10,382,799 | B1 | 8/2019 | Walters et al. |
| 10,387,461 | B2 | 8/2019 | Sharifi et al. |
| 10,389,876 | B2 | 8/2019 | Engelke et al. |
| 10,402,066 | B2 | 9/2019 | Kawana |
| 10,403,272 | B1 | 9/2019 | Fanty et al. |
| 10,403,283 | B1 | 9/2019 | Schramm et al. |
| 10,409,454 | B2 | 9/2019 | Kagan et al. |
| 10,410,637 | B2 | 9/2019 | Paulik et al. |
| 10,416,760 | B2 | 9/2019 | Burns et al. |
| 10,417,037 | B2 | 9/2019 | Gruber et al. |
| 10,417,344 | B2 | 9/2019 | Futrell et al. |
| 10,417,554 | B2 | 9/2019 | Scheffler |
| 10,418,032 | B1 | 9/2019 | Mohajer et al. |
| 10,431,210 | B1 | 10/2019 | Huang et al. |
| 10,437,928 | B2 | 10/2019 | Bhaya et al. |
| 10,446,142 | B2 | 10/2019 | Lim et al. |
| 10,453,117 | B1 | 10/2019 | Reavely et al. |
| 10,460,227 | B2 | 10/2019 | Sanghavi et al. |
| 10,469,665 | B1 | 11/2019 | Bell et al. |
| 10,474,961 | B2 | 11/2019 | Brigham et al. |
| 10,475,446 | B2 | 11/2019 | Gruber et al. |
| 10,482,875 | B2 | 11/2019 | Henry |
| 10,482,904 | B1 | 11/2019 | Hardie et al. |
| 10,490,195 | B1 | 11/2019 | Krishnamoorthy et al. |
| 10,496,364 | B2 | 12/2019 | Yao |
| 10,496,705 | B1 | 12/2019 | Irani et al. |
| 10,497,250 | B1 | 12/2019 | Hayward et al. |

(56) References Cited

U.S. PATENT DOCUMENTS 10,497,365 B2 12/2019 Gruber et al.
10,497,366 B2 12/2019 Sapugay et al.
10,499,146 B2 12/2019 Lang et al.
10,504,513 B1 12/2019 Gray et al.
10,504,518 B1 12/2019 Irani et al.
10,512,750 B1 12/2019 Lewin Jessen et al.
10,515,133 B1 12/2019 Sharifi
10,515,623 B1 12/2019 Grizzel
10,521,946 B1 12/2019 Roche et al.
10,528,386 B2 1/2020 Yu
10,540,976 B2 1/2020 Van Os et al.
10,558,893 B2 2/2020 Bluche
10,559,225 B1 2/2020 Tao et al.
10,559,299 B1 2/2020 Arel et al.
10,566,007 B2 2/2020 Fawaz et al.
10,568,032 B2 2/2020 Freeman et al.
10,572,885 B1 2/2020 Guo et al.
10,579,401 B2 3/2020 Dawes
10,580,409 B2 3/2020 Walker et al.
10,582,355 B1 3/2020 Lebeau et al.
10,585,957 B2 3/2020 Heck et al.
10,586,369 B1 3/2020 Roche et al.
10,599,449 B1 3/2020 Chatzipanagiotis et al.
10,599,758 B1 3/2020 Yu et al.
10,628,483 B1 4/2020 Rao et al.
10,629,186 B1 4/2020 Slifka
10,630,795 B2 4/2020 Aoki et al.
10,642,934 B2 5/2020 Heck et al.
10,643,611 B2 5/2020 Lindahl
10,649,652 B2 5/2020 Sun
10,652,392 B1 5/2020 Eades
10,652,394 B2 5/2020 Van Os et al.
10,659,851 B2 5/2020 Lister et al.
10,671,428 B2 6/2020 Zeitlin
10,679,007 B2 6/2020 Jia et al.
10,679,608 B2 6/2020 Mixter et al.
10,684,099 B2 6/2020 Zaetterqvist
10,684,703 B2 6/2020 Hindi et al.
10,685,187 B2 6/2020 Badr et al.
10,691,473 B2 6/2020 Karashchuk et al.
10,699,697 B2 6/2020 Qian et al.
10,706,841 B2 7/2020 Gruber et al.
10,706,848 B1 7/2020 Greene et al.
10,721,190 B2 7/2020 Zhao et al.
10,732,708 B1 8/2020 Roche et al.
10,743,107 B1 8/2020 Yoshioka et al.
10,747,498 B2 8/2020 Stasior et al.
10,748,529 B1 8/2020 Milden
10,748,546 B2 8/2020 Kim et al.
10,754,658 B2 8/2020 Tamiya
10,755,032 B2 8/2020 Douglas et al.
10,757,499 B1 8/2020 Vautrin et al.
10,757,552 B2 8/2020 Gross et al.
10,769,385 B2 9/2020 Evermann
10,776,933 B2 9/2020 Faulkner
10,778,839 B1 9/2020 Newstadt et al.
10,783,151 B1 9/2020 Bushkin et al.
10,783,166 B2 9/2020 Hurley et al.
10,783,883 B2 9/2020 Mixter et al.
10,789,945 B2 9/2020 Acero et al.
10,791,176 B2 9/2020 Phipps et al.
10,791,215 B2 9/2020 Ly et al.
10,795,944 B2 10/2020 Brown et al.
10,796,100 B2 10/2020 Bangalore et al.
10,803,255 B2 10/2020 Dubyak et al.
10,811,013 B1 10/2020 Secker-Walker et al.
10,818,288 B2 10/2020 Garcia et al.
10,831,494 B2 11/2020 Grocutt et al.
10,832,031 B2 11/2020 Kienzle et al.
10,832,684 B2 11/2020 Sarikaya
10,842,968 B1 11/2020 Kahn et al.
10,846,618 B2 11/2020 Ravi et al.
10,847,142 B2 11/2020 Newendorp et al.
10,860,629 B1 12/2020 Gangadharaiah et al.
10,861,483 B2 12/2020 Feinauer et al.
10,877,637 B1 12/2020 Antos et al.
10,878,047 B1 12/2020 Mutagi et al.
10,880,668 B1 12/2020 Robinson et al.
10,885,277 B2 1/2021 Ravi et al.
10,891,968 B2 1/2021 Chung et al.
10,892,996 B2 1/2021 Piersol
10,904,488 B1 1/2021 Weisz et al.
10,909,171 B2 2/2021 Graham et al.
10,909,459 B2 2/2021 Tsatsin et al.
10,931,999 B1 2/2021 Jobanputra et al.
10,937,263 B1 3/2021 Tout et al.
10,937,410 B1 3/2021 Rule
10,942,702 B2 3/2021 Piersol et al.
10,942,703 B2 3/2021 Martel et al.
10,944,859 B2 3/2021 Weinstein et al.
10,957,310 B1 3/2021 Mohajer et al.
10,957,311 B2 3/2021 Solomon et al.
10,957,337 B2 3/2021 Chen et al.
10,970,660 B1 4/2021 Harris et al.
10,974,139 B2 4/2021 Feder et al.
10,978,056 B1 4/2021 Challa et al.
10,978,090 B2 4/2021 Binder et al.
10,983,971 B2 4/2021 Carvalho et al.
11,009,970 B2 5/2021 Hindi et al.
11,010,127 B2 5/2021 Orr et al.
11,010,763 B1 5/2021 Fillinger
11,012,942 B2 5/2021 Freeman et al.
11,017,766 B2 5/2021 Chao et al.
11,037,565 B2 6/2021 Kudurshian et al.
11,038,934 B1 6/2021 Hansen et al.
11,043,086 B1 6/2021 Daoura et al.
11,043,220 B1 6/2021 Hansen et al.
11,048,473 B2 6/2021 Carson et al.
11,061,543 B1 7/2021 Blatz et al.
11,062,696 B2 7/2021 Tadpatrikar et al.
11,072,344 B2 7/2021 Provost et al.
11,076,039 B2 7/2021 Weinstein et al.
11,080,336 B2 8/2021 Van Dusen
11,086,858 B1 8/2021 Koukoumidis et al.
11,087,759 B2 8/2021 Lemay et al.
11,094,311 B2 8/2021 Candelore et al.
11,112,875 B1 9/2021 Zhou et al.
11,113,598 B2 9/2021 Socher et al.
11,126,331 B2 9/2021 Lo et al.
11,126,400 B2 9/2021 Stasior et al.
11,132,172 B1 9/2021 Naik et al.
11,133,008 B2 9/2021 Piernot et al.
11,151,899 B2 10/2021 Pitschel et al.
11,152,002 B2 10/2021 Walker et al.
11,169,660 B2 11/2021 Gupta et al.
11,181,988 B1 11/2021 Bellegarda et al.
11,183,193 B1 11/2021 Hansen et al.
11,183,205 B1 11/2021 Ebenezer et al.
11,200,027 B2 12/2021 Aggarwal et al.
11,204,787 B2 12/2021 Radebaugh et al.
11,205,192 B1 12/2021 Rivera et al.
11,210,062 B1 12/2021 Heikinheimo et al.
11,210,477 B2 12/2021 Srinivasan et al.
11,211,048 B2 12/2021 Kim et al.
11,211,058 B1 12/2021 Eakin et al.
11,217,255 B2 1/2022 Kim et al.
11,223,699 B1 1/2022 Niewczas
11,235,248 B1 2/2022 Orrino et al.
11,269,426 B2 3/2022 Jorasch et al.
11,269,678 B2 3/2022 Gruber et al.
11,283,631 B2 3/2022 Yan et al.
11,289,082 B1 3/2022 Lacy et al.
11,301,766 B2 4/2022 Muramoto et al.
11,302,310 B1 4/2022 Gandhe et al.
11,347,754 B1 5/2022 Ho et al.
11,348,582 B2 5/2022 Lindahl
11,361,863 B2 6/2022 Gass et al.
11,373,645 B1 6/2022 Mathew et al.
11,380,310 B2 7/2022 Acero et al.
11,380,323 B2 7/2022 Shin et al.
11,388,291 B2 7/2022 Van Os et al.
11,418,461 B1 8/2022 Elfardy et al.
11,423,866 B2 8/2022 Park et al.
11,449,802 B2 9/2022 Maalouf et al.

(56) References Cited

U.S. PATENT DOCUMENTS

| | | | |
|---|---|---|---|
| 11,468,282 | B2 | 10/2022 | Sanghavi et al. |
| 11,481,552 | B2 | 10/2022 | Krause et al. |
| 11,481,559 | B1 | 10/2022 | Asefi et al. |
| 11,487,932 | B2 | 11/2022 | Kramer |
| 11,495,218 | B2 | 11/2022 | Newendorp et al. |
| 11,507,183 | B2 | 11/2022 | Manjunath et al. |
| 11,508,380 | B2 | 11/2022 | Hu et al. |
| 11,538,469 | B2 | 12/2022 | Acero et al. |
| 11,580,990 | B2 | 2/2023 | Paulik et al. |
| 11,669,788 | B2 | 6/2023 | Balasubramanian et al. |
| 11,671,920 | B2 | 6/2023 | Freeman et al. |
| 11,675,829 | B2 | 6/2023 | Graham et al. |
| 11,756,548 | B1 | 9/2023 | Perkins et al. |
| 11,768,880 | B1 | 9/2023 | Nemani et al. |
| 11,769,497 | B2 | 9/2023 | Manjunath et al. |
| 11,783,805 | B1 | 10/2023 | Nadig et al. |
| 11,784,893 | B1 | 10/2023 | Chang |
| 11,818,111 | B1 | 11/2023 | Debolt |
| 11,837,232 | B2 | 12/2023 | Manjunath et al. |
| 2002/0002039 | A1 | 1/2002 | Qureshey et al. |
| 2002/0135618 | A1 | 9/2002 | Maes et al. |
| 2002/0141597 | A1 | 10/2002 | Wilcock |
| 2003/0032457 | A1 | 2/2003 | Leung |
| 2003/0078080 | A1 | 4/2003 | Miriyala |
| 2004/0122674 | A1 | 6/2004 | Bangalore et al. |
| 2004/0203899 | A1 | 10/2004 | Curtis et al. |
| 2004/0259536 | A1 | 12/2004 | Keskar et al. |
| 2005/0170849 | A1 | 8/2005 | Mcclelland |
| 2005/0179929 | A1 | 8/2005 | Jain |
| 2006/0116884 | A1 | 6/2006 | Itaki et al. |
| 2006/0121890 | A1 | 6/2006 | Chae |
| 2007/0038939 | A1 | 2/2007 | Challen et al. |
| 2007/0072553 | A1 | 3/2007 | Barbera |
| 2007/0075965 | A1 | 4/2007 | Huppi et al. |
| 2007/0136066 | A1 | 6/2007 | Qu |
| 2007/0143100 | A1 | 6/2007 | Agapi et al. |
| 2007/0250315 | A1 | 10/2007 | Bennett et al. |
| 2007/0250841 | A1 | 10/2007 | Scahill et al. |
| 2007/0263804 | A1 | 11/2007 | Lai et al. |
| 2008/0057876 | A1 | 3/2008 | Hsia et al. |
| 2008/0115056 | A1 | 5/2008 | Escapa et al. |
| 2008/0125102 | A1 | 5/2008 | Abel et al. |
| 2008/0189110 | A1 | 8/2008 | Freeman et al. |
| 2009/0003620 | A1 | 1/2009 | Mckillop et al. |
| 2009/0119100 | A1 | 5/2009 | Akella et al. |
| 2009/0163243 | A1 | 6/2009 | Barbera |
| 2009/0203370 | A1 | 8/2009 | Giles et al. |
| 2009/0222349 | A1 | 9/2009 | Burger et al. |
| 2009/0239508 | A1 | 9/2009 | Waddell |
| 2010/0099354 | A1 | 4/2010 | Johnson |
| 2011/0246891 | A1 | 10/2011 | Schubert et al. |
| 2011/0295590 | A1 | 12/2011 | Lloyd et al. |
| 2012/0035924 | A1 | 2/2012 | Jitkoff et al. |
| 2012/0053829 | A1 | 3/2012 | Agarwal et al. |
| 2012/0148077 | A1 | 6/2012 | Aldaz et al. |
| 2012/0209454 | A1 | 8/2012 | Miller et al. |
| 2012/0253804 | A1 | 10/2012 | Sugiura et al. |
| 2012/0265528 | A1 | 10/2012 | Gruber et al. |
| 2013/0054945 | A1 | 2/2013 | Free et al. |
| 2013/0097709 | A1 | 4/2013 | Basavapatna et al. |
| 2013/0109412 | A1 | 5/2013 | Nguyen et al. |
| 2013/0185074 | A1 | 7/2013 | Gruber et al. |
| 2013/0210410 | A1 | 8/2013 | Xu |
| 2013/0238326 | A1 | 9/2013 | Kim et al. |
| 2013/0325844 | A1 | 12/2013 | Plaisant |
| 2013/0325967 | A1 | 12/2013 | Parks et al. |
| 2013/0332721 | A1 | 12/2013 | Chaudhri et al. |
| 2014/0001255 | A1 | 1/2014 | Anthoine |
| 2014/0002338 | A1 | 1/2014 | Raffa et al. |
| 2014/0006012 | A1 | 1/2014 | Zhou et al. |
| 2014/0006025 | A1 | 1/2014 | Krishnan et al. |
| 2014/0006027 | A1 | 1/2014 | Kim et al. |
| 2014/0006028 | A1 | 1/2014 | Hu |
| 2014/0006030 | A1 | 1/2014 | Fleizach et al. |
| 2014/0006153 | A1 | 1/2014 | Thangam et al. |

| | | | |
|---|---|---|---|
| 2014/0006191 | A1 | 1/2014 | Shankar et al. |
| 2014/0006483 | A1 | 1/2014 | Garmark et al. |
| 2014/0006496 | A1 | 1/2014 | Dearman et al. |
| 2014/0006562 | A1 | 1/2014 | Handa et al. |
| 2014/0006944 | A1 | 1/2014 | Selig et al. |
| 2014/0006947 | A1 | 1/2014 | Garmark et al. |
| 2014/0006951 | A1 | 1/2014 | Hunter |
| 2014/0006955 | A1 | 1/2014 | Greenzeiger et al. |
| 2014/0008163 | A1 | 1/2014 | Mikonaho et al. |
| 2014/0012574 | A1 | 1/2014 | Pasupalak et al. |
| 2014/0012575 | A1 | 1/2014 | Ganong et al. |
| 2014/0012580 | A1 | 1/2014 | Ganong, III et al. |
| 2014/0012586 | A1 | 1/2014 | Rubin et al. |
| 2014/0012587 | A1 | 1/2014 | Park |
| 2014/0013336 | A1 | 1/2014 | Yang |
| 2014/0019116 | A1 | 1/2014 | Lundberg et al. |
| 2014/0019133 | A1 | 1/2014 | Bao et al. |
| 2014/0019135 | A1 | 1/2014 | Talwar et al. |
| 2014/0019460 | A1 | 1/2014 | Sambrani et al. |
| 2014/0019873 | A1 | 1/2014 | Gupta et al. |
| 2014/0025383 | A1 | 1/2014 | Dai et al. |
| 2014/0026037 | A1 | 1/2014 | Garb et al. |
| 2014/0028029 | A1 | 1/2014 | Jochman |
| 2014/0028477 | A1 | 1/2014 | Michalske |
| 2014/0028603 | A1 | 1/2014 | Xie et al. |
| 2014/0028735 | A1 | 1/2014 | Williams et al. |
| 2014/0032453 | A1 | 1/2014 | Eustice et al. |
| 2014/0032678 | A1 | 1/2014 | Koukoumidis et al. |
| 2014/0032706 | A1 | 1/2014 | Kuscher et al. |
| 2014/0033071 | A1 | 1/2014 | Gruber et al. |
| 2014/0035823 | A1 | 2/2014 | Khoe et al. |
| 2014/0037075 | A1 | 2/2014 | Bouzid et al. |
| 2014/0039888 | A1 | 2/2014 | Taubman et al. |
| 2014/0039893 | A1 | 2/2014 | Weiner et al. |
| 2014/0039894 | A1 | 2/2014 | Shostak |
| 2014/0040228 | A1 | 2/2014 | Kritt et al. |
| 2014/0040274 | A1 | 2/2014 | Aravamudan et al. |
| 2014/0040748 | A1 | 2/2014 | Lemay et al. |
| 2014/0040754 | A1 | 2/2014 | Donelli |
| 2014/0040801 | A1 | 2/2014 | Patel et al. |
| 2014/0040905 | A1 | 2/2014 | Tsunoda et al. |
| 2014/0040918 | A1 | 2/2014 | Li |
| 2014/0040961 | A1 | 2/2014 | Green, Sr. et al. |
| 2014/0045547 | A1 | 2/2014 | Singamsetty et al. |
| 2014/0046922 | A1 | 2/2014 | Crook et al. |
| 2014/0046934 | A1 | 2/2014 | Zhou et al. |
| 2014/0047001 | A1 | 2/2014 | Phillips et al. |
| 2014/0051399 | A1 | 2/2014 | Walker |
| 2014/0052451 | A1 | 2/2014 | Cheong et al. |
| 2014/0052680 | A1 | 2/2014 | Nitz et al. |
| 2014/0052791 | A1 | 2/2014 | Chakra et al. |
| 2014/0053082 | A1 | 2/2014 | Park |
| 2014/0053101 | A1 | 2/2014 | Buehler et al. |
| 2014/0053198 | A1 | 2/2014 | Sirpal et al. |
| 2014/0053210 | A1 | 2/2014 | Cheong et al. |
| 2014/0056439 | A1 | 2/2014 | Kim |
| 2014/0057610 | A1 | 2/2014 | Olincy et al. |
| 2014/0058732 | A1 | 2/2014 | Labsky et al. |
| 2014/0059030 | A1 | 2/2014 | Hakkani-Tur et al. |
| 2014/0059423 | A1 | 2/2014 | Gorga et al. |
| 2014/0067361 | A1 | 3/2014 | Nikoulina et al. |
| 2014/0067371 | A1 | 3/2014 | Liensberger |
| 2014/0067402 | A1 | 3/2014 | Kim |
| 2014/0067649 | A1 | 3/2014 | Kannan et al. |
| 2014/0067738 | A1 | 3/2014 | Kingsbury |
| 2014/0067740 | A1 | 3/2014 | Solari |
| 2014/0068751 | A1 | 3/2014 | Last |
| 2014/0071069 | A1 | 3/2014 | Anderson et al. |
| 2014/0071241 | A1 | 3/2014 | Yang et al. |
| 2014/0074454 | A1 | 3/2014 | Brown et al. |
| 2014/0074466 | A1 | 3/2014 | Sharifi et al. |
| 2014/0074470 | A1 | 3/2014 | Jansche et al. |
| 2014/0074472 | A1 | 3/2014 | Lin et al. |
| 2014/0074482 | A1 | 3/2014 | Ohno |
| 2014/0074483 | A1 | 3/2014 | Van Os |
| 2014/0074589 | A1 | 3/2014 | Nielsen et al. |
| 2014/0074815 | A1 | 3/2014 | Plimton |
| 2014/0074846 | A1 | 3/2014 | Moss et al. |
| 2014/0075453 | A1 | 3/2014 | Bellessort et al. |

(56) References Cited

U.S. PATENT DOCUMENTS

2014/0078065 A1 3/2014 Akkok
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082545 A1 3/2014 Zhai et al.
2014/0082569 A1 3/2014 Borgman
2014/0082715 A1 3/2014 Grajek et al.
2014/0086458 A1 3/2014 Rogers
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0088989 A1 3/2014 Krishnapuram et al.
2014/0092007 A1 4/2014 Kim et al.
2014/0095171 A1 4/2014 Lynch et al.
2014/0095172 A1 4/2014 Cabaco et al.
2014/0095173 A1 4/2014 Lynch et al.
2014/0095432 A1 4/2014 Trumbull et al.
2014/0095601 A1 4/2014 Abuelsaad et al.
2014/0095965 A1 4/2014 Li
2014/0096077 A1 4/2014 Jacob et al.
2014/0096209 A1 4/2014 Saraf et al.
2014/0098247 A1 4/2014 Rao et al.
2014/0100847 A1 4/2014 Ishii et al.
2014/0101127 A1 4/2014 Simhon et al.
2014/0104175 A1 4/2014 Ouyang et al.
2014/0108010 A1 4/2014 Maltseff et al.
2014/0108017 A1 4/2014 Mason et al.
2014/0108357 A1 4/2014 Procops et al.
2014/0108391 A1 4/2014 Volkert
2014/0108792 A1 4/2014 Borzycki et al.
2014/0112556 A1 4/2014 Kalinli-Akbacak
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0120961 A1 5/2014 Buck
2014/0122057 A1 5/2014 Chelba et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0122589 A1 5/2014 Fyke et al.
2014/0123022 A1 5/2014 Lee et al.
2014/0128021 A1 5/2014 Walker et al.
2014/0129006 A1 5/2014 Chen et al.
2014/0129226 A1 5/2014 Lee et al.
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142934 A1 5/2014 Kim
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0143784 A1 5/2014 Mistry et al.
2014/0146200 A1 5/2014 Scott et al.
2014/0148209 A1 5/2014 Weng et al.
2014/0149118 A1 5/2014 Lee et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156268 A1 6/2014 Arizmendi et al.
2014/0156269 A1 6/2014 Lee et al.
2014/0156279 A1 6/2014 Okamoto et al.
2014/0156564 A1 6/2014 Knight et al.
2014/0157319 A1 6/2014 Kimura et al.
2014/0157422 A1 6/2014 Livshits et al.
2014/0160157 A1 6/2014 Poulos et al.
2014/0163751 A1 6/2014 Davis et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163978 A1 6/2014 Basye et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0164953 A1 6/2014 Lynch et al.
2014/0165006 A1 6/2014 Chaudhri et al.
2014/0165187 A1 6/2014 Daesung et al.
2014/0168344 A1 6/2014 Shoemake et al.
2014/0169795 A1 6/2014 Clough
2014/0171064 A1 6/2014 Das
2014/0172412 A1 6/2014 Viegas et al.
2014/0172878 A1 6/2014 Clark et al.
2014/0173445 A1 6/2014 Grassiotto
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1 6/2014 Kim
2014/0180697 A1 6/2014 Torok et al.
2014/0181123 A1 6/2014 Blaise et al.
2014/0181703 A1 6/2014 Sullivan et al.
2014/0181715 A1 6/2014 Axelrod et al.
2014/0181741 A1 6/2014 Apacible et al.
2014/0181865 A1 6/2014 Koganei
2014/0188335 A1 7/2014 Madhok et al.
2014/0188460 A1 7/2014 Ouyang et al.
2014/0188477 A1 7/2014 Zhang
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0200891 A1 7/2014 Larcheveque et al.
2014/0201655 A1 7/2014 Mahaffey et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik
2014/0207582 A1 7/2014 Flinn et al.
2014/0211944 A1 7/2014 Hayward et al.
2014/0214429 A1 7/2014 Pantel
2014/0214537 A1 7/2014 Yoo et al.
2014/0215367 A1 7/2014 Kim et al.
2014/0215513 A1 7/2014 Ramer et al.
2014/0218372 A1 8/2014 Missig et al.
2014/0222422 A1 8/2014 Sarikaya et al.

(56) References Cited

U.S. PATENT DOCUMENTS

2014/0222435 A1 8/2014 Li et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0223586 A1 8/2014 Berger et al.
2014/0226503 A1 8/2014 Cooper et al.
2014/0229158 A1 8/2014 Zweig et al.
2014/0229184 A1 8/2014 Shires
2014/0229847 A1 8/2014 Park
2014/0230055 A1 8/2014 Boehl
2014/0232570 A1 8/2014 Skinder et al.
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-Ghazale et al.
2014/0249816 A1 9/2014 Pickering et al.
2014/0249817 A1 9/2014 Hart et al.
2014/0249820 A1 9/2014 Hsu et al.
2014/0249821 A1 9/2014 Kennewick et al.
2014/0250046 A1 9/2014 Winn et al.
2014/0253455 A1 9/2014 Mauro et al.
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1 9/2014 Kim
2014/0267599 A1 9/2014 Drouin et al.
2014/0267933 A1 9/2014 Young
2014/0272821 A1 9/2014 Pitschel et al.
2014/0273974 A1 9/2014 Varghese et al.
2014/0273979 A1 9/2014 Van Os et al.
2014/0274005 A1 9/2014 Luna et al.
2014/0274203 A1 9/2014 Ganong, III et al.
2014/0274211 A1 9/2014 Sejnoha et al.
2014/0278051 A1 9/2014 Mcgavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278419 A1 9/2014 Bishop et al.
2014/0278426 A1 9/2014 Jost et al.
2014/0278429 A1 9/2014 Ganong, III
2014/0278435 A1 9/2014 Ganong, III et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0280757 A1 9/2014 Tran
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282016 A1 9/2014 Hosier, Jr.
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282559 A1 9/2014 Verduzco et al.
2014/0282586 A1 9/2014 Shear et al.
2014/0282743 A1 9/2014 Howard et al.
2014/0283111 A1 9/2014 Dolph et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0297348 A1 10/2014 Ellis
2014/0298200 A1 10/2014 Cierniak
2014/0298395 A1 10/2014 Yang et al.
2014/0304086 A1 10/2014 Dasdan et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0316764 A1 10/2014 Ayan et al.
2014/0317030 A1 10/2014 Shen et al.
2014/0317502 A1 10/2014 Brown et al.
2014/0317578 A1 10/2014 Chaudhri
2014/0320398 A1 10/2014 Papstein
2014/0324429 A1 10/2014 Weilhammer et al.
2014/0324884 A1 10/2014 Lindahl et al.
2014/0330560 A1 11/2014 Venkatesha et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0341217 A1 11/2014 Eisner et al.
2014/0342762 A1 11/2014 Hajdu et al.
2014/0343834 A1 11/2014 Demerchant et al.
2014/0343943 A1 11/2014 Al-Telmissani
2014/0343946 A1 11/2014 Torok et al.
2014/0343950 A1 11/2014 Simpson et al.
2014/0344205 A1 11/2014 Luna et al.
2014/0344627 A1 11/2014 Schaub et al.
2014/0344687 A1 11/2014 Durham et al.
2014/0347181 A1 11/2014 Luna et al.
2014/0350847 A1 11/2014 Ichinokawa
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.

(56) References Cited

U.S. PATENT DOCUMENTS

2014/0358521 A1 12/2014 Mikutel et al.
2014/0358523 A1 12/2014 Sheth et al.
2014/0358549 A1 12/2014 O'connor et al.
2014/0359456 A1 12/2014 Thiele et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0364171 A1 12/2014 Heiman et al.
2014/0365209 A1 12/2014 Evermann
2014/0365214 A1 12/2014 Bayley
2014/0365216 A1 12/2014 Gruber et al.
2014/0365218 A1 12/2014 Chang et al.
2014/0365226 A1 12/2014 Sinha
2014/0365227 A1 12/2014 Cash et al.
2014/0365407 A1 12/2014 Brown et al.
2014/0365505 A1 12/2014 Clark et al.
2014/0365878 A1 12/2014 Dai et al.
2014/0365880 A1 12/2014 Bellegarda
2014/0365885 A1 12/2014 Carson et al.
2014/0365895 A1 12/2014 Magahern et al.
2014/0365912 A1 12/2014 Karunamuni et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372468 A1 12/2014 Collins et al.
2014/0372931 A1 12/2014 Zhai et al.
2014/0379326 A1 12/2014 Sarikaya et al.
2014/0379334 A1 12/2014 Fry
2014/0379338 A1 12/2014 Fry
2014/0379341 A1 12/2014 Seo et al.
2014/0379798 A1 12/2014 Bunner et al.
2014/0380214 A1 12/2014 Huang et al.
2014/0380285 A1 12/2014 Gabel et al.
2015/0003797 A1 1/2015 Schmidt
2015/0004958 A1 1/2015 Wang et al.
2015/0005009 A1 1/2015 Tomkins et al.
2015/0006147 A1 1/2015 Schmidt
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1 1/2015 Peng et al.
2015/0006182 A1 1/2015 Schmidt
2015/0006184 A1 1/2015 Marti et al.
2015/0006199 A1 1/2015 Snider et al.
2015/0006564 A1 1/2015 Tomkins et al.
2015/0012260 A1 1/2015 Chakladar
2015/0012271 A1 1/2015 Peng et al.
2015/0012862 A1 1/2015 Ikeda et al.
2015/0019219 A1 1/2015 Tzirkel-Hancock et al.
2015/0019220 A1 1/2015 Talhami et al.
2015/0019221 A1 1/2015 Lee et al.
2015/0019445 A1 1/2015 Glass et al.
2015/0019944 A1 1/2015 Kalgi
2015/0019954 A1 1/2015 Dalal et al.
2015/0019974 A1 1/2015 Doi et al.
2015/0025405 A1 1/2015 Vairavan et al.
2015/0025890 A1 1/2015 Jagatheesan et al.
2015/0026620 A1 1/2015 Kwon et al.
2015/0027178 A1 1/2015 Scalisi
2015/0031416 A1 1/2015 Labowicz et al.
2015/0032443 A1 1/2015 Karov et al.
2015/0032457 A1 1/2015 Koo et al.
2015/0033130 A1 1/2015 Scheessele
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0042640 A1 2/2015 Algreatly
2015/0045003 A1 2/2015 Vora et al.
2015/0045007 A1 2/2015 Cash
2015/0045068 A1 2/2015 Soffer et al.
2015/0046375 A1 2/2015 Mandel et al.
2015/0046434 A1 2/2015 Lim et al.
2015/0046537 A1 2/2015 Rakib
2015/0046828 A1 2/2015 Desai et al.
2015/0049884 A1 2/2015 Ye
2015/0050633 A1 2/2015 Christmas et al.
2015/0050923 A1 2/2015 Tu et al.
2015/0051754 A1 2/2015 Kwon et al.
2015/0051901 A1 2/2015 Stonehouse et al.
2015/0052128 A1 2/2015 Sharifi
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1 3/2015 Namgung et al.
2015/0066473 A1 3/2015 Jeong et al.
2015/0066479 A1 3/2015 Pasupalak et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067521 A1 3/2015 Heo et al.
2015/0067819 A1 3/2015 Shribman et al.
2015/0067822 A1 3/2015 Randall
2015/0068069 A1 3/2015 Tran et al.
2015/0070148 A1 3/2015 Cruz-Hernandez et al.
2015/0070163 A1 3/2015 Bennett et al.
2015/0071121 A1 3/2015 Patil et al.
2015/0073788 A1 3/2015 Sak et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082180 A1 3/2015 Ames et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095026 A1 4/2015 Bisani et al.
2015/0095031 A1 4/2015 Conkie et al.
2015/0095159 A1 4/2015 Kennewick et al.
2015/0095268 A1 4/2015 Greenzeiger et al.
2015/0095278 A1 4/2015 Flinn et al.
2015/0095310 A1 4/2015 Beaurepaire
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106061 A1 4/2015 Yang et al.
2015/0106085 A1 4/2015 Lindahl
2015/0106093 A1 4/2015 Weeks et al.
2015/0106096 A1 4/2015 Toopran et al.
2015/0106737 A1 4/2015 Montoy-Wilson et al.
2015/0109191 A1 4/2015 Johnson et al.
2015/0112684 A1 4/2015 Scheffer et al.
2015/0113407 A1 4/2015 Hoffert et al.
2015/0113435 A1 4/2015 Phillips
2015/0113454 A1 4/2015 McLaughlin

(56) References Cited

U.S. PATENT DOCUMENTS

2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0121227 A1 4/2015 Peng
2015/0121305 A1 4/2015 Saund et al.
2015/0123898 A1 5/2015 Kim et al.
2015/0127336 A1 5/2015 Lei et al.
2015/0127337 A1 5/2015 Heigold et al.
2015/0127348 A1 5/2015 Follis
2015/0127350 A1 5/2015 Agiomyrgiannakis
2015/0128058 A1 5/2015 Anajwala
2015/0130716 A1 5/2015 Sridharan et al.
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134323 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0140990 A1 5/2015 Kim et al.
2015/0141150 A1 5/2015 Zha
2015/0142420 A1 5/2015 Sarikaya et al.
2015/0142438 A1 5/2015 Dai et al.
2015/0142440 A1 5/2015 Parkinson et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149146 A1 5/2015 Abramovitz et al.
2015/0149177 A1 5/2015 Kalns et al.
2015/0149182 A1 5/2015 Kalns et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154134 A1 6/2015 Beaumont et al.
2015/0154185 A1 6/2015 Waibel
2015/0154976 A1 6/2015 Mutagi
2015/0160635 A1 6/2015 Schofield et al.
2015/0160855 A1 6/2015 Bi
2015/0161108 A1 6/2015 Back
2015/0161291 A1 6/2015 Gur et al.
2015/0161370 A1 6/2015 North et al.
2015/0161521 A1 6/2015 Shah et al.
2015/0161989 A1 6/2015 Hsu et al.
2015/0161997 A1 6/2015 Wetsel et al.
2015/0162000 A1 6/2015 Di Censo et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169195 A1 6/2015 Choi
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1 6/2015 Doherty et al.
2015/0172262 A1 6/2015 Ortiz, Jr. et al.
2015/0172463 A1 6/2015 Quast et al.
2015/0177945 A1 6/2015 Sengupta et al.
2015/0178388 A1 6/2015 Winnemoeller et al.
2015/0178785 A1 6/2015 Salonen
2015/0179168 A1 6/2015 Hakkani-Tur et al.
2015/0179176 A1 6/2015 Ryu et al.
2015/0181285 A1 6/2015 Zhang et al.
2015/0185718 A1 7/2015 Tappan et al.
2015/0185964 A1 7/2015 Stout
2015/0185993 A1 7/2015 Wheatley et al.
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186538 A1 7/2015 Yan et al.
2015/0186783 A1 7/2015 Byrne et al.
2015/0186892 A1 7/2015 Zhang et al.
2015/0187355 A1 7/2015 Parkinson et al.
2015/0187369 A1 7/2015 Dadu et al.
2015/0189362 A1 7/2015 Lee et al.
2015/0189425 A1 7/2015 Pang
2015/0193005 A1 7/2015 Di et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0194165 A1 7/2015 Faaborg et al.
2015/0194187 A1 7/2015 Cleven et al.
2015/0195379 A1 7/2015 Zhang et al.
2015/0195606 A1 7/2015 Mcdevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0200879 A1 7/2015 Wu et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205632 A1 7/2015 Gaster
2015/0205858 A1 7/2015 Xie et al.
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0217870 A1 8/2015 Mccullough et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221302 A1 8/2015 Han et al.
2015/0221304 A1 8/2015 Stewart
2015/0221307 A1 8/2015 Shah et al.
2015/0222586 A1 8/2015 Ebersman et al.
2015/0224848 A1 8/2015 Eisenhour
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228279 A1 8/2015 Biadsy et al.
2015/0228281 A1 8/2015 Raniere
2015/0228282 A1 8/2015 Evrard
2015/0228283 A1 8/2015 Ehsani et al.
2015/0228292 A1 8/2015 Goldstein et al.
2015/0230022 A1 8/2015 Sakai et al.
2015/0230095 A1 8/2015 Smith et al.
2015/0234556 A1 8/2015 Zhu et al.
2015/0234636 A1 8/2015 Barnes, Jr.
2015/0234800 A1 8/2015 Patrick et al.
2015/0235434 A1 8/2015 Miller et al.
2015/0235540 A1 8/2015 Verna et al.
2015/0237301 A1 8/2015 Shi et al.
2015/0242088 A1 8/2015 Hasumi
2015/0242091 A1 8/2015 Lu et al.
2015/0242385 A1 8/2015 Bao et al.
2015/0243278 A1 8/2015 Kibre et al.
2015/0243279 A1 8/2015 Morse et al.
2015/0243283 A1 8/2015 Halash et al.
2015/0244665 A1 8/2015 Choi et al.
2015/0245154 A1 8/2015 Dadu et al.
2015/0248494 A1 9/2015 Mital
2015/0248651 A1 9/2015 Akutagawa et al.
2015/0248886 A1 9/2015 Sarikaya et al.
2015/0249664 A1 9/2015 Talhami et al.
2015/0249715 A1 9/2015 Helvik et al.
2015/0253146 A1 9/2015 Annapureddy et al.

(56) References Cited

U.S. PATENT DOCUMENTS

2015/0253885 A1 9/2015 Kagan et al.
2015/0254057 A1 9/2015 Klein et al.
2015/0254058 A1 9/2015 Klein et al.
2015/0254333 A1 9/2015 Fife et al.
2015/0255068 A1 9/2015 Kim et al.
2015/0255071 A1 9/2015 Chiba
2015/0256873 A1 9/2015 Klein et al.
2015/0261298 A1 9/2015 Li
2015/0261496 A1 9/2015 Faaborg et al.
2015/0261758 A1 9/2015 Sharp et al.
2015/0261850 A1 9/2015 Mittal
2015/0261944 A1 9/2015 Hosom et al.
2015/0262443 A1 9/2015 Chong
2015/0262573 A1 9/2015 Brooks et al.
2015/0262583 A1 9/2015 Kanda et al.
2015/0269139 A1 9/2015 Mcateer et al.
2015/0269420 A1 9/2015 Kim et al.
2015/0269617 A1 9/2015 Mikurak
2015/0269677 A1 9/2015 Milne
2015/0269943 A1 9/2015 Vanblon et al.
2015/0277574 A1 10/2015 Jain et al.
2015/0278192 A1 10/2015 Bretter et al.
2015/0278199 A1 10/2015 Hazen et al.
2015/0278348 A1 10/2015 Paruchuri et al.
2015/0278370 A1 10/2015 Stratvert et al.
2015/0278737 A1 10/2015 Chen Huebscher et al.
2015/0279354 A1 10/2015 Gruenstein et al.
2015/0279358 A1 10/2015 Kingsbury et al.
2015/0279360 A1 10/2015 Mengibar et al.
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286710 A1 10/2015 Chang et al.
2015/0286716 A1 10/2015 Snibbe et al.
2015/0286937 A1 10/2015 Hildebrand
2015/0287401 A1 10/2015 Lee et al.
2015/0287408 A1 10/2015 Svendsen et al.
2015/0287409 A1 10/2015 Jang
2015/0287411 A1 10/2015 Kojima et al.
2015/0288629 A1 10/2015 Choi et al.
2015/0293602 A1 10/2015 Kay et al.
2015/0294086 A1 10/2015 Kare et al.
2015/0294377 A1 10/2015 Chow
2015/0294516 A1 10/2015 Chiang
2015/0294670 A1 10/2015 Roblek et al.
2015/0295915 A1 10/2015 Xiu
2015/0296065 A1 10/2015 Narita et al.
2015/0300832 A1 10/2015 Moore et al.
2015/0301796 A1 10/2015 Visser et al.
2015/0302316 A1 10/2015 Buryak et al.
2015/0302855 A1 10/2015 Kim et al.
2015/0302856 A1 10/2015 Kim et al.
2015/0302857 A1 10/2015 Yamada
2015/0302870 A1 10/2015 Burke et al.
2015/0308470 A1 10/2015 Graham et al.
2015/0309691 A1 10/2015 Seo et al.
2015/0309997 A1 10/2015 Lee et al.
2015/0310114 A1 10/2015 Ryger et al.
2015/0310852 A1 10/2015 Spizzo et al.
2015/0310858 A1 10/2015 Li et al.
2015/0310862 A1 10/2015 Dauphin et al.
2015/0310879 A1 10/2015 Buchanan et al.
2015/0310888 A1 10/2015 Chen
2015/0312182 A1 10/2015 Langholz
2015/0312409 A1 10/2015 Czarnecki et al.
2015/0312523 A1 10/2015 Li et al.
2015/0314454 A1 11/2015 Breazeal et al.
2015/0317069 A1 11/2015 Clements et al.
2015/0317310 A1 11/2015 Eiche et al.
2015/0319264 A1 11/2015 Allen et al.
2015/0319411 A1 11/2015 Kasmir et al.
2015/0324041 A1 11/2015 Varley et al.
2015/0324334 A1 11/2015 Lee et al.
2015/0324362 A1 11/2015 Glass et al.
2015/0325235 A1 11/2015 Levit et al.
2015/0331664 A1 11/2015 Osawa et al.
2015/0331711 A1 11/2015 Huang et al.
2015/0331728 A1 11/2015 Kim et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340034 A1 11/2015 Schalkwyk et al.
2015/0340040 A1 11/2015 Mun et al.
2015/0340042 A1 11/2015 Sejnoha et al.
2015/0341717 A1 11/2015 Song et al.
2015/0346845 A1 12/2015 Di Censo et al.
2015/0347086 A1 12/2015 Liedholm et al.
2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350147 A1 12/2015 Shepherd et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thörn
2015/0365251 A1 12/2015 Kinoshita et al.
2015/0365448 A1 12/2015 Stifelman et al.
2015/0370455 A1 12/2015 Van Os et al.
2015/0370531 A1 12/2015 Faaborg
2015/0370780 A1 12/2015 Wang et al.
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371664 A1 12/2015 Bar-Or et al.
2015/0371665 A1 12/2015 Naik et al.
2015/0373183 A1 12/2015 Woolsey et al.
2015/0373428 A1 12/2015 Trollope et al.
2015/0379118 A1 12/2015 Wickenkamp et al.
2015/0379414 A1 12/2015 Yeh et al.
2015/0379423 A1 12/2015 Dirac et al.
2015/0379993 A1 12/2015 Subhojit et al.
2015/0381923 A1 12/2015 Wickenkamp et al.
2015/0382047 A1 12/2015 Van Os et al.
2015/0382079 A1 12/2015 Lister et al.
2015/0382147 A1 12/2015 Clark et al.
2015/0382164 A1 12/2015 Chung et al.
2015/0382322 A1 12/2015 Migicovsky et al.
2016/0004499 A1 1/2016 Kim et al.
2016/0004690 A1 1/2016 Bangalore et al.
2016/0005320 A1 1/2016 Decharms et al.
2016/0006795 A1 1/2016 Yunten
2016/0012038 A1 1/2016 Edwards et al.
2016/0014476 A1 1/2016 Caliendo, Jr. et al.
2016/0018872 A1 1/2016 Tu et al.
2016/0018899 A1 1/2016 Tu et al.
2016/0018900 A1 1/2016 Tu et al.
2016/0018959 A1 1/2016 Yamashita et al.
2016/0019886 A1 1/2016 Hong
2016/0019896 A1 1/2016 Guevara et al.

(56) References Cited

U.S. PATENT DOCUMENTS

2016/0021168 A1 1/2016 Chaudhri et al.
2016/0021414 A1 1/2016 Padi et al.
2016/0026242 A1 1/2016 Burns et al.
2016/0026258 A1 1/2016 Ou et al.
2016/0027431 A1 1/2016 Kurzweil et al.
2016/0027439 A1 1/2016 Sharifi
2016/0028666 A1 1/2016 Li
2016/0028802 A1 1/2016 Balasingh et al.
2016/0029316 A1 1/2016 Mohan et al.
2016/0034042 A1 2/2016 Joo
2016/0034253 A1 2/2016 Bang et al.
2016/0034447 A1 2/2016 Shin et al.
2016/0034811 A1 2/2016 Paulik et al.
2016/0036750 A1 2/2016 Yuan et al.
2016/0036953 A1 2/2016 Lee et al.
2016/0041733 A1 2/2016 Qian et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0057203 A1 2/2016 Gardenfors et al.
2016/0057475 A1 2/2016 Liu
2016/0061623 A1 3/2016 Pahwa et al.
2016/0062459 A1 3/2016 Publicover et al.
2016/0062605 A1 3/2016 Agarwal et al.
2016/0063094 A1 3/2016 Udupa et al.
2016/0063095 A1 3/2016 Nassar et al.
2016/0063998 A1 3/2016 Krishnamoorthy et al.
2016/0065155 A1 3/2016 Bharj et al.
2016/0065626 A1 3/2016 Jain et al.
2016/0066020 A1 3/2016 Mountain
2016/0066360 A1 3/2016 Vinegrad et al.
2016/0070581 A1 3/2016 Soon-Shiong
2016/0071516 A1 3/2016 Lee et al.
2016/0071517 A1 3/2016 Beaver et al.
2016/0071520 A1 3/2016 Hayakawa
2016/0071521 A1 3/2016 Haughay
2016/0072940 A1 3/2016 Cronin
2016/0077794 A1 3/2016 Kim et al.
2016/0078359 A1 3/2016 Csurka et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091871 A1 3/2016 Marti et al.
2016/0091967 A1 3/2016 Prokofieva et al.
2016/0092046 A1 3/2016 Hong et al.
2016/0092074 A1 3/2016 Raux et al.
2016/0092434 A1 3/2016 Bellegarda
2016/0092447 A1 3/2016 Pathurudeen et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094889 A1 3/2016 Venkataraman et al.
2016/0094979 A1 3/2016 Naik et al.
2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0105308 A1 4/2016 Dutt
2016/0111091 A1 4/2016 Bakish
2016/0112746 A1 4/2016 Zhang et al.
2016/0112792 A1 4/2016 Lee et al.
2016/0116980 A1 4/2016 George-Svahn et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132290 A1 5/2016 Raux
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0139720 A1 5/2016 Kritt et al.
2016/0140951 A1 5/2016 Agiomyrgiannakis et al.
2016/0140962 A1 5/2016 Sharifi
2016/0147725 A1 5/2016 Patten et al.
2016/0147739 A1 5/2016 Lim et al.
2016/0148610 A1 5/2016 Kennewick, Jr. et al.
2016/0148612 A1 5/2016 Guo et al.
2016/0148613 A1 5/2016 Kwon et al.
2016/0149966 A1 5/2016 Remash et al.
2016/0150020 A1 5/2016 Farmer et al.
2016/0151668 A1 6/2016 Barnes et al.
2016/0154624 A1 6/2016 Son et al.
2016/0154792 A1 6/2016 Sarikaya et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0156990 A1 6/2016 Miccoy et al.
2016/0162456 A1 6/2016 Munro et al.
2016/0163311 A1 6/2016 Crook et al.
2016/0163312 A1 6/2016 Naik et al.
2016/0165296 A1 6/2016 Hamon
2016/0169267 A1 6/2016 Pool
2016/0170710 A1 6/2016 Kim et al.
2016/0170966 A1 6/2016 Kolo
2016/0171980 A1 6/2016 Liddell et al.
2016/0173578 A1 6/2016 Sharma et al.
2016/0173617 A1 6/2016 Allinson
2016/0173929 A1 6/2016 Klappert
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189198 A1 6/2016 Mckenzie et al.
2016/0189706 A1 6/2016 Zopf et al.
2016/0189715 A1 6/2016 Nishikawa
2016/0189717 A1 6/2016 Kannan et al.
2016/0195924 A1 7/2016 Weber et al.
2016/0196110 A1 7/2016 Yehoshua et al.
2016/0198319 A1 7/2016 Huang et al.
2016/0202957 A1 7/2016 Siddall et al.
2016/0203002 A1 7/2016 Kannan et al.
2016/0203193 A1 7/2016 Haverlock et al.
2016/0210115 A1 7/2016 Lee
2016/0210551 A1 7/2016 Lee et al.
2016/0210981 A1 7/2016 Lee
2016/0212206 A1 7/2016 Wu et al.
2016/0212208 A1 7/2016 Kulkarni et al.
2016/0212488 A1 7/2016 Os et al.
2016/0217784 A1 7/2016 Gelfenbeyn et al.
2016/0217794 A1 7/2016 Imoto et al.
2016/0224540 A1 8/2016 Stewart et al.
2016/0224559 A1 8/2016 Hicks et al.
2016/0224774 A1 8/2016 Pender
2016/0225372 A1 8/2016 Cheung et al.
2016/0226713 A1 8/2016 Pitschel et al.
2016/0226956 A1 8/2016 Hong et al.
2016/0227107 A1 8/2016 Beaumont
2016/0227633 A1 8/2016 Sun et al.
2016/0232500 A1 8/2016 Wang et al.
2016/0234206 A1 8/2016 Tunnell et al.

(56) References Cited

U.S. PATENT DOCUMENTS

2016/0239480 A1 8/2016 Larcheveque et al.
2016/0239568 A1 8/2016 Packer et al.
2016/0239645 A1 8/2016 Heo et al.
2016/0239848 A1 8/2016 Chang et al.
2016/0240187 A1 8/2016 Fleizach et al.
2016/0240189 A1 8/2016 Lee et al.
2016/0240192 A1 8/2016 Raghuvir
2016/0242148 A1 8/2016 Reed
2016/0246776 A1 8/2016 Zhao et al.
2016/0247061 A1 8/2016 Trask et al.
2016/0247110 A1 8/2016 Sinha
2016/0249319 A1 8/2016 Dotan-Cohen et al.
2016/0252972 A1 9/2016 Kim et al.
2016/0253312 A1 9/2016 Rhodes
2016/0253528 A1 9/2016 Gao et al.
2016/0255549 A1 9/2016 Lakhdhar et al.
2016/0259623 A1 9/2016 Sumner et al.
2016/0259656 A1 9/2016 Sumner et al.
2016/0259779 A1 9/2016 Labský et al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0262442 A1 9/2016 Davila et al.
2016/0266653 A1 9/2016 Liu et al.
2016/0266871 A1 9/2016 Schmid et al.
2016/0267904 A1 9/2016 Biadsy et al.
2016/0269540 A1 9/2016 Butcher et al.
2016/0274938 A1 9/2016 Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283055 A1 9/2016 Haghighat et al.
2016/0283185 A1 9/2016 Mclaren et al.
2016/0283455 A1 9/2016 Mardanbegi et al.
2016/0283463 A1 9/2016 Sumesh et al.
2016/0284005 A1 9/2016 Daniel et al.
2016/0284199 A1 9/2016 Dotan-Cohen et al.
2016/0284340 A1 9/2016 Li et al.
2016/0284350 A1 9/2016 Yun et al.
2016/0285808 A1 9/2016 Franklin et al.
2016/0286045 A1 9/2016 Shaltiel et al.
2016/0291831 A1 10/2016 Baek
2016/0292603 A1 10/2016 Prajapati et al.
2016/0293157 A1 10/2016 Chen et al.
2016/0293167 A1 10/2016 Chen et al.
2016/0293168 A1 10/2016 Chen
2016/0294755 A1 10/2016 Prabhu
2016/0294813 A1 10/2016 Zou
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0306683 A1 10/2016 Standley et al.
2016/0307566 A1 10/2016 Bellegarda
2016/0308799 A1 10/2016 Schubert et al.
2016/0309035 A1 10/2016 Li
2016/0313906 A1 10/2016 Kilchenko et al.
2016/0313958 A1 10/2016 Guadarrama et al.
2016/0314788 A1 10/2016 Jitkoff et al.
2016/0314789 A1 10/2016 Marcheret et al.
2016/0314792 A1 10/2016 Alvarez et al.
2016/0315996 A1 10/2016 Ha et al.
2016/0316349 A1 10/2016 Lee et al.
2016/0317924 A1 11/2016 Tanaka et al.
2016/0320838 A1 11/2016 Teller et al.
2016/0321239 A1 11/2016 Iso-Sipilä et al.
2016/0321243 A1 11/2016 Walia et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0322055 A1 11/2016 Sainath et al.
2016/0328134 A1 11/2016 Xu
2016/0328147 A1 11/2016 Zhang et al.
2016/0328205 A1 11/2016 Agrawal et al.
2016/0328893 A1 11/2016 Cordova et al.
2016/0329060 A1 11/2016 Ito et al.
2016/0334973 A1 11/2016 Reckhow et al.
2016/0335138 A1 11/2016 Surti et al.
2016/0335139 A1 11/2016 Hurley et al.
2016/0335532 A1 11/2016 Sanghavi et al.
2016/0336006 A1 11/2016 Levit et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0342803 A1 11/2016 Goodridge et al.
2016/0350070 A1 12/2016 Sung et al.
2016/0350650 A1 12/2016 Leeman-Munk et al.
2016/0350812 A1 12/2016 Priness et al.
2016/0351190 A1 12/2016 Piernot et al.
2016/0352567 A1 12/2016 Robbins et al.
2016/0352924 A1 12/2016 Senarath et al.
2016/0357304 A1 12/2016 Hatori et al.
2016/0357507 A1 12/2016 Decker et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358603 A1 12/2016 Azam et al.
2016/0358605 A1 12/2016 Ganong et al.
2016/0358609 A1 12/2016 Connell et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0364382 A1 12/2016 Sarikaya
2016/0365101 A1 12/2016 Foy et al.
2016/0371054 A1 12/2016 Beaumont et al.
2016/0371250 A1 12/2016 Rhodes
2016/0372112 A1 12/2016 Miller et al.
2016/0372119 A1 12/2016 Sak et al.
2016/0373571 A1 12/2016 Woolsey et al.
2016/0378080 A1 12/2016 Uppala et al.
2016/0378747 A1 12/2016 Orr et al.
2016/0379091 A1 12/2016 Lin et al.
2016/0379105 A1 12/2016 Moore, Jr.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0000348 A1 1/2017 Karsten et al.
2017/0003931 A1 1/2017 Dvortsov et al.
2017/0004209 A1 1/2017 Johl et al.
2017/0004409 A1 1/2017 Chu et al.
2017/0004824 A1 1/2017 Yoo et al.
2017/0005818 A1 1/2017 Gould
2017/0006329 A1 1/2017 Jang et al.
2017/0011091 A1 1/2017 Chehreghani
2017/0011279 A1 1/2017 Soldevila et al.
2017/0011303 A1 1/2017 Annapureddy et al.
2017/0011742 A1 1/2017 Jing et al.
2017/0013124 A1 1/2017 Havelka et al.
2017/0013331 A1 1/2017 Watanabe et al.
2017/0018271 A1 1/2017 Khan et al.
2017/0019987 A1 1/2017 Dragone et al.
2017/0023963 A1 1/2017 Davis et al.

(56) References Cited

U.S. PATENT DOCUMENTS

| | | | |
|---|---|---|---|
| 2017/0024398 | A1 | 1/2017 | Tomkins et al. |
| 2017/0025124 | A1 | 1/2017 | Mixter et al. |
| 2017/0026318 | A1 | 1/2017 | Daniel et al. |
| 2017/0026509 | A1 | 1/2017 | Rand |
| 2017/0026705 | A1 | 1/2017 | Yeh et al. |
| 2017/0027522 | A1 | 2/2017 | Van Hasselt et al. |
| 2017/0031576 | A1 | 2/2017 | Saoji et al. |
| 2017/0031711 | A1 | 2/2017 | Wu et al. |
| 2017/0032022 | A1 | 2/2017 | Srinivasan et al. |
| 2017/0032440 | A1 | 2/2017 | Paton |
| 2017/0032783 | A1 | 2/2017 | Lord et al. |
| 2017/0032787 | A1 | 2/2017 | Dayal |
| 2017/0032791 | A1 | 2/2017 | Elson et al. |
| 2017/0034087 | A1 | 2/2017 | Borenstein et al. |
| 2017/0039283 | A1 | 2/2017 | Bennett et al. |
| 2017/0039475 | A1 | 2/2017 | Cheyer et al. |
| 2017/0040002 | A1 | 2/2017 | Basson et al. |
| 2017/0041388 | A1 | 2/2017 | Tal et al. |
| 2017/0041858 | A1 | 2/2017 | Tong et al. |
| 2017/0046025 | A1 | 2/2017 | Dascola et al. |
| 2017/0046330 | A1 | 2/2017 | Si et al. |
| 2017/0047063 | A1 | 2/2017 | Ohmura et al. |
| 2017/0052760 | A1 | 2/2017 | Johnson et al. |
| 2017/0053652 | A1 | 2/2017 | Choi et al. |
| 2017/0055895 | A1 | 3/2017 | Jardins et al. |
| 2017/0060853 | A1 | 3/2017 | Lee et al. |
| 2017/0061423 | A1 | 3/2017 | Bryant et al. |
| 2017/0068423 | A1 | 3/2017 | Napolitano et al. |
| 2017/0068513 | A1 | 3/2017 | Stasior et al. |
| 2017/0068550 | A1 | 3/2017 | Zeitlin |
| 2017/0068670 | A1 | 3/2017 | Orr et al. |
| 2017/0069308 | A1 | 3/2017 | Aleksic et al. |
| 2017/0069321 | A1 | 3/2017 | Toiyama |
| 2017/0069327 | A1 | 3/2017 | Heigold et al. |
| 2017/0075653 | A1 | 3/2017 | Dawidowsky et al. |
| 2017/0075879 | A1 | 3/2017 | Sakamoto et al. |
| 2017/0076518 | A1 | 3/2017 | Patterson et al. |
| 2017/0076720 | A1 | 3/2017 | Gopalan et al. |
| 2017/0076721 | A1 | 3/2017 | Bargetzi et al. |
| 2017/0078490 | A1 | 3/2017 | Kaminsky et al. |
| 2017/0083179 | A1 | 3/2017 | Gruber et al. |
| 2017/0083285 | A1 | 3/2017 | Meyers et al. |
| 2017/0083504 | A1 | 3/2017 | Huang |
| 2017/0083506 | A1 | 3/2017 | Liu et al. |
| 2017/0084277 | A1 | 3/2017 | Sharifi |
| 2017/0085547 | A1 | 3/2017 | De Aguiar et al. |
| 2017/0085696 | A1 | 3/2017 | Abkairov |
| 2017/0090428 | A1 | 3/2017 | Oohara |
| 2017/0090569 | A1 | 3/2017 | Levesque |
| 2017/0090864 | A1 | 3/2017 | Jorgovanovic |
| 2017/0091168 | A1 | 3/2017 | Bellegarda et al. |
| 2017/0091169 | A1 | 3/2017 | Bellegarda et al. |
| 2017/0091612 | A1 | 3/2017 | Gruber et al. |
| 2017/0092259 | A1 | 3/2017 | Jeon |
| 2017/0092270 | A1 | 3/2017 | Newendorp et al. |
| 2017/0092278 | A1 | 3/2017 | Evermann et al. |
| 2017/0093356 | A1 | 3/2017 | Cudak et al. |
| 2017/0097743 | A1 | 4/2017 | Hameed et al. |
| 2017/0102837 | A1 | 4/2017 | Toumpelis |
| 2017/0102915 | A1 | 4/2017 | Kuscher et al. |
| 2017/0103749 | A1 | 4/2017 | Zhao et al. |
| 2017/0103752 | A1 | 4/2017 | Senior et al. |
| 2017/0105190 | A1 | 4/2017 | Logan et al. |
| 2017/0108236 | A1 | 4/2017 | Guan et al. |
| 2017/0110117 | A1 | 4/2017 | Chakladar et al. |
| 2017/0110125 | A1 | 4/2017 | Xu et al. |
| 2017/0116177 | A1 | 4/2017 | Walia |
| 2017/0116982 | A1 | 4/2017 | Gelfenbeyn et al. |
| 2017/0116985 | A1 | 4/2017 | Mathias et al. |
| 2017/0116987 | A1 | 4/2017 | Kang et al. |
| 2017/0116989 | A1 | 4/2017 | Yadgar et al. |
| 2017/0124190 | A1 | 5/2017 | Wang et al. |
| 2017/0124311 | A1 | 5/2017 | Li et al. |
| 2017/0124531 | A1 | 5/2017 | McCormack |
| 2017/0125016 | A1 | 5/2017 | Wang |
| 2017/0127124 | A9 | 5/2017 | Wilson et al. |
| 2017/0131778 | A1 | 5/2017 | Iyer |
| 2017/0132019 | A1 | 5/2017 | Karashchuk et al. |
| 2017/0132199 | A1 | 5/2017 | Vescovi et al. |
| 2017/0133007 | A1 | 5/2017 | Drewes |
| 2017/0133009 | A1 | 5/2017 | Cho et al. |
| 2017/0134807 | A1 | 5/2017 | Shaw et al. |
| 2017/0140041 | A1 | 5/2017 | Dotan-Cohen et al. |
| 2017/0140052 | A1 | 5/2017 | Bufe et al. |
| 2017/0140644 | A1 | 5/2017 | Hwang et al. |
| 2017/0140760 | A1 | 5/2017 | Sachdev |
| 2017/0147722 | A1 | 5/2017 | Greenwood |
| 2017/0147841 | A1 | 5/2017 | Stagg et al. |
| 2017/0148044 | A1 | 5/2017 | Fukuda et al. |
| 2017/0148307 | A1 | 5/2017 | Yeom et al. |
| 2017/0154033 | A1 | 6/2017 | Lee |
| 2017/0154055 | A1 | 6/2017 | Dimson et al. |
| 2017/0154176 | A1 | 6/2017 | Yun et al. |
| 2017/0154628 | A1 | 6/2017 | Mohajer et al. |
| 2017/0155940 | A1 | 6/2017 | Jin et al. |
| 2017/0155965 | A1 | 6/2017 | Ward |
| 2017/0161018 | A1 | 6/2017 | Lemay et al. |
| 2017/0161268 | A1 | 6/2017 | Badaskar |
| 2017/0161293 | A1 | 6/2017 | Ionescu et al. |
| 2017/0161393 | A1 | 6/2017 | Oh et al. |
| 2017/0161439 | A1 | 6/2017 | Raduchel et al. |
| 2017/0161500 | A1 | 6/2017 | Yang |
| 2017/0162191 | A1 | 6/2017 | Grost et al. |
| 2017/0162202 | A1 | 6/2017 | Formhals et al. |
| 2017/0162203 | A1 | 6/2017 | Huang et al. |
| 2017/0169506 | A1 | 6/2017 | Wishne et al. |
| 2017/0169818 | A1 | 6/2017 | Vanblon et al. |
| 2017/0169819 | A1 | 6/2017 | Mese et al. |
| 2017/0171139 | A1 | 6/2017 | Marra et al. |
| 2017/0171387 | A1 | 6/2017 | Vendrow |
| 2017/0177080 | A1 | 6/2017 | Deleeuw |
| 2017/0177547 | A1 | 6/2017 | Ciereszko et al. |
| 2017/0178619 | A1 | 6/2017 | Naik et al. |
| 2017/0178620 | A1 | 6/2017 | Fleizach et al. |
| 2017/0178626 | A1 | 6/2017 | Gruber et al. |
| 2017/0178666 | A1 | 6/2017 | Yu |
| 2017/0180499 | A1 | 6/2017 | Gelfenbeyn et al. |
| 2017/0185375 | A1 | 6/2017 | Martel et al. |
| 2017/0185581 | A1 | 6/2017 | Bojja et al. |
| 2017/0186429 | A1 | 6/2017 | Giuli et al. |
| 2017/0186432 | A1 | 6/2017 | Aleksic et al. |
| 2017/0186446 | A1 | 6/2017 | Wosk et al. |
| 2017/0187711 | A1 | 6/2017 | Joo et al. |
| 2017/0193083 | A1 | 7/2017 | Bhatt et al. |
| 2017/0195493 | A1 | 7/2017 | Sudarsan et al. |
| 2017/0195495 | A1 | 7/2017 | Deora et al. |
| 2017/0195636 | A1 | 7/2017 | Child et al. |
| 2017/0195856 | A1 | 7/2017 | Snyder et al. |
| 2017/0199870 | A1 | 7/2017 | Zheng et al. |
| 2017/0199874 | A1 | 7/2017 | Patel et al. |
| 2017/0200066 | A1 | 7/2017 | Wang et al. |
| 2017/0201609 | A1 | 7/2017 | Salmenkaita et al. |
| 2017/0201613 | A1 | 7/2017 | Engelke et al. |
| 2017/0201846 | A1 | 7/2017 | Katayama et al. |
| 2017/0206002 | A1 | 7/2017 | Badger et al. |
| 2017/0206899 | A1 | 7/2017 | Bryant et al. |
| 2017/0215052 | A1 | 7/2017 | Koum et al. |
| 2017/0220212 | A1 | 8/2017 | Yang et al. |
| 2017/0221486 | A1 | 8/2017 | Kurata et al. |
| 2017/0222961 | A1 | 8/2017 | Beach et al. |
| 2017/0223189 | A1 | 8/2017 | Meredith et al. |
| 2017/0227935 | A1 | 8/2017 | Su et al. |
| 2017/0228367 | A1 | 8/2017 | Pasupalak et al. |
| 2017/0228382 | A1 | 8/2017 | Haviv et al. |
| 2017/0229121 | A1 | 8/2017 | Taki et al. |
| 2017/0230429 | A1 | 8/2017 | Garmark et al. |
| 2017/0230497 | A1 | 8/2017 | Kim et al. |
| 2017/0230709 | A1 | 8/2017 | Van Os et al. |
| 2017/0235361 | A1 | 8/2017 | Rigazio et al. |
| 2017/0235618 | A1 | 8/2017 | Lin et al. |
| 2017/0235721 | A1 | 8/2017 | Almosallam et al. |
| 2017/0236512 | A1 | 8/2017 | Williams et al. |
| 2017/0236514 | A1 | 8/2017 | Nelson |
| 2017/0236517 | A1 | 8/2017 | Yu et al. |

(56) References Cited

U.S. PATENT DOCUMENTS

2017/0238039 A1 8/2017 Sabattini
2017/0242478 A1 8/2017 Ma
2017/0242653 A1 8/2017 Lang et al.
2017/0242657 A1 8/2017 Jarvis et al.
2017/0242840 A1 8/2017 Lu et al.
2017/0242920 A1 8/2017 Neland
2017/0243468 A1 8/2017 Dotan-Cohen et al.
2017/0243576 A1 8/2017 Millington et al.
2017/0243583 A1 8/2017 Raichelgauz et al.
2017/0243586 A1 8/2017 Civelli et al.
2017/0249291 A1 8/2017 Patel
2017/0249309 A1 8/2017 Sarikaya
2017/0256256 A1 9/2017 Wang et al.
2017/0257723 A1 9/2017 Morishita et al.
2017/0262051 A1 9/2017 Tall et al.
2017/0262432 A1 9/2017 Sarikaya et al.
2017/0263247 A1 9/2017 Kang et al.
2017/0263248 A1 9/2017 Gruber et al.
2017/0263249 A1 9/2017 Akbacak et al.
2017/0263254 A1 9/2017 Dewan et al.
2017/0264451 A1 9/2017 Yu et al.
2017/0264711 A1 9/2017 Natarajan et al.
2017/0270092 A1 9/2017 He et al.
2017/0270715 A1 9/2017 Lindsay et al.
2017/0270822 A1 9/2017 Cohen
2017/0270912 A1 9/2017 Levit et al.
2017/0270919 A1 9/2017 Parthasarathi et al.
2017/0273044 A1 9/2017 Alsina
2017/0277691 A1 9/2017 Agarwal
2017/0278513 A1 9/2017 Li et al.
2017/0278514 A1 9/2017 Mathias et al.
2017/0279795 A1 9/2017 Redberg
2017/0285915 A1 10/2017 Napolitano et al.
2017/0286397 A1 10/2017 Gonzalez
2017/0286407 A1 10/2017 Chochowski et al.
2017/0287218 A1 10/2017 Nuernberger et al.
2017/0287472 A1 10/2017 Ogawa et al.
2017/0289305 A1 10/2017 Liensberger et al.
2017/0295446 A1 10/2017 Shivappa
2017/0301348 A1 10/2017 Chen et al.
2017/0301353 A1 10/2017 Mozer et al.
2017/0308552 A1 10/2017 Soni et al.
2017/0308589 A1 10/2017 Liu et al.
2017/0308609 A1 10/2017 Berkhin et al.
2017/0311005 A1 10/2017 Lin
2017/0316775 A1 11/2017 Le et al.
2017/0316779 A1 11/2017 Mohapatra et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.
2017/0337478 A1 11/2017 Sarikaya et al.
2017/0337540 A1 11/2017 Buckman et al.
2017/0344931 A1 11/2017 Shenk et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0347180 A1 11/2017 Petrank
2017/0347222 A1 11/2017 Kanter
2017/0351487 A1 12/2017 Avilés-Casco Vaquero et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0359680 A1 12/2017 Ledvina et al.
2017/0359707 A1 12/2017 Diaconu et al.
2017/0365251 A1 12/2017 Park et al.
2017/0366909 A1 12/2017 Mickelsen et al.
2017/0371509 A1 12/2017 Jung et al.
2017/0371865 A1 12/2017 Eck et al.
2017/0371866 A1 12/2017 Eck
2017/0371885 A1 12/2017 Aggarwal et al.
2017/0372592 A1 12/2017 Neravati et al.
2017/0372703 A1 12/2017 Sung et al.
2017/0372719 A1 12/2017 Li et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Mng
2018/0005112 A1 1/2018 Iso-Sipila et al.
2018/0007060 A1 1/2018 Leblang et al.
2018/0007096 A1 1/2018 Levin et al.
2018/0007210 A1 1/2018 Todasco
2018/0007538 A1 1/2018 Naik et al.
2018/0012596 A1 1/2018 Piernot et al.
2018/0018248 A1 1/2018 Bhargava et al.
2018/0018331 A1 1/2018 Kesamreddy
2018/0018590 A1 1/2018 Szeto et al.
2018/0018814 A1 1/2018 Dahm et al.
2018/0018959 A1 1/2018 Jardins et al.
2018/0018973 A1 1/2018 Moreno et al.
2018/0020093 A1 1/2018 Bentitou et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0032884 A1 2/2018 Murugeshan et al.
2018/0033431 A1 2/2018 Newendorp et al.
2018/0033435 A1 2/2018 Jacobs, II
2018/0033436 A1 2/2018 Zhou
2018/0034961 A1 2/2018 Engelke et al.
2018/0039239 A1 2/2018 Burchard
2018/0040020 A1 2/2018 Kurian et al.
2018/0041571 A1 2/2018 Rogers et al.
2018/0045963 A1 2/2018 Hoover et al.
2018/0046340 A1 2/2018 Mall
2018/0046851 A1 2/2018 Kienzle et al.
2018/0047201 A1 2/2018 Filev et al.
2018/0047288 A1 2/2018 Cordell et al.
2018/0047391 A1 2/2018 Baik et al.
2018/0047393 A1 2/2018 Tian et al.
2018/0047406 A1 2/2018 Park
2018/0052885 A1 2/2018 Gaskill et al.
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0061402 A1 3/2018 Devaraj et al.
2018/0061403 A1 3/2018 Devaraj et al.
2018/0062691 A1 3/2018 Barnett, Jr.
2018/0063276 A1 3/2018 Foged
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0067929 A1 3/2018 Ahn
2018/0068074 A1 3/2018 Shen
2018/0068194 A1 3/2018 Matsuda
2018/0068660 A1 3/2018 Kawahara et al.

(56) References Cited

U.S. PATENT DOCUMENTS

| | | | |
|---|---|---|---|
| 2018/0069743 | A1 | 3/2018 | Bakken et al. |
| 2018/0069815 | A1 | 3/2018 | Fontana et al. |
| 2018/0075659 | A1 | 3/2018 | Browy et al. |
| 2018/0075847 | A1 | 3/2018 | Lee et al. |
| 2018/0075849 | A1 | 3/2018 | Khoury et al. |
| 2018/0077095 | A1 | 3/2018 | Deyle et al. |
| 2018/0077648 | A1 | 3/2018 | Nguyen |
| 2018/0081739 | A1 | 3/2018 | Gravenites et al. |
| 2018/0081884 | A1 | 3/2018 | Tan |
| 2018/0081886 | A1 | 3/2018 | Tomkins et al. |
| 2018/0082692 | A1 | 3/2018 | Khoury et al. |
| 2018/0083898 | A1 | 3/2018 | Pham |
| 2018/0088788 | A1 | 3/2018 | Cheung et al. |
| 2018/0088902 | A1 | 3/2018 | Mese et al. |
| 2018/0088969 | A1 | 3/2018 | Vanblon et al. |
| 2018/0089166 | A1 | 3/2018 | Meyer et al. |
| 2018/0089588 | A1 | 3/2018 | Ravi et al. |
| 2018/0090143 | A1 | 3/2018 | Saddler et al. |
| 2018/0091604 | A1 | 3/2018 | Yamashita et al. |
| 2018/0091732 | A1 | 3/2018 | Wilson et al. |
| 2018/0091847 | A1 | 3/2018 | Wu et al. |
| 2018/0096683 | A1 | 4/2018 | James et al. |
| 2018/0096690 | A1 | 4/2018 | Mixter et al. |
| 2018/0097812 | A1 | 4/2018 | Gillett et al. |
| 2018/0101599 | A1 | 4/2018 | Arnold et al. |
| 2018/0101925 | A1 | 4/2018 | Brinig et al. |
| 2018/0102914 | A1 | 4/2018 | Kawachi et al. |
| 2018/0103209 | A1 | 4/2018 | Fischler et al. |
| 2018/0107917 | A1 | 4/2018 | Hewavitharana et al. |
| 2018/0107945 | A1 | 4/2018 | Gao et al. |
| 2018/0108346 | A1 | 4/2018 | Paulik et al. |
| 2018/0108351 | A1 | 4/2018 | Beckhardt et al. |
| 2018/0108356 | A1 | 4/2018 | Mizumoto et al. |
| 2018/0108357 | A1 | 4/2018 | Liu |
| 2018/0109920 | A1 | 4/2018 | Aggarwal et al. |
| 2018/0113673 | A1 | 4/2018 | Sheynblat |
| 2018/0114198 | A1 | 4/2018 | Ghotbi et al. |
| 2018/0114591 | A1 | 4/2018 | Pribanic et al. |
| 2018/0121430 | A1 | 5/2018 | Kagoshima et al. |
| 2018/0121432 | A1 | 5/2018 | Parson et al. |
| 2018/0122376 | A1 | 5/2018 | Kojima |
| 2018/0122378 | A1 | 5/2018 | Mixter et al. |
| 2018/0124458 | A1 | 5/2018 | Knox |
| 2018/0126260 | A1 | 5/2018 | Chansoriya et al. |
| 2018/0129492 | A1 | 5/2018 | Singh et al. |
| 2018/0129967 | A1 | 5/2018 | Herreshoff |
| 2018/0130470 | A1 | 5/2018 | Lemay et al. |
| 2018/0130471 | A1 | 5/2018 | Trufinescu et al. |
| 2018/0137097 | A1 | 5/2018 | Lim et al. |
| 2018/0137404 | A1 | 5/2018 | Fauceglia et al. |
| 2018/0137856 | A1 | 5/2018 | Gilbert |
| 2018/0137857 | A1 | 5/2018 | Zhou et al. |
| 2018/0137865 | A1 | 5/2018 | Ling |
| 2018/0143857 | A1 | 5/2018 | Anbazhagan et al. |
| 2018/0143967 | A1 | 5/2018 | Anbazhagan et al. |
| 2018/0144465 | A1 | 5/2018 | Hsieh et al. |
| 2018/0144615 | A1 | 5/2018 | Kinney et al. |
| 2018/0144746 | A1 | 5/2018 | Mishra et al. |
| 2018/0144748 | A1 | 5/2018 | Leong |
| 2018/0146089 | A1 | 5/2018 | Rauenbuehler et al. |
| 2018/0150744 | A1 | 5/2018 | Orr et al. |
| 2018/0152557 | A1 | 5/2018 | White et al. |
| 2018/0152558 | A1 | 5/2018 | Chan et al. |
| 2018/0152803 | A1 | 5/2018 | Seefeldt et al. |
| 2018/0157372 | A1 | 6/2018 | Kurabayashi |
| 2018/0157398 | A1 | 6/2018 | Kaehler et al. |
| 2018/0157408 | A1 | 6/2018 | Yu et al. |
| 2018/0157992 | A1 | 6/2018 | Susskind et al. |
| 2018/0158548 | A1 | 6/2018 | Taheri et al. |
| 2018/0158552 | A1 | 6/2018 | Liu et al. |
| 2018/0165278 | A1 | 6/2018 | He et al. |
| 2018/0165801 | A1 | 6/2018 | Kim et al. |
| 2018/0165857 | A1 | 6/2018 | Lee et al. |
| 2018/0166076 | A1 | 6/2018 | Higuchi et al. |
| 2018/0167884 | A1 | 6/2018 | Dawid et al. |
| 2018/0173403 | A1 | 6/2018 | Carbune et al. |
| 2018/0173542 | A1 | 6/2018 | Chan et al. |
| 2018/0174406 | A1 | 6/2018 | Arashi et al. |
| 2018/0174576 | A1 | 6/2018 | Soltau et al. |
| 2018/0174597 | A1 | 6/2018 | Lee et al. |
| 2018/0181370 | A1 | 6/2018 | Parkinson |
| 2018/0182376 | A1 | 6/2018 | Gysel et al. |
| 2018/0188840 | A1 | 7/2018 | Tamura et al. |
| 2018/0188948 | A1 | 7/2018 | Ouyang et al. |
| 2018/0189267 | A1 | 7/2018 | Takiel |
| 2018/0190263 | A1 | 7/2018 | Calef, III |
| 2018/0190264 | A1 | 7/2018 | Mixter et al. |
| 2018/0190273 | A1 | 7/2018 | Karimli et al. |
| 2018/0190274 | A1 | 7/2018 | Kirazci et al. |
| 2018/0190279 | A1 | 7/2018 | Anderson et al. |
| 2018/0191670 | A1 | 7/2018 | Suyama |
| 2018/0196683 | A1 | 7/2018 | Radebaugh et al. |
| 2018/0205983 | A1 | 7/2018 | Lee et al. |
| 2018/0210874 | A1 | 7/2018 | Fuxman et al. |
| 2018/0211005 | A1 | 7/2018 | Allen |
| 2018/0213448 | A1 | 7/2018 | Segal et al. |
| 2018/0214061 | A1 | 8/2018 | Knoth et al. |
| 2018/0217810 | A1 | 8/2018 | Agrawal |
| 2018/0218735 | A1 | 8/2018 | Hunt et al. |
| 2018/0221783 | A1 | 8/2018 | Gamero |
| 2018/0224231 | A1 | 8/2018 | Weinberg |
| 2018/0225131 | A1 | 8/2018 | Tommy et al. |
| 2018/0225274 | A1 | 8/2018 | Tommy et al. |
| 2018/0232110 | A1 | 8/2018 | Cheung et al. |
| 2018/0232203 | A1 | 8/2018 | Gelfenbeyn et al. |
| 2018/0232608 | A1 | 8/2018 | Pradeep et al. |
| 2018/0232688 | A1 | 8/2018 | Pike et al. |
| 2018/0233132 | A1 | 8/2018 | Herold et al. |
| 2018/0233140 | A1 | 8/2018 | Koishida et al. |
| 2018/0233142 | A1 | 8/2018 | Koishida et al. |
| 2018/0247065 | A1 | 8/2018 | Rhee et al. |
| 2018/0253209 | A1 | 9/2018 | Jaygarl et al. |
| 2018/0253652 | A1 | 9/2018 | Palzer et al. |
| 2018/0260680 | A1 | 9/2018 | Finkelstein et al. |
| 2018/0267952 | A1 | 9/2018 | Osborne et al. |
| 2018/0268023 | A1 | 9/2018 | Korpusik et al. |
| 2018/0268106 | A1 | 9/2018 | Velaga |
| 2018/0268337 | A1 | 9/2018 | Miller et al. |
| 2018/0270343 | A1 | 9/2018 | Rout et al. |
| 2018/0275839 | A1 | 9/2018 | Kocienda et al. |
| 2018/0276197 | A1 | 9/2018 | Nell et al. |
| 2018/0277113 | A1 | 9/2018 | Hartung et al. |
| 2018/0278740 | A1 | 9/2018 | Choi et al. |
| 2018/0285056 | A1 | 10/2018 | Cutler et al. |
| 2018/0288104 | A1 | 10/2018 | Padilla et al. |
| 2018/0293086 | A1 | 10/2018 | Laird-McConnell et al. |
| 2018/0293984 | A1 | 10/2018 | Lindahl |
| 2018/0293988 | A1 | 10/2018 | Huang et al. |
| 2018/0293989 | A1 | 10/2018 | De et al. |
| 2018/0299878 | A1 | 10/2018 | Cella et al. |
| 2018/0300317 | A1 | 10/2018 | Bradbury |
| 2018/0300400 | A1 | 10/2018 | Paulus |
| 2018/0300608 | A1 | 10/2018 | Sevrens et al. |
| 2018/0300952 | A1 | 10/2018 | Evans et al. |
| 2018/0307216 | A1 | 10/2018 | Ypma et al. |
| 2018/0307603 | A1 | 10/2018 | Che |
| 2018/0308470 | A1 | 10/2018 | Park et al. |
| 2018/0308477 | A1 | 10/2018 | Nagasaka |
| 2018/0308480 | A1 | 10/2018 | Jang et al. |
| 2018/0308485 | A1 | 10/2018 | Kudurshian et al. |
| 2018/0308486 | A1 | 10/2018 | Saddler et al. |
| 2018/0308491 | A1 | 10/2018 | Oktem et al. |
| 2018/0314362 | A1 | 11/2018 | Kim et al. |
| 2018/0314552 | A1 | 11/2018 | Kim et al. |
| 2018/0314689 | A1 | 11/2018 | Wang et al. |
| 2018/0314981 | A1 | 11/2018 | Chen |
| 2018/0315415 | A1 | 11/2018 | Mosley et al. |
| 2018/0315416 | A1 | 11/2018 | Berthelsen et al. |
| 2018/0322112 | A1 | 11/2018 | Bellegarda et al. |
| 2018/0322881 | A1 | 11/2018 | Min et al. |
| 2018/0324518 | A1 | 11/2018 | Dusan et al. |
| 2018/0329508 | A1 | 11/2018 | Klein et al. |
| 2018/0329512 | A1 | 11/2018 | Liao et al. |
| 2018/0329677 | A1 | 11/2018 | Gruber et al. |

(56) References Cited

U.S. PATENT DOCUMENTS

2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0332389 A1 11/2018 Ekkizogloy et al.
2018/0335903 A1 11/2018 Coffman et al.
2018/0336006 A1 11/2018 Chakraborty et al.
2018/0336049 A1 11/2018 Mukherjee et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336880 A1 11/2018 Arik et al.
2018/0336885 A1 11/2018 Mukherjee et al.
2018/0336892 A1 11/2018 Kim et al.
2018/0336893 A1 11/2018 Robinson et al.
2018/0336894 A1 11/2018 Graham et al.
2018/0336904 A1 11/2018 Piercy et al.
2018/0336905 A1 11/2018 Kim et al.
2018/0336911 A1 11/2018 Dahl et al.
2018/0336920 A1 11/2018 Bastian et al.
2018/0338191 A1 11/2018 Van Scheltinga et al.
2018/0341643 A1 11/2018 Alders et al.
2018/0342243 A1 11/2018 Vanblon et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0349728 A1 12/2018 Wang et al.
2018/0350345 A1 12/2018 Naik
2018/0350353 A1 12/2018 Gruber et al.
2018/0357073 A1 12/2018 Johnson et al.
2018/0357308 A1 12/2018 Cheyer
2018/0358015 A1 12/2018 Cash et al.
2018/0358019 A1 12/2018 Mont-Reynaud
2018/0365091 A1 12/2018 Donaldson et al.
2018/0365653 A1 12/2018 Cleaver et al.
2018/0366105 A1 12/2018 Kim
2018/0366110 A1 12/2018 Hashem et al.
2018/0366116 A1 12/2018 Nicholson et al.
2018/0366118 A1 12/2018 Lovitt et al.
2018/0373487 A1 12/2018 Gruber et al.
2018/0373493 A1 12/2018 Watson et al.
2018/0373796 A1 12/2018 Rathod
2018/0374484 A1 12/2018 Huang et al.
2019/0005024 A1 1/2019 Somech et al.
2019/0007228 A1 1/2019 Vuskovic et al.
2019/0012141 A1 1/2019 Piersol et al.
2019/0012198 A1 1/2019 Ni et al.
2019/0012445 A1 1/2019 Lesso et al.
2019/0012449 A1 1/2019 Cheyer
2019/0012599 A1 1/2019 El Kaliouby et al.
2019/0013018 A1 1/2019 Rekstad
2019/0013025 A1 1/2019 Alcorn et al.
2019/0014450 A1 1/2019 Gruber et al.
2019/0019077 A1 1/2019 Griffin et al.
2019/0019508 A1 1/2019 Rochford et al.
2019/0020482 A1 1/2019 Gupta et al.
2019/0027135 A1 1/2019 Kim et al.
2019/0027152 A1 1/2019 Huang et al.
2019/0034040 A1 1/2019 Shah et al.
2019/0034826 A1 1/2019 Ahmad et al.
2019/0035385 A1 1/2019 Lawson et al.
2019/0035405 A1 1/2019 Haughay
2019/0037258 A1 1/2019 Lewis et al.
2019/0042059 A1 2/2019 Baer
2019/0042560 A1 2/2019 Kakirwar et al.
2019/0042561 A1 2/2019 Kakirwar et al.
2019/0042627 A1 2/2019 Osotio et al.
2019/0043507 A1 2/2019 Huang et al.
2019/0044854 A1 2/2019 Yang et al.
2019/0045040 A1 2/2019 Lee et al.
2019/0050450 A1 2/2019 Uszkoreit
2019/0051306 A1 2/2019 Torama et al.
2019/0051309 A1 2/2019 Kim et al.
2019/0057533 A1 2/2019 Habra
2019/0057697 A1 2/2019 Giuli et al.
2019/0065027 A1 2/2019 Hauenstein et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0073607 A1 3/2019 Jia et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0079662 A1 3/2019 Wan et al.
2019/0079724 A1 3/2019 Feuz et al.
2019/0080685 A1 3/2019 Johnson, Jr.
2019/0080698 A1 3/2019 Miller
2019/0082044 A1 3/2019 Melendez et al.
2019/0087205 A1 3/2019 Guday
2019/0087412 A1 3/2019 Seyed Ibrahim et al.
2019/0087455 A1 3/2019 He et al.
2019/0090812 A1 3/2019 Martin et al.
2019/0095050 A1 3/2019 Gruber et al.
2019/0095069 A1 3/2019 Proctor et al.
2019/0095171 A1 3/2019 Carson et al.
2019/0095522 A1 3/2019 Galitsky
2019/0095535 A1 3/2019 Miller et al.
2019/0096134 A1 3/2019 Amacker et al.
2019/0102145 A1 4/2019 Wilberding et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0108834 A1 4/2019 Nelson et al.
2019/0114320 A1 4/2019 Patwardhan et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129499 A1 5/2019 Li
2019/0129615 A1 5/2019 Sundar et al.
2019/0129749 A1 5/2019 White et al.
2019/0130901 A1 5/2019 Kato et al.
2019/0132694 A1 5/2019 Hanes et al.
2019/0134501 A1 5/2019 Feder et al.
2019/0138268 A1 5/2019 Andersen et al.
2019/0138661 A1 5/2019 Paltanavicius et al.
2019/0138704 A1 5/2019 Shrivastava et al.
2019/0139058 A1 5/2019 Clark et al.
2019/0139541 A1 5/2019 Andersen et al.
2019/0139563 A1 5/2019 Chen et al.
2019/0141494 A1 5/2019 Gross et al.
2019/0146219 A1 5/2019 Rodriguez, II
2019/0147052 A1 5/2019 Lu et al.
2019/0147369 A1 5/2019 Gupta et al.
2019/0147869 A1 5/2019 Wang
2019/0147880 A1 5/2019 Booker et al.
2019/0147883 A1 5/2019 Mellenthin et al.
2019/0149972 A1 5/2019 Parks et al.
2019/0156830 A1 5/2019 Devaraj et al.
2019/0158994 A1 5/2019 Gross et al.
2019/0163667 A1 5/2019 Feuz et al.
2019/0164546 A1 5/2019 Piernot et al.
2019/0172243 A1 6/2019 Mishra et al.
2019/0172458 A1 6/2019 Mishra et al.
2019/0172465 A1 6/2019 Lee et al.
2019/0172467 A1 6/2019 Kim et al.

(56) References Cited

U.S. PATENT DOCUMENTS

2019/0173996 A1 6/2019 Butcher et al.
2019/0179607 A1 6/2019 Thangarathnam et al.
2019/0179890 A1 6/2019 Evermann
2019/0180749 A1 6/2019 Carey et al.
2019/0180750 A1 6/2019 Renard et al.
2019/0180770 A1 6/2019 Kothari et al.
2019/0182176 A1 6/2019 Niewczas
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0190898 A1 6/2019 Cui
2019/0197053 A1 6/2019 Graham et al.
2019/0197119 A1 6/2019 Zhang et al.
2019/0199657 A1 6/2019 Fawcett et al.
2019/0206397 A1 7/2019 Zhou
2019/0213498 A1 7/2019 Adjaoute
2019/0213601 A1 7/2019 Hackman et al.
2019/0213774 A1 7/2019 Jiao et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0220704 A1 7/2019 Schulz-Trieglaff et al.
2019/0220727 A1 7/2019 Dohrmann et al.
2019/0222684 A1 7/2019 Li et al.
2019/0224049 A1 7/2019 Creasy et al.
2019/0228179 A1 7/2019 Rakshit et al.
2019/0228581 A1 7/2019 Dascola et al.
2019/0230215 A1 7/2019 Zhu et al.
2019/0230426 A1 7/2019 Chun
2019/0235887 A1 8/2019 Hemaraj et al.
2019/0236130 A1 8/2019 Li et al.
2019/0236459 A1 8/2019 Cheyer et al.
2019/0237061 A1 8/2019 Rusak et al.
2019/0243902 A1 8/2019 Saeki et al.
2019/0244604 A1 8/2019 Masataki et al.
2019/0244618 A1 8/2019 Newendorp et al.
2019/0244619 A1 8/2019 Kwon et al.
2019/0251167 A1 8/2019 Krishnapura Subbaraya et al.
2019/0251339 A1 8/2019 Hawker
2019/0251960 A1 8/2019 Maker et al.
2019/0251972 A1 8/2019 Li
2019/0258852 A1 8/2019 Shimauchi et al.
2019/0259386 A1 8/2019 Kudurshian et al.
2019/0260836 A1 8/2019 Zahl et al.
2019/0265886 A1 8/2019 Moon et al.
2019/0266246 A1 8/2019 Wang et al.
2019/0272318 A1 9/2019 Suzuki et al.
2019/0272818 A1 9/2019 Fernandez et al.
2019/0272825 A1 9/2019 O'malley et al.
2019/0272831 A1 9/2019 Kajarekar
2019/0273963 A1 9/2019 Jobanputra et al.
2019/0278841 A1 9/2019 Pusateri et al.
2019/0279618 A1 9/2019 Yadav et al.
2019/0279622 A1 9/2019 Liu et al.
2019/0281387 A1 9/2019 Woo et al.
2019/0287012 A1 9/2019 Celikyilmaz et al.
2019/0287522 A1 9/2019 Lambourne et al.
2019/0290965 A1 9/2019 Oren
2019/0294769 A1 9/2019 Lesso
2019/0294962 A1 9/2019 Vezer et al.
2019/0295529 A1 9/2019 Tomita
2019/0295540 A1 9/2019 Grima
2019/0295542 A1 9/2019 Huang et al.
2019/0295544 A1 9/2019 Garcia et al.
2019/0303442 A1 10/2019 Peitz et al.
2019/0303504 A1 10/2019 Pasumarthy
2019/0304438 A1 10/2019 Qian et al.
2019/0310765 A1 10/2019 Napolitano et al.
2019/0311031 A1 10/2019 Powell et al.
2019/0311708 A1 10/2019 Bengio et al.
2019/0311720 A1 10/2019 Pasko
2019/0318219 A1 10/2019 Arora et al.
2019/0318722 A1 10/2019 Bromand
2019/0318724 A1 10/2019 Chao et al.
2019/0318725 A1 10/2019 Le Roux et al.
2019/0318732 A1 10/2019 Huang et al.
2019/0318735 A1 10/2019 Chao et al.
2019/0318739 A1 10/2019 Garg et al.
2019/0324780 A1 10/2019 Zhu et al.
2019/0324925 A1 10/2019 Toyoda et al.
2019/0325081 A1 10/2019 Liu et al.
2019/0325866 A1 10/2019 Bromand et al.
2019/0333523 A1 10/2019 Kim et al.
2019/0335567 A1 10/2019 Boudreau et al.
2019/0339784 A1 11/2019 Lemay et al.
2019/0340252 A1 11/2019 Huyghe
2019/0340419 A1 11/2019 Milman et al.
2019/0341027 A1 11/2019 Vescovi et al.
2019/0341056 A1 11/2019 Paulik et al.
2019/0347063 A1 11/2019 Liu et al.
2019/0347525 A1 11/2019 Liem et al.
2019/0348022 A1 11/2019 Park et al.
2019/0349333 A1 11/2019 Pickover et al.
2019/0349622 A1 11/2019 Kim et al.
2019/0354252 A1 11/2019 Badr
2019/0354256 A1 11/2019 Karunamuni et al.
2019/0354548 A1 11/2019 Orr et al.
2019/0354675 A1 11/2019 Gan et al.
2019/0355346 A1 11/2019 Bellegarda
2019/0355384 A1 11/2019 Sereshki et al.
2019/0361729 A1 11/2019 Gruber et al.
2019/0361978 A1 11/2019 Ray et al.
2019/0362252 A1 11/2019 Miller et al.
2019/0362557 A1 11/2019 Lacey et al.
2019/0369748 A1 12/2019 Hindi et al.
2019/0369842 A1 12/2019 Dolbakian et al.
2019/0369868 A1 12/2019 Tang et al.
2019/0370292 A1 12/2019 Irani et al.
2019/0370323 A1 12/2019 Davidson et al.
2019/0370443 A1 12/2019 Lesso
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2019/0377425 A1 12/2019 Ryu et al.
2019/0377955 A1 12/2019 Swaminathan et al.
2019/0378493 A1 12/2019 Kim et al.
2019/0385043 A1 12/2019 Choudhary et al.
2019/0385418 A1 12/2019 Mixter et al.
2019/0387352 A1 12/2019 Jot et al.
2019/0391726 A1 12/2019 Iskandar et al.
2019/0394547 A1 12/2019 Lemons et al.
2020/0005779 A1 1/2020 Liao et al.
2020/0012718 A1 1/2020 Kung et al.
2020/0019609 A1 1/2020 Yu et al.
2020/0020326 A1 1/2020 Srinivasan et al.
2020/0027455 A1 1/2020 Sugiyama et al.
2020/0034421 A1 1/2020 Ferrucci et al.
2020/0035224 A1 1/2020 Ward et al.
2020/0042334 A1 2/2020 Radebaugh et al.
2020/0043467 A1 2/2020 Qian et al.
2020/0043471 A1 2/2020 Ma et al.
2020/0043482 A1 2/2020 Gruber et al.
2020/0043485 A1 2/2020 Tonetti et al.
2020/0043489 A1 2/2020 Bradley et al.
2020/0044485 A1 2/2020 Smith et al.
2020/0045164 A1 2/2020 Kwatra et al.
2020/0051554 A1 2/2020 Kim et al.
2020/0051565 A1 2/2020 Singh
2020/0051583 A1 2/2020 Wu et al.
2020/0053218 A1 2/2020 Gray
2020/0058299 A1 2/2020 Lee et al.
2020/0065601 A1 2/2020 Andreassen
2020/0066236 A1 2/2020 Giusti et al.
2020/0073629 A1 3/2020 Lee et al.
2020/0074993 A1 3/2020 Lee et al.
2020/0075018 A1 3/2020 Chen
2020/0075040 A1 3/2020 Provost et al.

(56) References Cited

U.S. PATENT DOCUMENTS

2020/0076538 A1 3/2020 Soultan et al.
2020/0081615 A1 3/2020 Lu et al.
2020/0082807 A1 3/2020 Kim et al.
2020/0084572 A1 3/2020 Jadav et al.
2020/0090393 A1 3/2020 Shin et al.
2020/0090653 A1 3/2020 Luo
2020/0090658 A1 3/2020 Shin et al.
2020/0091958 A1 3/2020 Curtis et al.
2020/0092625 A1 3/2020 Raffle
2020/0098346 A1 3/2020 Kemmerer et al.
2020/0098352 A1 3/2020 Feinstein et al.
2020/0098362 A1 3/2020 Piernot et al.
2020/0098368 A1 3/2020 Lemay et al.
2020/0103963 A1 4/2020 Kelly et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0112454 A1 4/2020 Brown et al.
2020/0117717 A1 4/2020 Ramamurti et al.
2020/0118566 A1 4/2020 Zhou
2020/0118568 A1 4/2020 Kudurshian et al.
2020/0125820 A1 4/2020 Kim et al.
2020/0126547 A1 4/2020 Truong et al.
2020/0127988 A1 4/2020 Bradley et al.
2020/0134316 A1 4/2020 Krishnamurthy et al.
2020/0135180 A1 4/2020 Mukherjee et al.
2020/0135209 A1 4/2020 Delfarah et al.
2020/0135212 A1 4/2020 Cho et al.
2020/0135213 A1 4/2020 Kim et al.
2020/0135226 A1 4/2020 Mittal et al.
2020/0137230 A1 4/2020 Spohrer
2020/0142505 A1 5/2020 Choi et al.
2020/0142554 A1 5/2020 Lin et al.
2020/0143330 A1 5/2020 Perumalla et al.
2020/0143812 A1 5/2020 Walker et al.
2020/0143819 A1 5/2020 Delcroix et al.
2020/0152186 A1 5/2020 Koh et al.
2020/0152187 A1 5/2020 Kline et al.
2020/0159579 A1 5/2020 Shear et al.
2020/0159609 A1 5/2020 Korotaev et al.
2020/0159651 A1 5/2020 Myers
2020/0159801 A1 5/2020 Sekine
2020/0160179 A1 5/2020 Chien et al.
2020/0160838 A1 5/2020 Lee
2020/0168120 A1 5/2020 Rodriguez Bravo
2020/0168220 A1 5/2020 Magielse et al.
2020/0169637 A1 5/2020 Sanghavi et al.
2020/0175566 A1 6/2020 Bender et al.
2020/0175961 A1 6/2020 Thomson et al.
2020/0175975 A1 6/2020 Kong et al.
2020/0176004 A1 6/2020 Kleijn et al.
2020/0176018 A1 6/2020 Feinauer et al.
2020/0184057 A1 6/2020 Mukund
2020/0184964 A1 6/2020 Myers et al.
2020/0184966 A1 6/2020 Yavagal
2020/0193997 A1 6/2020 Piernot et al.
2020/0194000 A1 6/2020 Xian et al.
2020/0210142 A1 7/2020 Mu et al.
2020/0211546 A1 7/2020 Schairer et al.
2020/0211566 A1 7/2020 Kang et al.
2020/0218074 A1 7/2020 Hoover et al.
2020/0218780 A1 7/2020 Mei et al.
2020/0218805 A1 7/2020 Liu et al.
2020/0219517 A1 7/2020 Wang et al.
2020/0220914 A1 7/2020 Carrigan et al.
2020/0221155 A1 7/2020 Hansen et al.
2020/0226481 A1 7/2020 Sim et al.
2020/0226554 A1 7/2020 Luna
2020/0226823 A1 7/2020 Stachniak et al.
2020/0227034 A1 7/2020 Summa et al.
2020/0227044 A1 7/2020 Lindahl
2020/0228774 A1 7/2020 Kar et al.
2020/0243069 A1 7/2020 Amores et al.
2020/0243094 A1 7/2020 Thomson et al.
2020/0249985 A1 8/2020 Zeitlin
2020/0251111 A1 8/2020 Temkin et al.
2020/0252508 A1 8/2020 Gray
2020/0258508 A1 8/2020 Aggarwal et al.
2020/0258512 A1 8/2020 Smith et al.
2020/0258513 A1 8/2020 Smith et al.
2020/0259951 A1 8/2020 Arshad
2020/0264741 A1 8/2020 Kreiner et al.
2020/0267222 A1 8/2020 Phipps et al.
2020/0267427 A1 8/2020 Rogers et al.
2020/0267503 A1 8/2020 Watkins et al.
2020/0272485 A1 8/2020 Karashchuk et al.
2020/0273448 A1 8/2020 Min et al.
2020/0275216 A1 8/2020 Mckinney et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0294487 A1 9/2020 Donohoe et al.
2020/0294494 A1 9/2020 Suyama et al.
2020/0294508 A1 9/2020 Kwasiborski et al.
2020/0298394 A1 9/2020 Han et al.
2020/0301950 A1 9/2020 Lorrain-Hale et al.
2020/0302112 A1 9/2020 Helmbro et al.
2020/0302356 A1 9/2020 Gruber et al.
2020/0302919 A1 9/2020 Greborio et al.
2020/0302925 A1 9/2020 Shah et al.
2020/0302930 A1 9/2020 Chen et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0310513 A1 10/2020 Nicholson et al.
2020/0312315 A1 10/2020 Li et al.
2020/0312317 A1 10/2020 Kothari et al.
2020/0312547 A1* 10/2020 Zeng .................... H01F 41/005
2020/0314191 A1 10/2020 Madhavan et al.
2020/0314565 A1 10/2020 Sigwanz et al.
2020/0319850 A1 10/2020 Stasior et al.
2020/0320592 A1 10/2020 Soule et al.
2020/0320988 A1 10/2020 Rastogi et al.
2020/0322571 A1 10/2020 Awai
2020/0327895 A1 10/2020 Gruber et al.
2020/0333875 A1 10/2020 Bansal et al.
2020/0334068 A1 10/2020 Krishnamurthy et al.
2020/0334492 A1 10/2020 Yuan et al.
2020/0334524 A1 10/2020 Sprague et al.
2020/0335121 A1 10/2020 Mosseri et al.
2020/0335128 A1 10/2020 Sheeder et al.
2020/0341546 A1 10/2020 Yuan et al.
2020/0342082 A1 10/2020 Sapozhnykov et al.
2020/0342182 A1 10/2020 Premkumar et al.
2020/0342849 A1 10/2020 Yu et al.
2020/0342858 A1 10/2020 Gupta et al.
2020/0342862 A1 10/2020 Gao et al.
2020/0342863 A1 10/2020 Aggarwal et al.
2020/0348813 A1 11/2020 Sharifi et al.
2020/0349415 A1 11/2020 Raju
2020/0356243 A1 11/2020 Meyer et al.
2020/0356585 A1 11/2020 Tomkins et al.
2020/0356589 A1 11/2020 Rekik et al.
2020/0356610 A1 11/2020 Coimbra et al.
2020/0356634 A1 11/2020 Srinivasan et al.
2020/0357387 A1 11/2020 Prabhavalkar et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0364858 A1 11/2020 Kaethner et al.
2020/0365134 A1 11/2020 Tu et al.
2020/0365155 A1 11/2020 Milden
2020/0367006 A1 11/2020 Beckhardt
2020/0372633 A1 11/2020 Lee et al.
2020/0372719 A1 11/2020 Andjelic et al.
2020/0372904 A1 11/2020 Vescovi et al.
2020/0372905 A1 11/2020 Wang et al.

(56) References Cited

U.S. PATENT DOCUMENTS

2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380974 A1 12/2020 Gallagher et al.
2020/0380980 A1 12/2020 Shum et al.
2020/0380984 A1 12/2020 Venkatraman et al.
2020/0380985 A1 12/2020 Gada et al.
2020/0382568 A1 12/2020 Krochmal et al.
2020/0382616 A1 12/2020 Vaishampayan et al.
2020/0382635 A1 12/2020 Vora et al.
2020/0394436 A1 12/2020 Rakshit et al.
2020/0411002 A1 12/2020 Lee et al.
2021/0006943 A1 1/2021 Gross et al.
2021/0011557 A1 1/2021 Lemay et al.
2021/0012113 A1 1/2021 Petill et al.
2021/0012775 A1 1/2021 Kang et al.
2021/0012776 A1 1/2021 Peterson et al.
2021/0026896 A1 1/2021 Easton et al.
2021/0027785 A1 1/2021 Kahan et al.
2021/0035429 A1 2/2021 Daoura et al.
2021/0035556 A1 2/2021 Shen et al.
2021/0035567 A1 2/2021 Newendorp et al.
2021/0043190 A1 2/2021 Wang et al.
2021/0044870 A1 2/2021 Li et al.
2021/0049237 A1 2/2021 Demme et al.
2021/0065698 A1 3/2021 Topcu et al.
2021/0067470 A1 3/2021 Freed et al.
2021/0067631 A1 3/2021 Van Os et al.
2021/0072953 A1 3/2021 Amarilio et al.
2021/0073254 A1 3/2021 Ghafourifar et al.
2021/0073293 A1 3/2021 Fenton et al.
2021/0073713 A1 3/2021 Balasubramanian et al.
2021/0074264 A1 3/2021 Liang et al.
2021/0074295 A1 3/2021 Moreno et al.
2021/0081749 A1 3/2021 Claire
2021/0082400 A1 3/2021 Vishnoi et al.
2021/0082420 A1 3/2021 Kraljic et al.
2021/0089124 A1 3/2021 Manjunath et al.
2021/0089724 A1 3/2021 Luong et al.
2021/0090314 A1 3/2021 Hussen Abdelaziz et al.
2021/0092128 A1 3/2021 Leblang
2021/0097134 A1 4/2021 Livshits et al.
2021/0097776 A1 4/2021 Faulkner et al.
2021/0097998 A1 4/2021 Kim et al.
2021/0099317 A1 4/2021 Hilleli et al.
2021/0104232 A1 4/2021 Lee et al.
2021/0104236 A1 4/2021 Doggett et al.
2021/0105528 A1 4/2021 Van Os et al.
2021/0110106 A1 4/2021 Vescovi et al.
2021/0110115 A1 4/2021 Hermann et al.
2021/0110254 A1 4/2021 Hoang et al.
2021/0117214 A1 4/2021 Presant et al.
2021/0117479 A1 4/2021 Liu et al.
2021/0124417 A1 4/2021 Ma
2021/0124597 A1 4/2021 Ramakrishnan et al.
2021/0127031 A1 4/2021 Kanemoto
2021/0127220 A1 4/2021 Parvaix et al.
2021/0134318 A1 5/2021 Harvey et al.
2021/0141839 A1 5/2021 Tang et al.
2021/0142782 A1 5/2021 Wolf et al.
2021/0143987 A1 5/2021 Xu et al.
2021/0144251 A1 5/2021 Chen
2021/0149629 A1 5/2021 Martel et al.
2021/0149996 A1 5/2021 Bellegarda
2021/0150151 A1 5/2021 Xu et al.
2021/0151041 A1 5/2021 Gruber et al.
2021/0151053 A1 5/2021 Takahashi et al.
2021/0151070 A1 5/2021 Binder et al.
2021/0152684 A1 5/2021 Weinstein et al.
2021/0158814 A1 5/2021 Hussain et al.
2021/0165826 A1 6/2021 Graham et al.
2021/0173555 A1 6/2021 Raja et al.
2021/0174020 A1 6/2021 Sohn et al.
2021/0174022 A1 6/2021 Ishikawa et al.
2021/0174403 A1 6/2021 Bellini et al.
2021/0176521 A1 6/2021 Matthews
2021/0182324 A1 6/2021 Raju
2021/0182716 A1 6/2021 Muramoto et al.
2021/0191603 A1 6/2021 Napolitano et al.
2021/0191968 A1 6/2021 Orr et al.
2021/0208752 A1 7/2021 Hwang
2021/0208841 A1 7/2021 Wilberding
2021/0209304 A1 7/2021 Yang et al.
2021/0210089 A1 7/2021 Ma et al.
2021/0210100 A1 7/2021 Wang et al.
2021/0216134 A1 7/2021 Fukunaga et al.
2021/0216760 A1 7/2021 Howell et al.
2021/0224032 A1 7/2021 Orr et al.
2021/0224474 A1 7/2021 Bellegarda et al.
2021/0233532 A1 7/2021 Kudurshian et al.
2021/0241099 A1 8/2021 Li et al.
2021/0247959 A1 8/2021 Agarwal et al.
2021/0248804 A1 8/2021 Hussen Abdelaziz et al.
2021/0249009 A1 8/2021 Manjunath et al.
2021/0256031 A1 8/2021 Krogh et al.
2021/0256980 A1 8/2021 George-Svahn et al.
2021/0258554 A1 8/2021 Bruls et al.
2021/0258881 A1 8/2021 Freeman et al.
2021/0264913 A1 8/2021 Schramm et al.
2021/0264916 A1 8/2021 Kim et al.
2021/0266725 A1 8/2021 Gray
2021/0271333 A1 9/2021 Hindi et al.
2021/0273894 A1 9/2021 Tian et al.
2021/0278956 A1 9/2021 Dolbakian et al.
2021/0279548 A1 9/2021 Adan et al.
2021/0280180 A1 9/2021 Skobeltsyn et al.
2021/0281965 A1 9/2021 Malik et al.
2021/0287080 A1 9/2021 Moloney
2021/0294569 A1 9/2021 Piersol et al.
2021/0294571 A1 9/2021 Carson et al.
2021/0295602 A1 9/2021 Scapel et al.
2021/0303116 A1 9/2021 Barlow
2021/0303342 A1 9/2021 Dunn et al.
2021/0303798 A1 9/2021 Duong et al.
2021/0304075 A1 9/2021 Duong et al.
2021/0306812 A1 9/2021 Gross et al.
2021/0312138 A1 10/2021 Kaplan
2021/0312917 A1 10/2021 Weksler et al.
2021/0312930 A1 10/2021 Sugaya
2021/0312931 A1 10/2021 Paulik et al.
2021/0313019 A1 10/2021 Pribanic et al.
2021/0314440 A1 10/2021 Matias et al.
2021/0318901 A1 10/2021 Gruber et al.
2021/0319178 A1 10/2021 Zhang
2021/0327409 A1 10/2021 Naik
2021/0327410 A1 10/2021 Beaufays et al.
2021/0334306 A1 10/2021 Bo et al.
2021/0334528 A1 10/2021 Bray et al.
2021/0335342 A1 10/2021 Yuan et al.
2021/0342050 A1 11/2021 Wang
2021/0342212 A1 11/2021 Neumann
2021/0349605 A1 11/2021 Nonaka et al.
2021/0349608 A1 11/2021 Blatz et al.
2021/0350799 A1 11/2021 Hansen et al.
2021/0350803 A1 11/2021 Hansen et al.
2021/0350810 A1 11/2021 Phipps et al.
2021/0352115 A1 11/2021 Hansen et al.
2021/0357172 A1 11/2021 Sinesio et al.
2021/0357179 A1 11/2021 Takeshita
2021/0358294 A1 11/2021 Parashar et al.
2021/0365161 A1 11/2021 Ellis et al.
2021/0365174 A1 11/2021 Ellis et al.
2021/0365641 A1 11/2021 Zhang et al.
2021/0365863 A1 11/2021 Friske et al.
2021/0366473 A1 11/2021 Maeng
2021/0366475 A1 11/2021 Wilkosz et al.

(56) References Cited

U.S. PATENT DOCUMENTS

2021/0366480 A1 11/2021 Lemay et al.
2021/0373851 A1 12/2021 Stasior et al.
2021/0375275 A1 12/2021 Yoon et al.
2021/0375290 A1 12/2021 Hu et al.
2021/0377381 A1 12/2021 Aggarwal et al.
2021/0390259 A1 12/2021 Hildick-Smith et al.
2021/0390955 A1 12/2021 Piernot et al.
2021/0393168 A1 12/2021 Santarelli et al.
2021/0398187 A1 12/2021 Narayanan et al.
2021/0402306 A1 12/2021 Huang
2021/0406260 A1 12/2021 Sharifi et al.
2021/0407318 A1 12/2021 Pitschel et al.
2021/0407502 A1 12/2021 Vescovi et al.
2022/0004825 A1 1/2022 Xie et al.
2022/0013106 A1 1/2022 Deng et al.
2022/0019292 A1 1/2022 Lemay et al.
2022/0020367 A1 1/2022 Orkin et al.
2022/0021631 A1 1/2022 Jina et al.
2022/0021978 A1 1/2022 Gui et al.
2022/0028379 A1 1/2022 Carbune et al.
2022/0028387 A1 1/2022 Walker et al.
2022/0030345 A1 1/2022 Gong et al.
2022/0035999 A1 2/2022 Pawelec
2022/0036270 A1 2/2022 Benyo et al.
2022/0040304 A1 2/2022 Kim et al.
2022/0043986 A1 2/2022 Nell et al.
2022/0046310 A1 2/2022 Shin et al.
2022/0050661 A1 2/2022 Lange et al.
2022/0050876 A1 2/2022 Kang et al.
2022/0067283 A1 3/2022 Bellegarda et al.
2022/0068274 A1 3/2022 D'Alessandro
2022/0068278 A1 3/2022 York et al.
2022/0083188 A1 3/2022 Lin
2022/0083986 A1 3/2022 Duffy et al.
2022/0084511 A1 3/2022 Nickson et al.
2022/0092262 A1 3/2022 Ni et al.
2022/0093088 A1 3/2022 Sridhar et al.
2022/0093093 A1 3/2022 Krishnan et al.
2022/0093095 A1 3/2022 Dighe et al.
2022/0093098 A1 3/2022 Samal et al.
2022/0093101 A1 3/2022 Krishnan et al.
2022/0093109 A1 3/2022 Orr et al.
2022/0093110 A1 3/2022 Kim et al.
2022/0094765 A1 3/2022 Niewczas
2022/0100772 A1 3/2022 Raghura et al.
2022/0100789 A1 3/2022 Kumar et al.
2022/0103491 A1 3/2022 Yang et al.
2022/0107780 A1 4/2022 Gruber et al.
2022/0108081 A1 4/2022 Dymetman et al.
2022/0114327 A1 4/2022 Faaborg et al.
2022/0115016 A1 4/2022 Whalin
2022/0115020 A1 4/2022 Bradley et al.
2022/0122615 A1 4/2022 Chen et al.
2022/0130126 A1 4/2022 Delgado et al.
2022/0139396 A1 5/2022 Gada et al.
2022/0148587 A1 5/2022 Drummie et al.
2022/0155857 A1 5/2022 Lee et al.
2022/0156041 A1 5/2022 Newendorp et al.
2022/0157310 A1 5/2022 Newendorp et al.
2022/0157315 A1 5/2022 Raux et al.
2022/0157317 A1 5/2022 Burakov et al.
2022/0180857 A1 6/2022 Aharoni et al.
2022/0180866 A1 6/2022 Sharifi et al.
2022/0180868 A1 6/2022 Sharifi et al.
2022/0197491 A1 6/2022 Meyer et al.
2022/0198025 A1 6/2022 Gupta et al.
2022/0206298 A1 6/2022 Goodman
2022/0214775 A1 7/2022 Shah et al.
2022/0215159 A1 7/2022 Qian et al.
2022/0222437 A1 7/2022 Lauber
2022/0223154 A1 7/2022 Zhou et al.
2022/0229985 A1 7/2022 Bellegarda et al.
2022/0230000 A1 7/2022 Jalaluddin et al.
2022/0230653 A1 7/2022 Binder et al.
2022/0253969 A1 8/2022 Kamenetskaya et al.
2022/0254338 A1 8/2022 Gruber et al.
2022/0254339 A1 8/2022 Acero et al.
2022/0254341 A1 8/2022 Naganna et al.
2022/0254347 A1 8/2022 Lindahl
2022/0255885 A1 8/2022 Aharoni et al.
2022/0261468 A1 8/2022 Lin et al.
2022/0261769 A1 8/2022 Vellanti
2022/0262354 A1 8/2022 Greborio et al.
2022/0264262 A1 8/2022 Gruber et al.
2022/0277505 A1 9/2022 Baszucki et al.
2022/0284901 A1 9/2022 Novitchenko et al.
2022/0291792 A1 9/2022 Alston
2022/0291816 A1 9/2022 Fan et al.
2022/0292128 A1 9/2022 Sharifi et al.
2022/0293124 A1 9/2022 Weinberg et al.
2022/0293125 A1 9/2022 Maddika et al.
2022/0295170 A1 9/2022 Ito et al.
2022/0300094 A1 9/2022 Hindi et al.
2022/0301549 A1 9/2022 Lee et al.
2022/0301566 A1 9/2022 Van Os et al.
2022/0308718 A1 9/2022 Klein et al.
2022/0310056 A1 9/2022 Ramabhadran et al.
2022/0318248 A1 10/2022 Liang et al.
2022/0329691 A1 10/2022 Chinthakunta et al.
2022/0343066 A1 10/2022 Kwong et al.
2022/0366889 A1 11/2022 Yerroju et al.
2022/0374109 A1 11/2022 Kramer et al.
2022/0374110 A1 11/2022 Ramaswamy et al.
2022/0374209 A1 11/2022 Shek et al.
2022/0374597 A1 11/2022 Bellegarda et al.
2022/0374727 A1 11/2022 Hansen et al.
2022/0375466 A1 11/2022 Hergenrader et al.
2022/0375553 A1 11/2022 Lasko et al.
2022/0382843 A1 12/2022 Gong et al.
2022/0382994 A1 12/2022 Cox et al.
2022/0383044 A1 12/2022 Bellegarda
2022/0383864 A1 12/2022 Gruber et al.
2022/0383872 A1 12/2022 Li et al.
2022/0391585 A1 12/2022 Bellegarda et al.
2022/0391603 A1 12/2022 Pham et al.
2022/0392446 A1 12/2022 Webber et al.
2022/0405117 A1 12/2022 Gruber et al.
2022/0406301 A1 12/2022 Barros et al.
2022/0406309 A1* 12/2022 Piernot ............... G06F 3/04883
2022/0408173 A1 12/2022 Gong et al.
2023/0013615 A1 1/2023 Sanghavi et al.
2023/0017115 A1 1/2023 Sanghavi et al.
2023/0018457 A1 1/2023 Zeitlin
2023/0026764 A1 1/2023 Karashchuk et al.
2023/0029028 A1 1/2023 Aitken et al.
2023/0035643 A1 2/2023 Binder et al.
2023/0035941 A1 2/2023 Herman et al.
2023/0036059 A1 2/2023 Blatz et al.
2023/0036798 A1 2/2023 Newendorp et al.
2023/0040703 A1 2/2023 Lemay et al.
2023/0042224 A1 2/2023 Patel et al.
2023/0048256 A1 2/2023 Gui et al.
2023/0051062 A1 2/2023 Hu et al.
2023/0057442 A1 2/2023 Stasior et al.
2023/0058929 A1 2/2023 Lasko et al.
2023/0066552 A1 3/2023 Van Os et al.
2023/0072481 A1 3/2023 Acero et al.
2023/0076716 A1 3/2023 Dogrusoz et al.
2023/0081605 A1 3/2023 O'Mara et al.
2023/0087244 A1 3/2023 Akmal et al.
2023/0094522 A1 3/2023 Stauber et al.
2023/0098174 A1 3/2023 Simes et al.
2023/0104583 A1 4/2023 Bekker et al.
2023/0111509 A1 4/2023 Kim et al.
2023/0112859 A1 4/2023 Vilhauer et al.
2023/0134970 A1 5/2023 Rasipuram et al.
2023/0179704 A1 6/2023 Chinthakunta et al.
2023/0185397 A1 6/2023 Anzures et al.
2023/0186921 A1 6/2023 Paulik et al.
2023/0197063 A1 6/2023 Greborio et al.
2023/0199147 A1 6/2023 Desserrey et al.
2023/0215435 A1 7/2023 Manjunath et al.
2023/0216963 A1 7/2023 Van Os et al.
2023/0236676 A1 7/2023 Hindi et al.

(56) References Cited

U.S. PATENT DOCUMENTS

| | | | |
|---|---|---|---|
| 2023/0236717 | A1 | 7/2023 | Meyer et al. |
| 2023/0245657 | A1 | 8/2023 | Liang et al. |
| 2023/0251881 | A1 | 8/2023 | Radebaugh et al. |
| 2023/0253005 | A1 | 8/2023 | Binder et al. |
| 2023/0254448 | A1 | 8/2023 | Binder et al. |
| 2023/0259550 | A1 | 8/2023 | Graham et al. |
| 2023/0262605 | A1 | 8/2023 | Freeman et al. |
| 2023/0267422 | A1 | 8/2023 | Herman et al. |
| 2023/0290352 | A1 | 9/2023 | York et al. |
| 2023/0292027 | A1 | 9/2023 | Gong et al. |
| 2023/0298595 | A1 | 9/2023 | Orr et al. |
| 2023/0306968 | A1 | 9/2023 | Liang et al. |
| 2023/0325157 | A1 | 10/2023 | Hurley et al. |
| 2023/0335132 | A1 | 10/2023 | Garcia et al. |
| 2023/0344537 | A1 | 10/2023 | Ingebretsen et al. |
| 2023/0352007 | A1 | 11/2023 | Castellani et al. |
| 2023/0352014 | A1 | 11/2023 | Tennant et al. |
| 2023/0352016 | A1 | 11/2023 | Kudurshian et al. |
| 2023/0352022 | A1 | 11/2023 | Milden |
| 2023/0359334 | A1 | 11/2023 | Chapman et al. |
| 2023/0359475 | A1 | 11/2023 | Karashchuk et al. |
| 2023/0367458 | A1 | 11/2023 | Burgess et al. |
| 2023/0367777 | A1 | 11/2023 | Burgess et al. |
| 2023/0367795 | A1 | 11/2023 | Burgess et al. |
| 2023/0368783 | A1 | 11/2023 | Marchi et al. |
| 2023/0368787 | A1 | 11/2023 | Sumner et al. |
| 2023/0368788 | A1 | 11/2023 | Ma et al. |
| 2023/0368791 | A1 | 11/2023 | Walker et al. |
| 2023/0368812 | A1 | 11/2023 | Marchi et al. |
| 2023/0376690 | A1 | 11/2023 | Bellegarda et al. |
| 2023/0386460 | A1 | 11/2023 | Fish et al. |
| 2023/0386462 | A1 | 11/2023 | Piernot et al. |
| 2023/0386464 | A1 | 11/2023 | Manjunath et al. |
| 2023/0386469 | A1 | 11/2023 | Horton et al. |
| 2023/0386478 | A1 | 11/2023 | Liu et al. |
| 2023/0388409 | A1 | 11/2023 | Weinstein et al. |
| 2023/0393712 | A1 | 12/2023 | Fujita et al. |
| 2023/0393811 | A1 | 12/2023 | Piersol et al. |
| 2023/0393872 | A1 | 12/2023 | Ellis et al. |
| 2023/0394248 | A1 | 12/2023 | Bellegarda |
| 2023/0395067 | A1 | 12/2023 | Perkins et al. |
| 2023/0401795 | A1 | 12/2023 | Streja et al. |
| 2023/0401798 | A1 | 12/2023 | Bigham et al. |
| 2023/0409174 | A1 | 12/2023 | Liang et al. |
| 2023/0409179 | A1 | 12/2023 | Liang et al. |
| 2023/0409283 | A1 | 12/2023 | Gruber et al. |
| 2023/0410540 | A1 | 12/2023 | Dehghan et al. |
| 2023/0410798 | A1 | 12/2023 | Greborio et al. |
| 2023/0410805 | A1 | 12/2023 | Drummie et al. |
| 2023/0419967 | A1 | 12/2023 | Hornberger et al. |
| 2024/0029734 | A1 | 1/2024 | Lemay et al. |
| 2024/0054996 | A1 | 2/2024 | Vescovi et al. |
| 2024/0055017 | A1 | 2/2024 | Maddika et al. |
| 2024/0064370 | A1 | 2/2024 | Van Os et al. |
| 2024/0075944 | A1 | 3/2024 | Sahoo |
| 2024/0087566 | A1 | 3/2024 | Piernot et al. |
| 2024/0096321 | A1 | 3/2024 | Naik et al. |
| 2024/0111402 | A1 | 4/2024 | Blatz et al. |
| 2024/0118744 | A1 | 4/2024 | Vaughan et al. |
| 2024/0134506 | A1 | 4/2024 | Napolitano et al. |
| 2024/0146776 | A1 | 5/2024 | Hansen et al. |

FOREIGN PATENT DOCUMENTS

| | | | |
|---|---|---|---|
| AU | 2015101171 | A4 | 10/2015 |
| AU | 2017203668 | A1 | 1/2018 |
| AU | 2018100187 | A4 | 3/2018 |
| AU | 2017222436 | A1 | 10/2018 |
| CH | 709795 | A1 | 12/2015 |
| CN | 102065260 | A | 3/2011 |
| CN | 103533143 | A | 1/2014 |
| CN | 103533154 | A | 1/2014 |
| CN | 103543902 | A | 1/2014 |
| CN | 103546453 | A | 1/2014 |
| CN | 103562863 | A | 2/2014 |
| CN | 103582896 | A | 2/2014 |
| CN | 103593054 | A | 2/2014 |
| CN | 103595869 | A | 2/2014 |
| CN | 103608859 | A | 2/2014 |
| CN | 103620605 | A | 3/2014 |
| CN | 103645876 | A | 3/2014 |
| CN | 103677261 | A | 3/2014 |
| CN | 103686723 | A | 3/2014 |
| CN | 103714816 | A | 4/2014 |
| CN | 103716454 | A | 4/2014 |
| CN | 103718568 | A | 4/2014 |
| CN | 103727948 | A | 4/2014 |
| CN | 103730120 | A | 4/2014 |
| CN | 103744761 | A | 4/2014 |
| CN | 103748531 | A | 4/2014 |
| CN | 103760984 | A | 4/2014 |
| CN | 103761104 | A | 4/2014 |
| CN | 103765385 | A | 4/2014 |
| CN | 103778527 | A | 5/2014 |
| CN | 103780758 | A | 5/2014 |
| CN | 103792985 | A | 5/2014 |
| CN | 103794212 | A | 5/2014 |
| CN | 103795850 | A | 5/2014 |
| CN | 103795866 | A | 5/2014 |
| CN | 103809548 | A | 5/2014 |
| CN | 103841268 | A | 6/2014 |
| CN | 103870168 | A | 6/2014 |
| CN | 103885663 | A | 6/2014 |
| CN | 103902373 | A | 7/2014 |
| CN | 103930945 | A | 7/2014 |
| CN | 103942932 | A | 7/2014 |
| CN | 103943107 | A | 7/2014 |
| CN | 103956169 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104011731 | A | 8/2014 |
| CN | 102693729 | B | 9/2014 |
| CN | 104036774 | A | 9/2014 |
| CN | 104038621 | A | 9/2014 |
| CN | 104050153 | A | 9/2014 |
| CN | 104090652 | A | 10/2014 |
| CN | 104092829 | A | 10/2014 |
| CN | 104113471 | A | 10/2014 |
| CN | 104125322 | A | 10/2014 |
| CN | 104144377 | A | 11/2014 |
| CN | 104145304 | A | 11/2014 |
| CN | 104169837 | A | 11/2014 |
| CN | 104180815 | A | 12/2014 |
| CN | 104185868 | A | 12/2014 |
| CN | 104219785 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335205 | A | 2/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104376250 | A | 2/2015 |
| CN | 104378723 | A | 2/2015 |
| CN | 104423594 | A | 3/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104516522 | A | 4/2015 |
| CN | 104520849 | A | 4/2015 |
| CN | 104573472 | A | 4/2015 |
| CN | 104575493 | A | 4/2015 |
| CN | 104575501 | A | 4/2015 |
| CN | 104575504 | A | 4/2015 |

(56) References Cited

FOREIGN PATENT DOCUMENTS

| | | | |
|---|---|---|---|
| CN | 104584010 | A | 4/2015 |
| CN | 104584096 | A | 4/2015 |
| CN | 104584601 | A | 4/2015 |
| CN | 104604274 | A | 5/2015 |
| CN | 104662600 | A | 5/2015 |
| CN | 104679472 | A | 6/2015 |
| CN | 104685898 | A | 6/2015 |
| CN | 104699746 | A | 6/2015 |
| CN | 104731441 | A | 6/2015 |
| CN | 104769584 | A | 7/2015 |
| CN | 104769670 | A | 7/2015 |
| CN | 104798012 | A | 7/2015 |
| CN | 104820488 | A | 8/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105144136 | A | 12/2015 |
| CN | 105164678 | A | 12/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105264903 | A | 1/2016 |
| CN | 105265005 | A | 1/2016 |
| CN | 105278681 | A | 1/2016 |
| CN | 105320251 | A | 2/2016 |
| CN | 105320726 | A | 2/2016 |
| CN | 105338425 | A | 2/2016 |
| CN | 105379234 | A | 3/2016 |
| CN | 105427122 | A | 3/2016 |
| CN | 105430186 | A | 3/2016 |
| CN | 105468137 | A | 4/2016 |
| CN | 105471705 | A | 4/2016 |
| CN | 105472587 | A | 4/2016 |
| CN | 105516441 | A | 4/2016 |
| CN | 105554217 | A | 5/2016 |
| CN | 105556592 | A | 5/2016 |
| CN | 105677765 | A | 6/2016 |
| CN | 105791920 | A | 7/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 106030699 | A | 10/2016 |
| CN | 106062734 | A | 10/2016 |
| CN | 106062790 | A | 10/2016 |
| CN | 106164909 | A | 11/2016 |
| CN | 106294558 | A | 1/2017 |
| CN | 106415412 | A | 2/2017 |
| CN | 106462383 | A | 2/2017 |
| CN | 106462617 | A | 2/2017 |
| CN | 106463114 | A | 2/2017 |
| CN | 106465074 | A | 2/2017 |
| CN | 106471570 | A | 3/2017 |
| CN | 106534469 | A | 3/2017 |
| CN | 106558310 | A | 4/2017 |
| CN | 106575195 | A | 4/2017 |
| CN | 106575501 | A | 4/2017 |
| CN | 106663224 | A | 5/2017 |
| CN | 106773742 | A | 5/2017 |
| CN | 106776581 | A | 5/2017 |
| CN | 107003738 | A | 8/2017 |
| CN | 107004412 | A | 8/2017 |
| CN | 107450800 | A | 12/2017 |
| CN | 107480161 | A | 12/2017 |
| CN | 107490971 | A | 12/2017 |
| CN | 107491285 | A | 12/2017 |
| CN | 107491295 | A | 12/2017 |
| CN | 107491468 | A | 12/2017 |
| CN | 107491469 | A | 12/2017 |
| CN | 107506037 | A | 12/2017 |
| CN | 107545262 | A | 1/2018 |
| CN | 107589841 | A | 1/2018 |
| CN | 107608998 | A | 1/2018 |
| CN | 107615378 | A | 1/2018 |
| CN | 107623616 | A | 1/2018 |
| CN | 107644053 | A | 1/2018 |
| CN | 107683470 | A | 2/2018 |
| CN | 107786730 | A | 3/2018 |
| CN | 107852436 | A | 3/2018 |
| CN | 107871500 | A | 4/2018 |
| CN | 107889533 | A | 4/2018 |
| CN | 107919123 | A | 4/2018 |
| CN | 107924313 | A | 4/2018 |
| CN | 107978313 | A | 5/2018 |
| CN | 108268187 | A | 7/2018 |
| CN | 108604449 | A | 9/2018 |
| CN | 108647681 | A | 10/2018 |
| CN | 109155132 | A | 1/2019 |
| CN | 109447234 | A | 3/2019 |
| CN | 109657629 | A | 4/2019 |
| CN | 110135411 | A | 8/2019 |
| CN | 110263144 | A | 9/2019 |
| CN | 105164719 | B | 11/2019 |
| CN | 110531860 | A | 12/2019 |
| CN | 110554761 | A | 12/2019 |
| CN | 110598671 | A | 12/2019 |
| CN | 110647274 | A | 1/2020 |
| CN | 110825469 | A | 2/2020 |
| CN | 110945840 | A | 3/2020 |
| CN | 111124224 | A | 5/2020 |
| CN | 107123417 | B | 6/2020 |
| CN | 111316203 | A | 6/2020 |
| CN | 111722716 | A | 9/2020 |
| CN | 111934959 | A | 11/2020 |
| CN | 112204507 | A | 1/2021 |
| DE | 202016008226 | U1 | 5/2017 |
| DK | 179570 | B1 | 2/2019 |
| DK | 180129 | B1 | 6/2020 |
| EP | 2523188 | A1 | 11/2012 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2741175 | A2 | 6/2014 |
| EP | 2741190 | A2 | 6/2014 |
| EP | 2743846 | A2 | 6/2014 |
| EP | 2760015 | A1 | 7/2014 |
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881898 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |

(56) References Cited

FOREIGN PATENT DOCUMENTS

| | | | |
|---|---|---|---|
| EP | 2973380 | A2 | 1/2016 |
| EP | 2985984 | A2 | 2/2016 |
| EP | 2988513 | A1 | 2/2016 |
| EP | 2891049 | A4 | 3/2016 |
| EP | 2996359 | A1 | 3/2016 |
| EP | 3032532 | A1 | 6/2016 |
| EP | 3035329 | A1 | 6/2016 |
| EP | 3036594 | A2 | 6/2016 |
| EP | 3038333 | A1 | 6/2016 |
| EP | 3076267 | A1 | 10/2016 |
| EP | 3107101 | A1 | 12/2016 |
| EP | 3115905 | A1 | 1/2017 |
| EP | 3125097 | A2 | 2/2017 |
| EP | 3132442 | A1 | 2/2017 |
| EP | 2672231 | B1 | 5/2017 |
| EP | 3161612 | A1 | 5/2017 |
| EP | 3200185 | A1 | 8/2017 |
| EP | 3201770 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 3336805 | A1 | 6/2018 |
| EP | 2973380 | B1 | 8/2018 |
| EP | 2983065 | B1 | 8/2018 |
| EP | 3382530 | A1 | 10/2018 |
| EP | 3389045 | A1 | 10/2018 |
| EP | 3392876 | A1 | 10/2018 |
| EP | 3401773 | A1 | 11/2018 |
| EP | 2973002 | B1 | 6/2019 |
| EP | 3506151 | A1 | 7/2019 |
| EP | 3550483 | A1 | 10/2019 |
| EP | 3567584 | A1 | 11/2019 |
| EP | 3588912 | A1 | 1/2020 |
| EP | 3323058 | B1 | 2/2020 |
| EP | 3321928 | B1 | 4/2020 |
| EP | 3646205 | A1 | 5/2020 |
| EP | 3674922 | A1 | 7/2020 |
| EP | 3913475 | A1 | 11/2021 |
| EP | 3971688 | A1 | 3/2022 |
| EP | 4131256 | A1 | 2/2023 |
| IN | 201917007360 | A | 5/2019 |
| JP | 2003-244292 | A | 8/2003 |
| JP | 2014-2586 | A | 1/2014 |
| JP | 2014-10688 | A | 1/2014 |
| JP | 2014-502445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-513835 | A | 6/2014 |
| JP | 2014-124332 | A | 7/2014 |
| JP | 2014-126600 | A | 7/2014 |
| JP | 2014-127754 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-157323 | A | 8/2014 |
| JP | 2014-519648 | A | 8/2014 |
| JP | 2014-182042 | A | 9/2014 |
| JP | 2014-524627 | A | 9/2014 |
| JP | 2014-191272 | A | 10/2014 |
| JP | 2014-219614 | A | 11/2014 |
| JP | 2014-222514 | A | 11/2014 |
| JP | 2015-1931 | A | 1/2015 |
| JP | 2015-4928 | A | 1/2015 |
| JP | 2015-8001 | A | 1/2015 |
| JP | 2015-10979 | A | 1/2015 |
| JP | 2015-12301 | A | 1/2015 |
| JP | 2015-18365 | A | 1/2015 |
| JP | 2015-501022 | A | 1/2015 |
| JP | 2015-501034 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-94848 | A | 5/2015 |
| JP | 2015-514254 | A | 5/2015 |
| JP | 2015-519675 | A | 7/2015 |
| JP | 2015-520409 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2015-504651 | A | 2/2016 |
| JP | 2016-504651 | A | 2/2016 |
| JP | 2016-35614 | A | 3/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-156845 | A | 9/2016 |
| JP | 2016-536648 | A | 11/2016 |
| JP | 2017-11608 | A | 1/2017 |
| JP | 2017-19331 | A | 1/2017 |
| JP | 2017-516153 | A | 6/2017 |
| JP | 2017-123187 | A | 7/2017 |
| JP | 2017-211608 | A | 11/2017 |
| JP | 2017-537361 | A | 12/2017 |
| JP | 2018-14086 | A | 1/2018 |
| JP | 6291147 | B1 | 2/2018 |
| JP | 2018-60550 | A | 4/2018 |
| JP | 2018-64297 | A | 4/2018 |
| JP | 2018-511095 | A | 4/2018 |
| JP | 2018-101242 | A | 6/2018 |
| JP | 2018-113035 | A | 7/2018 |
| JP | 2018-525653 | A | 9/2018 |
| JP | 2018-525950 | A | 9/2018 |
| JP | 2018-536889 | A | 12/2018 |
| JP | 2019-204517 | A | 11/2019 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0048779 | A | 4/2014 |
| KR | 10-2014-0055204 | A | 5/2014 |
| KR | 10-2014-0059697 | A | 5/2014 |
| KR | 10-2014-0068752 | A | 6/2014 |
| KR | 10-2014-0071208 | A | 6/2014 |
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0006454 | A | 1/2015 |
| KR | 10-2015-0013631 | A | 2/2015 |
| KR | 10-2015-0025059 | A | 3/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-1510013 | B1 | 4/2015 |
| KR | 10-2015-0062811 | A | 6/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |

(56) References Cited

FOREIGN PATENT DOCUMENTS

| | | | |
|---|---|---|---|
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0127165 | A | 11/2016 |
| KR | 10-2016-0140694 | A | 12/2016 |
| KR | 10-2016-0147854 | A | 12/2016 |
| KR | 10-2017-0004482 | A | 1/2017 |
| KR | 10-2017-0006592 | A | 1/2017 |
| KR | 10-2017-0036805 | A | 4/2017 |
| KR | 10-2017-0096774 | A | 8/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0122837 | A | 11/2018 |
| KR | 10-2018-0133525 | A | 12/2018 |
| KR | 10-2018-0135877 | A | 12/2018 |
| KR | 10-1959328 | B1 | 3/2019 |
| KR | 10-2020-0007926 | A | 1/2020 |
| KR | 10-2020-0105519 | A | 9/2020 |
| RU | 2012141604 | A | 4/2014 |
| TW | 201407184 | A | 2/2014 |
| TW | 201610982 | A | 3/2016 |
| TW | 201629750 | A | 8/2016 |
| WO | 2010/144651 | A2 | 12/2010 |
| WO | 2011/088053 | A2 | 7/2011 |
| WO | 2012/092562 | A1 | 7/2012 |
| WO | 2012/145227 | A1 | 10/2012 |
| WO | 2012/167168 | A2 | 12/2012 |
| WO | 2012/173902 | A2 | 12/2012 |
| WO | 2013/048880 | A1 | 4/2013 |
| WO | 2013/057153 | A1 | 4/2013 |
| WO | 2013/122310 | A1 | 8/2013 |
| WO | 2013/173504 | A1 | 11/2013 |
| WO | 2014/003138 | A1 | 1/2014 |
| WO | 2014/004544 | A2 | 1/2014 |
| WO | 2014/004584 | A2 | 1/2014 |
| WO | 2014/008461 | A1 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2014/144949 | A3 | 11/2014 |
| WO | 2014/190297 | A1 | 11/2014 |
| WO | 2013/173504 | A8 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/200731 | A1 | 12/2014 |
| WO | 2014/203495 | A1 | 12/2014 |
| WO | 2014/204659 | A2 | 12/2014 |
| WO | 2014/209264 | A1 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/112625 | A1 | 7/2015 |
| WO | 2015/116151 | A1 | 8/2015 |
| WO | 2015/121449 | A1 | 8/2015 |
| WO | 2015/127404 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183368 | A1 | 12/2015 |
| WO | 2015/183401 | A1 | 12/2015 |
| WO | 2015/183547 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/004074 | A1 | 1/2016 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/040721 | A1 | 3/2016 |
| WO | 2016/045192 | A1 | 3/2016 |
| WO | 2016/048789 | A1 | 3/2016 |
| WO | 2016/049439 | A1 | 3/2016 |
| WO | 2016/051519 | A1 | 4/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/089029 | A1 | 6/2016 |
| WO | 2016/089638 | A1 | 6/2016 |
| WO | 2016/100139 | A1 | 6/2016 |
| WO | 2016/111881 | A1 | 7/2016 |
| WO | 2016/118344 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/191737 | A2 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |

(56) References Cited

FOREIGN PATENT DOCUMENTS

| | | | |
|---|---|---|---|
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/078792 | A1 | 5/2017 |
| WO | 2017/142116 | A1 | 8/2017 |
| WO | 2017/160487 | A1 | 9/2017 |
| WO | 2017/200777 | A1 | 11/2017 |
| WO | 2017/203484 | A1 | 11/2017 |
| WO | 2017/210035 | A1 | 12/2017 |
| WO | 2017/213678 | A1 | 12/2017 |
| WO | 2017/213681 | A1 | 12/2017 |
| WO | 2017/213682 | A1 | 12/2017 |
| WO | 2017/213684 | A1 | 12/2017 |
| WO | 2017/218194 | A1 | 12/2017 |
| WO | 2018/009397 | A1 | 1/2018 |
| WO | 2018/014788 | A1 | 1/2018 |
| WO | 2018/017383 | A1 | 1/2018 |
| WO | 2018/034168 | A1 | 2/2018 |
| WO | 2018/044633 | A1 | 3/2018 |
| WO | 2018/055898 | A1 | 3/2018 |
| WO | 2018/057269 | A1 | 3/2018 |
| WO | 2018/067528 | A1 | 4/2018 |
| WO | 2018/075170 | A1 | 4/2018 |
| WO | 2018/081833 | A1 | 5/2018 |
| WO | 2018/090060 | A1 | 5/2018 |
| WO | 2018/093005 | A1 | 5/2018 |
| WO | 2018/094254 | A1 | 5/2018 |
| WO | 2018/176053 | A1 | 9/2018 |
| WO | 2018/208506 | A1 | 11/2018 |
| WO | 2018/209152 | A1 | 11/2018 |
| WO | 2018/213401 | A1 | 11/2018 |
| WO | 2018/213415 | A1 | 11/2018 |
| WO | 2018/213481 | A1 | 11/2018 |
| WO | 2018/217014 | A1 | 11/2018 |
| WO | 2018/231307 | A1 | 12/2018 |
| WO | 2019/067930 | A1 | 4/2019 |
| WO | 2019/078576 | A1 | 4/2019 |
| WO | 2019/079017 | A1 | 4/2019 |
| WO | 2019/143397 | A1 | 7/2019 |
| WO | 2019/147429 | A1 | 8/2019 |
| WO | 2019/190646 | A2 | 10/2019 |
| WO | 2019/212569 | A1 | 11/2019 |
| WO | 2019/231537 | A1 | 12/2019 |
| WO | 2019/231541 | A1 | 12/2019 |
| WO | 2019/236217 | A1 | 12/2019 |
| WO | 2020/010530 | A1 | 1/2020 |
| WO | 2020/022572 | A1 | 1/2020 |
| WO | 2020/068040 | A1 | 4/2020 |
| WO | 2020/096706 | A1 | 5/2020 |
| WO | 2020/109074 | A1 | 6/2020 |
| WO | 2020/208302 | A1 | 10/2020 |
| WO | 2020/214006 | A1 | 10/2020 |
| WO | 2020/222871 | A1 | 11/2020 |
| WO | 2021/054565 | A1 | 3/2021 |
| WO | 2021/061349 | A1 | 4/2021 |
| WO | 2021/062148 | A1 | 4/2021 |
| WO | 2021/076164 | A1 | 4/2021 |
| WO | 2021/188439 | A1 | 9/2021 |
| WO | 2021/252230 | A1 | 12/2021 |
| WO | 2022/047214 | A2 | 3/2022 |

OTHER PUBLICATIONS

Office Action received for European Patent Application No. 25160587.9, mailed on Mar. 4, 2026, 4 pages.
"Accessibility on iOS", Apple Inc., Online available at: https://developer.apple.com/accessibility/ios/, Retrieved on Jul. 26, 2021, 2 pages.
"Alexa, Turn Up the Heat, Smart things Samsung [online]", Online available at: <https://web.archive.org/web/20160329142041/https://blog.smartthings.com/news/smartthingsupdates/alexa-turn-up-the-heat/>, Mar. 3, 2016, 3 pages.
"Ask Alexa—Things That Are Smart Wiki", Online available at: <http://thingsthataresmart.wiki/index.php?title=Ask_Alexa&oldid=4283>, Jun. 8, 2016, pp. 1-31.
"Headset Button Controller v7.3 APK Full APP Download for Andriod, Blackberry, iPhone", Online available at: http://fullappdownload.com/headset-button-controller-v7-3-apk/>, Jan. 27, 2014, 11 pages.
"Interactive Voice", Online available at: <http://www.helloivee.com/company/>, retrieved on Feb. 10, 2014, 2 pages.
"IPhone 6 Smart Guide Full Version for SoftBank", Gijutsu-Hyohron Co. Ltd., vol. 1, Dec. 1, 2014, 4 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
"Meet Ivee, Your Wi-Fi Voice Activated Assistant", Available Online at: <http://www.helloivee.com/>, retrieved on Feb. 10, 2014, 8 pages.
"Method to Provide Remote Voice Navigation Capability on the Device", ip.com, Jul. 21, 2016, 4 pages.
"Microsoft Soundscape—A map delivered in 3D sound", Microsoft Research, Online available at: https://www.microsoft.com/en-us/research/product/soundscape/, Retrieved on Jul. 26, 2021, 5 pages.
"Nuance Dragon Naturally Speaking", Version 13 End-User Workbook, Nuance Communications Inc., Sep. 2014, 125 pages.
"Pose, Cambridge Dictionary Definition of Pose", Available online at: <https://dictionary.cambridge.org/dictionary/english/pose>, 4 pages.
"SmartThings +Amazon Echo", Smartthings Samsung [online], Online available at: <https://web.archive.org/web/20160509231428/https://blog.smartthings.com/featured/alexa-turn-on-my-smartthings/>, Aug. 21, 2015, 3 pages.
"Use Macrodroid skillfully to automatically clock in with Ding Talk", Online available at: https://blog.csdn.net/qq_26614295/article/details/84304541, Nov. 20, 2018, 11 pages.
"What's on Spotify?", Music for everyone, Online Available at: <https://web.archive.org/web/20160428115328/https://www.spotify.com/us/>, Apr. 28, 2016, 6 pages.
"Working with the Dragon Bar", Nuance Communications Inc., Jun. 27, 2016, 2 pages.
Abdelaziz et al., "Speaker-Independent Speech-Driven Visual Speech Synthesis using Domain-Adapted Acoustic Models", May 15, 2019, 9 pages.
Advisory Action received for U.S. Appl. No. 15/917,410, mailed on Aug. 25, 2020, 3 pages.
Advisory Action received for U.S. Appl. No. 17/555,030, mailed on Apr. 6, 2023, 3 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Apple, "VoiceOver for OS X", Online available at: <http://www.apple.com/accessibility/voiceover/>, May 19, 2014, pp. 1-3.
Applicant-Initiated Interview Summary received for U.S. Appl. No. 15/917,410, mailed on Aug. 23, 2021, 3 pages.
Applicant-Initiated Interview Summary received for U.S. Appl. No. 15/917,410, mailed on Feb. 24, 2020, 5 pages.
Applicant-Initiated Interview Summary received for U.S. Appl. No. 15/917,410, mailed on Jul. 21, 2020, 5 pages.
Applicant-Initiated Interview Summary received for U.S. Appl. No. 15/917,410, mailed on Mar. 1, 2021, 5 pages.
Applicant-Initiated Interview Summary received for U.S. Appl. No. 15/917,410, mailed on Nov. 18, 2020, 3 pages.
Applicant-Initiated Interview Summary received for U.S. Appl. No. 17/555,030, mailed on Jul. 13, 2023, 4 pages.
Applicant-Initiated Interview Summary received for U.S. Appl. No. 17/555,030, mailed on Mar. 28, 2023, 4 pages.

(56) References Cited

OTHER PUBLICATIONS

Applicant-Initiated Interview Summary received for U.S. Appl. No. 17/555,030, mailed on Nov. 3, 2022, 3 pages.
Applicant-Initiated Interview Summary received for U.S. Appl. No. 17/555,030, mailed on Nov. 27, 2023, 3 pages.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bodapati et al., "Neural Word Decomposition Models for Abusive Language Detection", Proceedings of the Third Workshop on Abusive Language Online, Aug. 1, 2019, pp. 135-145.
Burgess, Brian, "Amazon Echo Tip: Enable the Wake Up Sound", Online available at: <https://www.groovypost.com/howto/amazon-echo-tip-enable-wake-up-sound/>, Jun. 30, 2015, 4 pages.
Buttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Cambria et al., "Jumping NLP curves: A Review of Natural Language Processing Research", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Corrected Notice of Allowance received for U.S. Appl. No. 15/917,410, mailed on Dec. 7, 2021, 2 pages.
Corrected Notice of Allowance received for U.S. Appl. No. 15/917,410, mailed on Sep. 22, 2021, 9 pages.
Corrected Notice of Allowance received for U.S. Appl. No. 17/555,030, mailed on Feb. 15, 2024, 2 pages.
Corrected Notice of Allowance received for U.S. Appl. No. 17/555,030, mailed on May 1, 2024, 5 pages.
Czech, Lucas, "A System for Recognizing Natural Spelling of English Words", Diploma Thesis, Karlsruhe Institute of Technology, May 7, 2014, 107 pages.
Dai et al., "Transformer-XL: Attentive Language Models Beyond a Fixed-Length Context", Online available at: arXiv:1901.02860v3, Jun. 2, 2019, 20 pages.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at: <https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid? ", Macrodroid Forums, Online Available at: <https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Examiner Interview Summary received for U.S. Appl. No. 17/555,030, mailed on Jan. 27, 2023, 3 pages.
Filipowicz, Luke, "How to use the QuickType keyboard in iOS 8", Online available at: <https://www.imore.com/comment/568232>, Oct. 11, 2014, pp. 1-17.
Final Office Action received for U.S. Appl. No. 15/917,410, mailed on Apr. 8, 2020, 14 pages.
Final Office Action received for U.S. Appl. No. 17/555,030, mailed on Aug. 22, 2023, 30 pages.
Final Office Action received for U.S. Appl. No. 17/555,030, mailed on Feb. 17, 2023, 24 pages.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Gu et al., "BadNets: Evaluating Backdooring Attacks on Deep Neural Networks", IEEE Access, vol. 7, Mar. 21, 2019, pp. 47230-47244.
Guim, Mark, "How to Set a Person-Based Reminder with Cortana", Online available at: <http://www.wpcentral.com/how-to-person-based-reminder-cortana>, Apr. 26, 2014, 15 pages.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP), IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation of Deep Neural Networks for French Broadcast Audio Transcription", ICASSP, 2014, 2014, pp. 6334-6338.
Haung et al., "A Study for Improving Device-Directed Speech Detection Toward Frictionless Human-Machine Interaction", in Proc. Interspeech, 2019, 5 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in

(56) References Cited

OTHER PUBLICATIONS

Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings for Segmentation and Separation", Proc. ICASSP, Mar. 2016, 6 pages.
Hinton et al., "Distilling the Knowledge in A Neural Network", arXiv preprintarXiv:1503.02531, Mar. 2, 2015, 9 pages.
id3.org, "id3v2.4.0-Frames", Online available at: <http://id3.org/id3v2.4.0-frames?action=print>, retrieved on Jan. 22, 2015, pp. 1-41.
Idasallinen, "What's the 'Like' Meter Based on?", Online Available at: <https://community.spotify.com/t5/Content-Questions/What-s-the-like-meter-based-on/td-p/1209974>, Sep. 22, 2015, 6 pages.
Inews and Tech, "How to Use the QuickType Keyboard in IOS 8", Online available at: <http://www.inewsandtech.com/how-to-use-the-quicktype-keyboard-in-ios-8/>, Sep. 17, 2014, 6 pages.
International Preliminary Report on Patentability received for PCT Patent Application No. PCT/US2018/029399, mailed on Nov. 28, 2019, 14 pages.
International Search Report and Written Opinion received for PCT Patent Application No. PCT/US2018/029399, mailed on Nov. 13, 2018, 20 pages.
Invitation to Pay Addition Fees and Partial International Search Report received for PCT Patent Application No. PCT/US2018/029399, mailed on Jul. 5, 2018, 9 pages.
Invitation to Pay Search Fees received for European Patent Application No. 18726271.2, mailed on Oct. 13, 2021, 3 pages.
Isik et al., "Single-Channel Multi-Speaker Separation using Deep Clustering", Interspeech 2016, Sep. 8-12, 2016, pp. 545-549.
Jeon et al., "Voice Trigger Detection from LVCSR Hypothesis Lattices Using Bidirectional Lattice Recurrent Neural Networks", International Conference on Acoustics, Speech and Signal Processing (ICASSP), IEEE, Feb. 29, 2020, 5 pages.
Jonsson et al., "Proximity-based Reminders Using Bluetooth", 2014 IEEE International Conference on Pervasive Computing and Communications Demonstrations, 2014, pp. 151-153.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at: <https://web.archive.org/web/20160505090418/https://www.theverge.com/2016/5/4/11593564/viv-labs-unveiling-monday-new-ai-from-siri-creators>, May 4, 2016, 3 pages.
Kickstarter, "Ivee Sleek: Wi-Fi Voice-Activated Assistant", Online available at: <https://www.kickstarter.com/projects/ivee/ivee-sleek-wi-fi-voice-activated-assistant>, retrieved on Feb. 10, 2014, pp. 1-13.
King et al., "Robust Speech Recognition via Anchor Word Representations", Interspeech 2017, Aug. 20-24, 2017, pp. 2471-2475.
Kruger et al., "Virtual World Accessibility with the Perspective Viewer", Proceedings of ICEAPVI, Athens, Greece, Feb. 12-14, 2015, 6 pages.
Kumar et al., "Voice Typing: A New Speech Interaction Model for Dictation on Touchscreen Devices", CHI '12: Proceedings of the SIGCHI Conference on Human Factors in Computing Systems, Online Available at: https://dl.acm.org/doi/10.1145/2207676.2208386, May 2012, 9 pages.
Kumar, Shiu, "Ubiquitous Smart Home System Using Android Application", International Journal of Computer Networks & Communications (IJCNC), vol. 6, No. 1, Jan. 2014, pp. 33-43.
Kumatani et al., "Direct Modeling of Raw Audio with DNNS for Wake Word Detection", in 2017 IEEE Automatic Speech Recognition and Understanding Workshop (ASRU), 2017, 6 pages.
Lin, Luyuan, "An Assistive Handwashing System with Emotional Intelligence", Using Emotional Intelligence in Cognitive Intelligent Assistant Systems, 2014, 101 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Maas et al., "Combining Acoustic Embeddings And Decoding Features for End-Of-Utterance Detection in Real-Time Far-Field Speech Recognition Systems", in 2018 IEEE International Conference on Acoustics, Speech and Signal Processing (ICASSP), IEEE, 2018, 5 pages.
Mallidi et al., "Device-Directed Utterance Detection", Proc. Interspeech, Aug. 7, 2018, 4 pages.
Mhatre et al., "Donna Interactive Chat-bot acting as a Personal Assistant", International Journal of Computer Applications (0975-8887), vol. 140, No. 10, Apr. 2016, 6 pages.
Miller, Chance, "Google Keyboard Updated with New Personalized Suggestions Feature", Online available at: <http://9to5google.com/2014/03/19/google-keyboard-updated-with-new-personalized-suggestions-feature/>, Mar. 19, 2014, 4 pages.
Mnih et al., "Human-Level Control Through Deep Reinforcement Learning", Nature, vol. 518, Feb. 26, 2015, pp. 529-533.
Muller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Non-Final Office Action received for U.S. Appl. No. 15/917,410, mailed on Apr. 13, 2021, 19 pages.
Non-Final Office Action received for U.S. Appl. No. 15/917,410, mailed on May 16, 2019, 17 pages.
Non-Final Office Action received for U.S. Appl. No. 15/917,410, mailed on Oct. 22, 2019, 14 pages.
Non-Final Office Action received for U.S. Appl. No. 17/555,030, mailed on Jun. 8, 2023, 26 pages.
Non-Final Office Action received for U.S. Appl. No. 17/555,030, mailed on Sep. 8, 2022, 27 pages.
Norouzian et al., "Exploring Attention Mechanism for Acoustic based Classification of Speech Utterances into System-Directed and Non-System-Directed", International Conference on Acoustics, Speech and Signal Processing (ICASSP), IEEE, Feb. 1, 2019, 5 pages.
Notice of Allowance received for Chinese Patent Application No. 201880031599.1, mailed on Feb. 21, 2023, 5 pages.
Notice of Allowance received for U.S. Appl. No. 15/917,410, mailed on Sep. 15, 2021, 14 pages.
Notice of Allowance received for U.S. Appl. No. 17/555,030, mailed on Feb. 8, 2024, 10 pages.
Office Action received for Chinese Patent Application No. 201880031599.1, mailed on Sep. 7, 2022, 17 pages.
Office Action received for Danish Patent Application No. PA201770411, mailed on Dec. 6, 2018, 4 pages.
Office Action received for Danish Patent Application No. PA201770411, mailed on Feb. 24, 2020, 5 pages.
Office Action received for Danish Patent Application No. PA201770411, mailed on Mar. 26, 2019, 5 pages.
Office Action received for Danish Patent Application No. PA202070237, mailed on Dec. 2, 2021, 2 pages.
Office Action received for Danish Patent Application No. PA202070237, mailed on Jan. 28, 2021, 3 pages.
Office Action received for Danish Patent Application No. PA202070237, mailed on Jul. 14, 2022, 3 pages.
Office Action received for Danish Patent Application No. PA202070237, mailed on Jun. 7, 2021, 5 pages.

(56) References Cited

OTHER PUBLICATIONS

Office Action received for European Patent Application No. 18726271.2, mailed on Jul. 27, 2023, 3 pages.
Office Action received for European Patent Application No. 18726271.2, mailed on Mar. 9, 2022, 7 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Philips, Chris, "Thumbprint Radio: A Uniquely Personal Station Inspired by All of Your Thumbs Up", Pandora News, Online Available at: <https://blog.pandora.com/author/chris-phillips/>, Dec. 14, 2015, 7 pages.
Ping et al., "Deep Voice 3: Scaling Text to Speech with Convolutional Sequence Learning", Available online at: https://arxiv.org/abs/1710.07654, Feb. 22, 2018, 16 pages.
Qian et al., "Single-channel Multi-talker Speech Recognition With Permutation Invariant Training", Speech Communication, Issue 104, 2018, pp. 1-11.
Raux, Antoine, "High-Density Dialog Management the Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at: <https://www.imore.com/quicktype-keyboards-ios-8-explained>, Jun. 21, 2014, pp. 1-19.
Robbins, F. M., "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Routines, "SmartThings Support", Online available at: <https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "Gaze Everywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Search Report and Opinion received for Danish Patent Application No. PA202070237, mailed on Aug. 14, 2020, 8 pages.
Search Report received for Danish Patent Application No. PA201770411, mailed on Oct. 30, 2017, 9 pages.
Seehafer, Brent, "Activate Google Assistant on Galaxy S7 with Screen off", Online available at: <https://productforums.google.com/forum/#!topic/websearch/lp3qIGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages.
Smith, Jake, "Amazon Alexa Calling: How to Set it up and Use it on Your Echo", iGeneration, May 30, 2017, 5 pages.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer In Permutation Invariant Training for Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
Vaswani et al., "Attention Is All You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.

(56) References Cited

OTHER PUBLICATIONS com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang et al., "Tacotron: Towards End to End Speech Synthesis", Available online at: https://arxiv.org/abs/1703.10135, Apr. 6, 2017, 10 pages.
Wang et al., "Training Deep Neural Networks with 8-bit Floating Point Numbers", 32nd Conference on Neural Information Processing Systems (Neurl PS 2018), 2018, 10 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Home Automation", Online Available at: <https://en.wikipedia.org/w/index.php?title=Home_automation&oldid=686569068>, Oct. 19, 2015, 9 pages.
Wikipedia, "Siri", Online Available at: <https://en.wikipedia.org/w/index.php?title=Siri&oldid=689697795>, Nov. 8, 2015, 13 pages.
Wikipedia, "Virtual Assistant", Wikipedia, Online Available at: <https://en.wikipedia.org/w/index.php?title=Virtual_assistant&oldid=679330666>, Sep. 3, 2015, 4 pages.
Win et al., "Myanmar Text to Speech System based on Tacotron-2", International Conference on Information and Communication Tehcnology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
X.AI, "How it Works", Online available at: <https://web.archive.org/web/20160531201426/https://x.ai/how-it-works/>, May 31, 2016, 6 pages.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yates, Michael C., "How Can I Exit Google Assistant After I'm Finished with it", Online available at: <https://productforums.google.com/forum/#!msg/phone-by-google/faECnR2RJwA/gKNtOkQgAQAJ>, Jan. 11, 2016, 2 pages.
Yeh, Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zheng et al., "Intent Detection and Semantic Parsing for Navigation Dialogue Language Processing", 2017 IEEE 20th International Conference on Intelligent Transportation Systems (ITSC), 2017, 6 pages.
Zhong et al., "JustSpeak: Enabling Universal Voice Control on Android", W4A'14, Proceedings of the 11th Web for All Conference, No. 36, Apr. 7-9, 2014, 8 pages.
Zhou et al., "Learning Dense Correspondence via 3D-guided Cycle Consistency", Proceedings of the IEEE Conference on Computer Vision and Pattern Recognition (CVPR), 2016, 10 pages.
Zmolikova et al., "Speaker-Aware Neural Network Based Beamformer for Speaker Extraction in Speech Mixtures", Interspeech 2017, Aug. 20-24, 2017, pp. 2655-2659.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages.
Choi et al., "Evaluation of Frequency Warping Based Features and Spectro-Temporal Features for Speaker Recognition", Speech Sounds and Phonetic Science, Online Available at: http://koreascience.or.kr/article/JAKO201510534323834.page, vol. 7, No. 1, Mar. 31, 2015, pp. 3-10.
Hanqing et al., "Deep Learning of Instruction Intention Understanding Using Stacked Denoising Autoencoder", Journal of Shanghai Jiaotong University, vol. 50, No. 7, Jul. 28, 2016, 6 pages.
Zhao et al., "Big Data Analysis and Application", Aviation Industry Press, Dec. 2015, pp. 236-241.
"Cake", Online Available at: <https://web.archive.org/web/20170808091948/https://emojipedia.org/search/?q=cake>, Aug. 8, 2017, 5 pages.
"Context-Sensitive User Interface", Online available at: https://web.archive.org/web/20190407003349/https://en.wikipedia.org/wiki/Context-sensitive_user_interface, Apr. 7, 2019, 3 pages.
"Galaxy S7: How to Adjust Screen Timeout & Lock Screen Timeout", Online available at: <https://www.youtube.com/watch?v=n6e1WKUS2ww>, Jun. 9, 2016, 1 page.
"Hey Google: How to Create a Shopping List with Your Google Assistant", Online available at: <https://www.youtube.com/watch?v=w9NCsElax1Y>, May 25, 2018, 1 page.
"How to adjust the order of control center buttons on iPhone iOS12 version after buying a mobile phone", Available online at: https://jingyan.baidu.com/article/5bbb5albbe5a9713eba1791b.html, Jun. 14, 2019, 4 pages (Official Copy only). {See communication under 37 CFR § 1.98(a) (3)}.
"How to Enable Google Assistant on Galaxy S7 and Other Android Phones (No Root)", Online available at: <https://www.youtube.com/watch?v=HekIQbWyksE>, Mar. 20, 2017, 1 page.
"How to Use Ok Google Assistant Even Phone is Locked", Online available at: <https://www.youtube.com/watch?v=9B_gP4j_SP8>, Mar. 12, 2018, 1 page.
"Quick Type Keyboard on iOS 8 Makes Typing Easier", Online available at: <https://www.youtube.com/watch?v=0CldLR4fhVU>, Jun. 3, 2014, 3 pages.
Amazon, Alexa, "Getting your news with Alexa flash briefing", Online available at: https://www.youtube.com/watch?v=xui8rumrNaE, Sep. 9, 2019, 2 pages.
Anania, Peter, "Amazon Echo with Home Automation (Smartthings)", Online available at: <https://www.youtube.com/watch?v=LMW6aXmsWNE>, Dec. 20, 2015, 1 page.
Apple, "Apple previews innovative accessibility features combining the power of hardware, software, and machine learning", Available

(56) References Cited

OTHER PUBLICATIONS online at: https://www.apple.com/newsroom/2022/05/apple-previews-innovative-accessibility-features/, May 17, 2022, 10 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Badshah et al., "Deep Features-based Speech Emotion Recognition for Smart Affective Services", Multimedia Tools and Applications, Oct. 31, 2017, pp. 5571-5589.
Bao et al., "Detecting Target Objects by Natural Language Instructions Using an RGB-D Camera", Sensors (Basel, Switzerland) 2016, 16(12), 2117, Dec. 13, 2016, 23 pages.
beointegration.com, "BeoLink Gateway—Programming Example", Online Available at: <https:/ /www.youtube.com/watch?v=TXDaJFm5UH4>, Mar. 4, 2015, 3 pages.
Burgbacher et al., "Synthetic Word Gesture Generation for Stroke-Based Virtual Keyboards", IEEE Transactions on Human-Machine Systems, vol. 47, No. 2, Apr. 2017, 14 pages.
Castellini, Rick, "How to enable and use dictation with an iPhone or iPad", Online Available at: <https://www.youtube.com/watch?v=8w133yN6rTU>, Sep. 7, 2017, 3 pages.
Choi et al., "Evaluation of Frequency Warping Based Features and Spectro-Temporal Features for Speaker Recognition", Speech Sounds and Phonetic Science, Online Available at: http://koreascience.or.kr/article/JAKO201510534323834.page, vol. 7, No. 1, Mar. 31, 2015, pp. 3-10. (Official Copy only). {See communication under 37 CFR § 1.98(a) (3)}.
Corrected Notice of Allowance received for U.S. Appl. No. 17/555,030, mailed on May 21, 2024, 4 pages.
Creswell et al., "Generative Adversarial Networks", IEEE Signal Processing Magazine, Jan. 2018, pp. 53-65.
Daxm, "How to update your Tesla with your phone app", Retrieved from the internet: https://www.youtube.com/watch?v=8kgNGXycGKE, Oct. 31, 2018, 8 pages.
Deedeevuu, "Amazon Echo Alarm Feature", Online available at: <https://www.youtube.com/watch?v=fdjU8eRLk7c>, Feb. 16, 2015, 1 page.
Ermolina et al., "Voice-Controlled Intelligent Personal Assistants in Health Care: International Delphi Study", Journal of Medical Internet Research, 2021. Online Available at: doi: 10.2196/25312., Apr. 9, 2021, 20 pages.
Fitzpatrick, Aidan, "Introducing Camo 1.5: AR modes", Available Online at: "https://reincubate.com/blog/camo-ar-modes-release/", Oct. 28, 2021, 8 pages.
Francis, Christopher, "PTAB Broadest Reasonable Interpretation: "in response to" Means "subsequent to"", The B2 IP Report retrieved from: http://web.archive.org/web/20220704055910/https:/www.b2ipreport.com/claims-interpreted/ptab-broadest-reasonable-interpretation-in-response-to-means-subsequent-to/, Jan. 27, 2017, 4 pages.
Gadget Hacks, "Tasker Too Complicated? Give MacroDroid a Try [How-To]", Online available at: < https://www.youtube.com/watch?v=8YL9cWCykKc>, May 27, 2016, 1 page.
Google Codelabs, "Extend Dynamic Shortcuts to Google Assistant with App Actions (Beta)" Available on: https://web.archive.org/web/20220524223852/https://codelabs.developers.google.com/codelabs/appactions-dynamic-shortcuts, May 24, 2022, 25 pages.
Google Developers, "Voice search in your app", Online available at: <https://www.youtube.com/watch?v=PS1FbB5qWEI>, Nov. 12, 2014, 1 page.
Gu et al. "Alohomora: Motion-Based Hotword Detection in Head-Mounted Displays", IEEE Internet of Things Journal, vol. 7, No. 1, Jan. 2020, pp. 611-620.
Hanqing et al., "Deep Learning of Instruction Intention Understanding Using Stacked Denoising Autoencoder", Journal of Shanghai Jiaotong University, vol. 50, No. 7, Jul. 28, 2016, 6 pages (Official Copy only). {See communication under 37 CFR § 1.98(a) (3)}.
Hawkeye, "Hawkeye—A better user testing platform", Online Available at: https://www.youtube.com/watch?v=el0TW0g_760, Oct. 16, 2019, 3 pages.
Hook et al., "Automatic speech-based emotion recognition using paralinguistics features", Bulletin of the Polish Academy of Sciences, Technical Sciences, vol. 67, No. 3, 2019, pp. 479-488.
Ikeda, Masaru, "beGLOBAL Seoul 2015 Startup Battle: Talkey", YouTube Publisher, Online Available at: <https://www.youtube.com/watch?v=4Wkp7sAAldg>, May 14, 2015, 1 page.
Li et al., "Deep neural network for short-text sentiment classification", International Conference on Database Systems for Advanced Applications, Springer, Cham, 2016, 8 pages.
Maharjan et al., "Alexa, What Should I Eat? : A Personalized Virtual Nutrition Coach for Native American Diabetes Patients Using Amazon's Smart Speaker Technology", 2019 IEEE International Conference on E-health Networking, Application & Services (Health.Com), Online Available at: https://ieeexplore.ieee.org/document/9009613, 2019, 6 pages.
Marketing Land, "Amazon Echo: Play music", Online Available at: <https://www.youtube.com/watch?v=A7V5NPbsXi4>, Apr. 27, 2015, 3 pages.
Matias, Yossi, "Easier access to web pages: Ask Google Assistant to read it aloud", Available online at: https://blog.google/products/assistant/easier-access-web-pages-let-assistant-read-it-aloud/, Mar. 4, 2020, 3 pages.
Mehri et al., "Multi-Granularity Representations of Dialog", Language Technologies Institute, Carnegie Mellon University, arXiv:1908.09890v1, Aug. 26, 2019, 10 pages.
Michalevsky et al., "Gyrophone: Recognizing Speech from Gyroscope Signals", Proceedings of the 23rd USENIX Security Symposium, Aug. 20-22, 2014, pp. 1053-1067.
Modern Techies, "Braina-Artificial Personal Assistant for PC(like Cortana, Siri)!!!!", Online available at: <https://www.youtube.com/watch?v=_Coo2P8ilqQ>, Feb. 24, 2017, 3 pages.
Myers, Brad A., "Shortcutter for Palm", Available at: <http://www.cs.cmu.edu/~pebbles/v5/shortcutter/palm/index.html>, retrieved on Jun. 18, 2014, 10 pages.
Myrick et al., "How to Insert Emojis Using Your Voice with Google Assistant", Online available at: <https://web.archive.org/web/20211107160722/https://www.androidcentral.com/how-insert-emojis-using-your-voice-google-assistant>, Nov. 7, 2021, 11 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Perlow, Jason, "Alexa Loop Mode with Playlist for Sleep Noise", Online Available at: <https://www.youtube.com/watch?v=nSkSuXziJSg>, Apr. 11, 2016, 3 pages.
Price et al., "Speaker Adaptation of Deep Neural Networks Using a Hierarchy of Output Layers", SLT 2014. Online Available at: IEEE Explore, 2014, pp. 153-158.
Products for Pals—ALS Tech, "Skyle for iPad Pro eye gaze control real world review", Online Available at: <https://www.youtube.com/watch?v=_3TxZtDJpFo>, Aug. 13, 2020, 4 pages.
Samsung Support, "Create a Quick Command in Bixby to Launch Custom Settings by at Your Command", Online Available at: <https://www.facebook.com/samsungsupport/videos/10154746303151213>, Nov. 13, 2017, 1 page.
Siou, Serge, "How to Control Apple TV 3rd Generation Using Remote app", Online available at: <https://www.youtube.com/watch?v=PhyKftZ0S9M>, May 12, 2014, 3 pages.
Tech With Brett, "Google Home Multiple Users Setup", Available online at: https://www.youtube.com/watch?v=BQOAbRUeFRo&t=257s, Jun. 29, 2017, 4 pages.
Velian Speaks Tech, "10 Google Assistant Tips!", Available online at: https://www.youtube.com/watch?v=3RNWA3NK9fs, Feb. 24, 2020, 3 pages.
White et al., "Task completion detection: A Study in the Context of Intelligent Systems", Proceedings of the 42nd International ACM SIGIR Conference on Research and Development in Information Retrieval, Jul. 21-25, 2019, pp. 405-414.
Yang, Astor, "Control Android TV via Mobile Phone APP RKRemoteControl", Online Available at: <https://www.youtube.com/watch?v=zpmUeOX_xro>, Mar. 31, 2015, 4 pages.

(56) References Cited

OTHER PUBLICATIONS

Yeh et al., “Dialog Modeling in Audiobook Synthesis”, Retrieved on Sep. 27, 2023, 6 pages.
Yousef, Zulfikar A., “Braina (A.I) Artificial Intelligence Virtual Personal Assistant”, Online available at: <https://www.youtube.com/watch?v=2h6xpB8bPSA>, Feb. 7, 2017, 3 pages.
Zhang et al., “A Fiber-Optic Sensor for Acoustic Emission Detection in a High Voltage Cable System”, Online Available at: https://www.mdpi.com/1424-8220/16/12/2026, Nov. 30, 2016, 11 pages.
Zhang et al., “IEHouse: A Non-Intrusive Household Appliance State Recognition System”, IEEE Smart World, Ubiquitous Intelligence & Computing, Advanced & Trusted Computed, 2017, 8 pages.
Zhang et al., “Voicemoji: Emoji Entry Using Voice for Visually Impaired People”, CHI ’21, May 8-13, 2021, 18 pages.
Zhao et al., “Big Data Analysis and Application”, Aviation Industry Press, Dec. 2015, pp. 236-241 (Official Copy Only). {See communication under 37 CFR § 1.98(a) (3)}.
Zhao et al., “Transferring Age and Gender Attributes for Dimensional Emotion Prediction from Big Speech Data Using Hierarchical Deep Learning”, 2018 4th IEEE International Conference on Big Data Security on Cloud, 2018, pp. 20-24.
Zhou et al., “Using Paralinguistic Information to Disambiguate User Intentions for Distinguishing Phrase Structure and Sarcasm in Spoken Dialog Systems”, IEEE Spoken Language Technology Workshop (SLT), Jan. 19, 2021, pp. 1020-1027.
Extended European Search Report received for European Patent Application No. 25160587.9, mailed on May 21, 2025, 6 pages.
Intention to Grant received for European Patent Application No. 18726271.2, mailed on Jan. 7, 2025, 9 pages.

* cited by examiner

MULTI-MODAL INTERFACES

This application is a continuation of U.S. Nonprovisional patent application Ser. No. 17/555,030 entitled "MULTI-MODAL INTERFACES HAVING SELECTION DISAMBIGUATION AND TEXT MODIFICATION CAPABILITY," filed on Dec. 17, 2021, which is a continuation of U.S. Nonprovisional patent application Ser. No. 15/917,410, entitled "MULTI-MODAL INTERFACES," filed on Mar. 9, 2018, now U.S. Pat. No. 11,231,903, which claims priority from U.S. Provisional Patent Application Ser. No. 62/506,571, entitled "MULTI-MODAL INTERFACES," filed on May 15, 2017, the contents of which are hereby incorporated by reference in their entirety for all purposes.

FIELD

The present disclosure relates generally to user interfaces and, more specifically, to multi-modal user interfaces.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input including a user request to a digital assistant operating on an electronic device. The digital assistant can interpret the user's intent from the speech input and operationalize the user's intent into one or more tasks. The tasks can then be performed by executing one or more services of the electronic device, and a relevant output responsive to the user request can be returned to the user. Typically, however, digital assistants are limited in the manner in which they provide interaction between human users and electronic devices. In many instances such interactions are limited to a single mode of interaction.

SUMMARY

Example methods are disclosed herein. An example method includes, at an electronic device having one or more processors and a touch-sensitive display, receiving a first user input of a first input type, the first user input including a plurality of words; displaying, on the touch-sensitive display, the plurality of words; receiving a second user input of a second input type indicating a selection of a word of the plurality of words, the second input type different than the first input type; receiving a third user input; modifying the selected word based on the third user input to provide a modified one or more words; and displaying, on the touch-sensitive display, the modified one or more words.

An example method includes, at an electronic device having one or more processors, receiving context information associated with the electronic device; determining whether one or more criteria for disabling an output type are met based on the context information associated with the electronic device; and in accordance with a determination that the one or more criteria for disabling the output type are met, disabling the output type.

An example method includes, at an electronic device having one or more processors, receiving a user input of a first input type, the user input indicative of a task; performing the task in response to the user input; determining whether the task may be performed in response to a user input of a second input type; and in accordance with a determination that the task may be performed in response to a user input of a second input type, providing an output indicative of the user input of the second input type.

An example method includes, at an electronic device having one or more processors, receiving a user input of a first input type, the user input indicative of a task; determining whether additional input is required to perform the task; and in accordance with a determination that additional input is required to perform the task: requesting a user input of a second input type; receiving the user input of the second input type; and performing the task based on the user input of the second input type.

Example non-transitory computer-readable media are disclosed herein. An example non-transitory computer-readable storage medium stores one or more programs. The one or more programs comprise instructions, which when executed by one or more processors of an electronic device having a touch-sensitive display, cause the electronic device to receive a first user input of a first input type, the first user input including a plurality of words; display, on the touch-sensitive display, the plurality of words; receive a second user input of a second input type indicating a selection of a word of the plurality of words, the second input type different than the first input type; receive a third user input; modify the selected word based on the third user input to provide a modified one or more words; and display, on the touch-sensitive display, the modified one or more words.

An example non-transitory computer-readable storage medium stores one or more programs. The one or more programs comprise instructions, which when executed by one or more processors of an electronic device, cause the electronic device to receive context information associated with the electronic device; determine whether one or more criteria for disabling an output type are met based on the context information associated with the electronic device; and in accordance with a determination that the one or more criteria for disabling the output type are met, disable the output type.

An example non-transitory computer-readable storage medium stores one or more programs. The one or more programs comprise instructions, which when executed by one or more processors of an electronic device, cause the electronic device to receive a user input of a first input type, the user input indicative of a task; perform the task in response to the user input; determine whether the task may be performed in response to a user input of a second input type; and in accordance with a determination that the task may be performed in response to a user input of a second input type, provide an output indicative of the user input of the second input type.

An example non-transitory computer-readable storage medium stores one or more programs. The one or more programs comprise instructions, which when executed by one or more processors of an electronic device, cause the electronic device to receive a user input of a first input type, the user input indicative of a task; determine whether additional input is required to perform the task; and in accordance with a determination that additional input is required to perform the task: request a user input of a second input type; receive the user input of the second input type; and perform the task based on the user input of the second input type.

Example electronic devices are disclosed herein. An example electronic device comprises one or more processors; a memory; and one or more programs, where the one or more programs are stored in the memory and configured to be executed by the one or more processors, the one or more programs including instructions for receiving a first user input of a first input type, the first user input including a plurality of words; displaying, on the touch-sensitive display, the plurality of words; receiving a second user input of a second input type indicating a selection of a word of the plurality of words, the second input type different than the first input type; receiving a third user input; modifying the selected word based on the third user input to provide a modified one or more words; and displaying, on the touch-sensitive display, the modified one or more words.

An example electronic device comprises one or more processors; a memory; and one or more programs, where the one or more programs are stored in the memory and configured to be executed by the one or more processors, the one or more programs including instructions for receiving context information associated with the electronic device; determining whether one or more criteria for disabling an output type are met based on the context information associated with the electronic device; and in accordance with a determination that the one or more criteria for disabling the output type are met, disabling the output type.

An example electronic device comprises one or more processors; a memory; and one or more programs, where the one or more programs are stored in the memory and configured to be executed by the one or more processors, the one or more programs including instructions for receiving a user input of a first input type, the user input indicative of a task; performing the task in response to the user input; determining whether the task may be performed in response to a user input of a second input type; and in accordance with a determination that the task may be performed in response to a user input of a second input type, providing an output indicative of the user input of the second input type.

An example electronic device comprises one or more processors; a memory; and one or more programs, where the one or more programs are stored in the memory and configured to be executed by the one or more processors, the one or more programs including instructions for receiving a user input of a first input type, the user input indicative of a task; determining whether additional input is required to perform the task; and in accordance with a determination that additional input is required to perform the task: requesting a user input of a second input type; receiving the user input of the second input type; and performing the task based on the user input of the second input type.

An example electronic device comprises means for receiving a first user input of a first input type, the first user input including a plurality of words; means for displaying, on the touch-sensitive display, the plurality of words; means for receiving a second user input of a second input type indicating a selection of a word of the plurality of words, the second input type different than the first input type; means for receiving a third user input; modifying the selected word based on the third user input to provide a modified one or more words; and means for displaying, on the touch-sensitive display, the modified one or more words.

An example electronic device comprises means for receiving context information associated with the electronic device; means for determining whether one or more criteria for disabling an output type are met based on the context information associated with the electronic device; and means for, in accordance with a determination that the one or more criteria for disabling the output type are met, disabling the output type.

An example electronic device comprises means for receiving a user input of a first input type, the user input indicative of a task; means for performing the task in response to the user input; means for determining whether the task may be performed in response to a user input of a second input type; and means for, in accordance with a determination that the task may be performed in response to a user input of a second input type, providing an output indicative of the user input of the second input type.

An example electronic device comprises means for receiving a user input of a first input type, the user input indicative of a task; means for determining whether additional input is required to perform the task; and means for, in accordance with a determination that additional input is required to perform the task: requesting a user input of a second input type; receiving the user input of the second input type; and performing the task based on the user input of the second input type.

Receiving a user input indicating a selection of a word of the plurality of words and modifying the selected word based on the third user input to provide a modified one or more words allows the electronic device to intuitively and reliably interact with a user of the electronic device. Improving interactions between a user and the electronic device in this manner enhances the operability of the electronic device and makes the user-device interface more efficient which, additionally, reduces power usage and improves battery life of the device by enabling the user to use the device more quickly and efficiently.

Determining whether one or more criteria for disabling an output type are met based on the context information associated with the electronic device and selectively disabling the output type allows the electronic device to provide outputs in an intuitive and appropriate manner. Improving the manner in which outputs are provided enhances user experience by ensuring that outputs are provided to the user according to user preferences and circumstances. Further, selectively disabling outputs ensures that outputs are not needlessly provided to a user, which, additionally, reduces power usage and improves battery life of the devices.

Determining whether a task may be performed in response to a user input and selectively providing an output indicative of the user input allows the electronic device to indicate to a user additional and alternative ways in which the electronic device may be operated. Indicating alternative inputs to a user in this manner enhances the operability of the device and makes the user-device interface more efficient (e.g., by ensuring that a user is aware of intuitive, reliable, and/or efficient inputs that may be used, for instance, to provide user requests to a digital assistant of the electronic device) which, additionally, reduces power usage and improves battery life of the device by enabling the user to use the device more quickly and efficiently.

Determining whether additional input is required to perform a task and requesting the additional input according to an input of a particular type allows the electronic device to request input in a manner determined to be most intuitive and/or efficient for providing the input. Improving the manner in which inputs are provided enhances the operability of the device and makes the user-device interface more efficient (e.g., by indicating the input type that is best used to provide inputs having the input type) which, additionally, reduces power usage and improves battery life of the device by enabling the user to use the device more quickly and efficiently.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
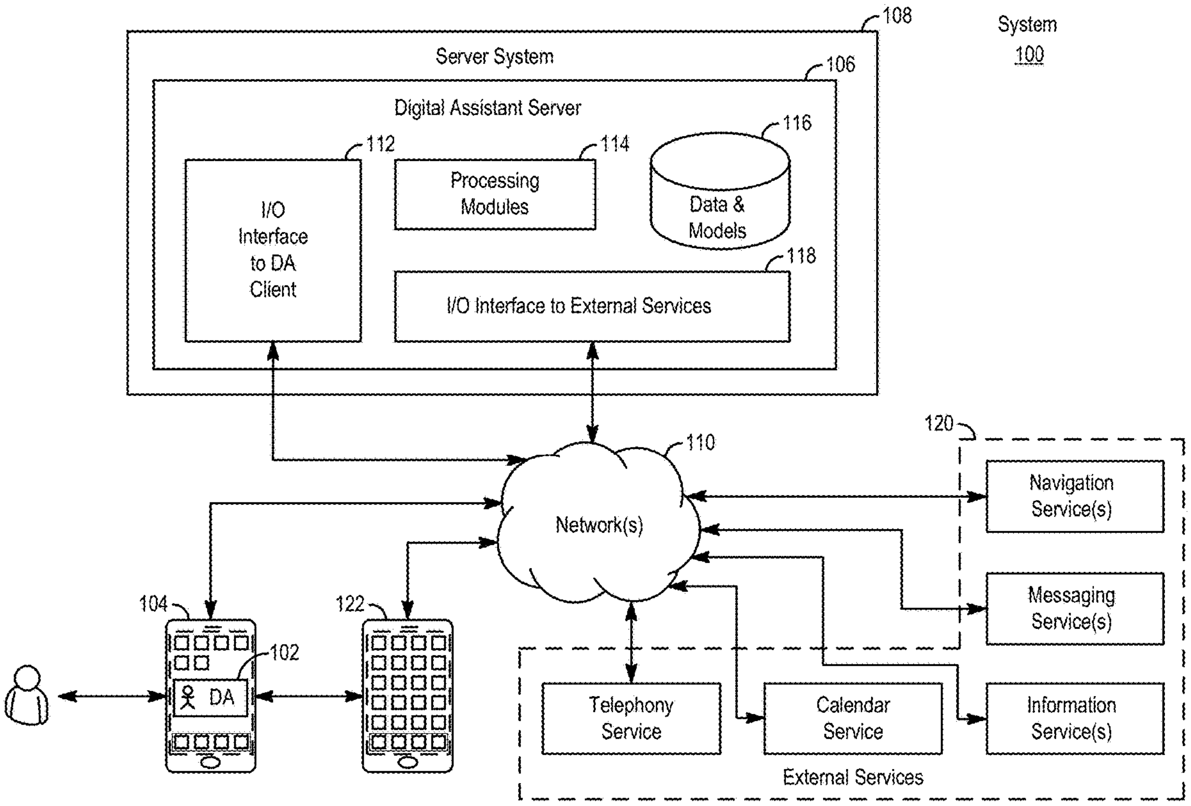
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time.

There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-6B.) A portable multifunctional device is, for example, a mobile telephone that also contains other functions, such as PDA and/or music player functions. Specific examples of portable multifunction devices include the iPhone®, iPod Touch®, and iPad® devices from Apple Inc. of Cupertino, California. Other examples of portable multifunction devices include, without limitation, laptop or tablet computers. Further, in some examples, user device 104 is a non-portable multifunctional device. In particular, user device 104 is a desktop computer, a game console, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and return relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
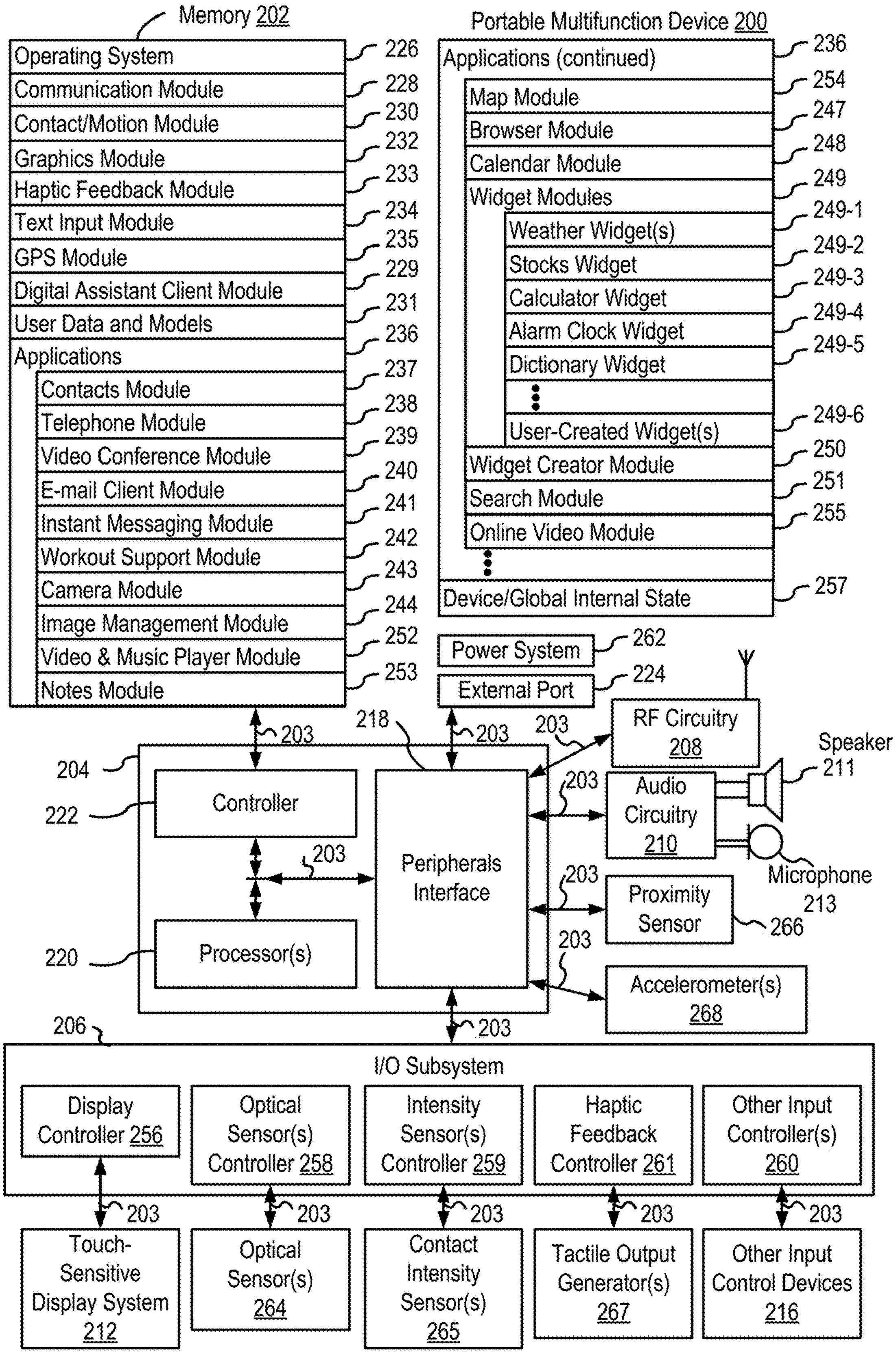
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
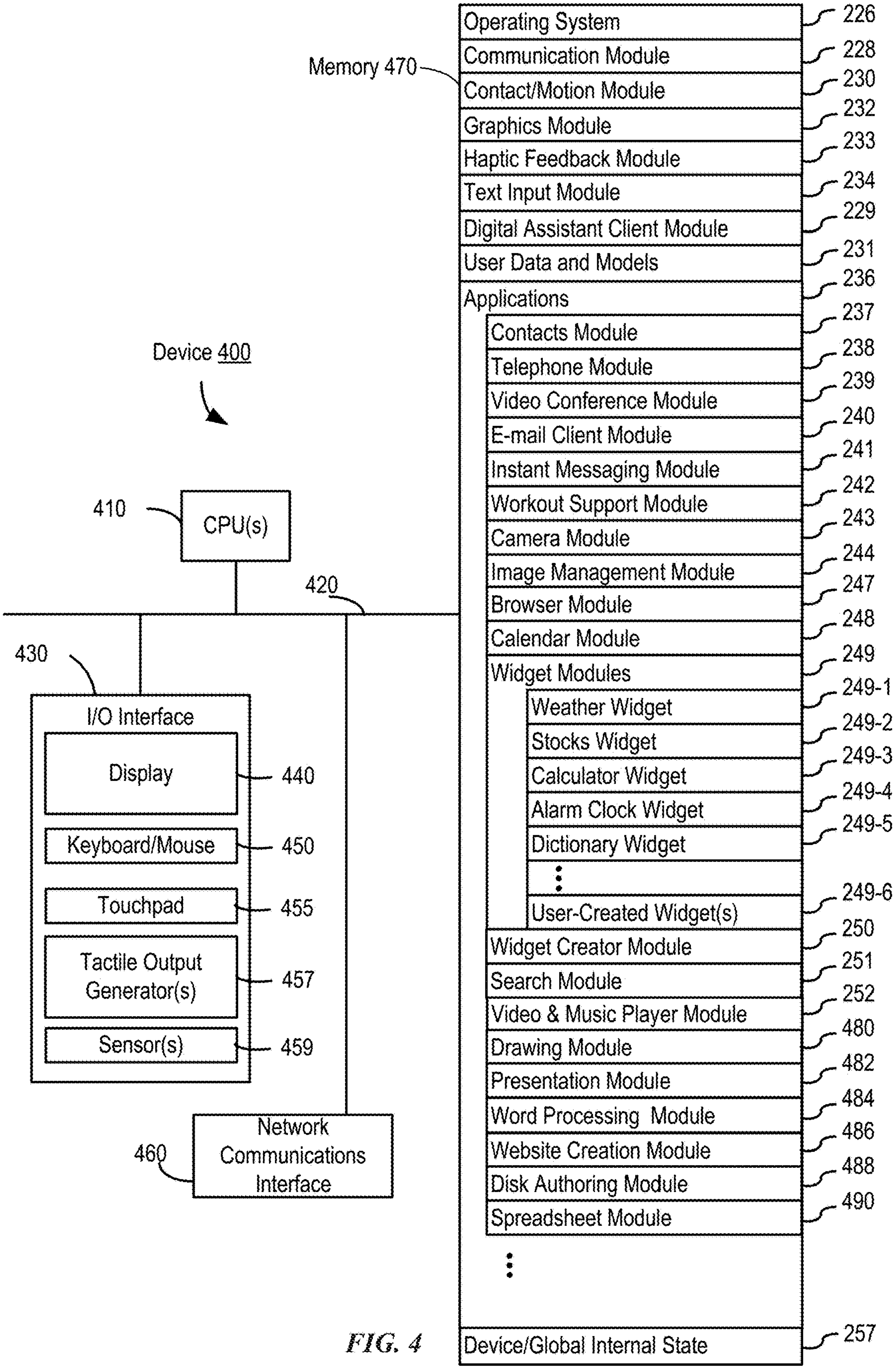
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email client module 240, IM 241, browser 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also includes the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
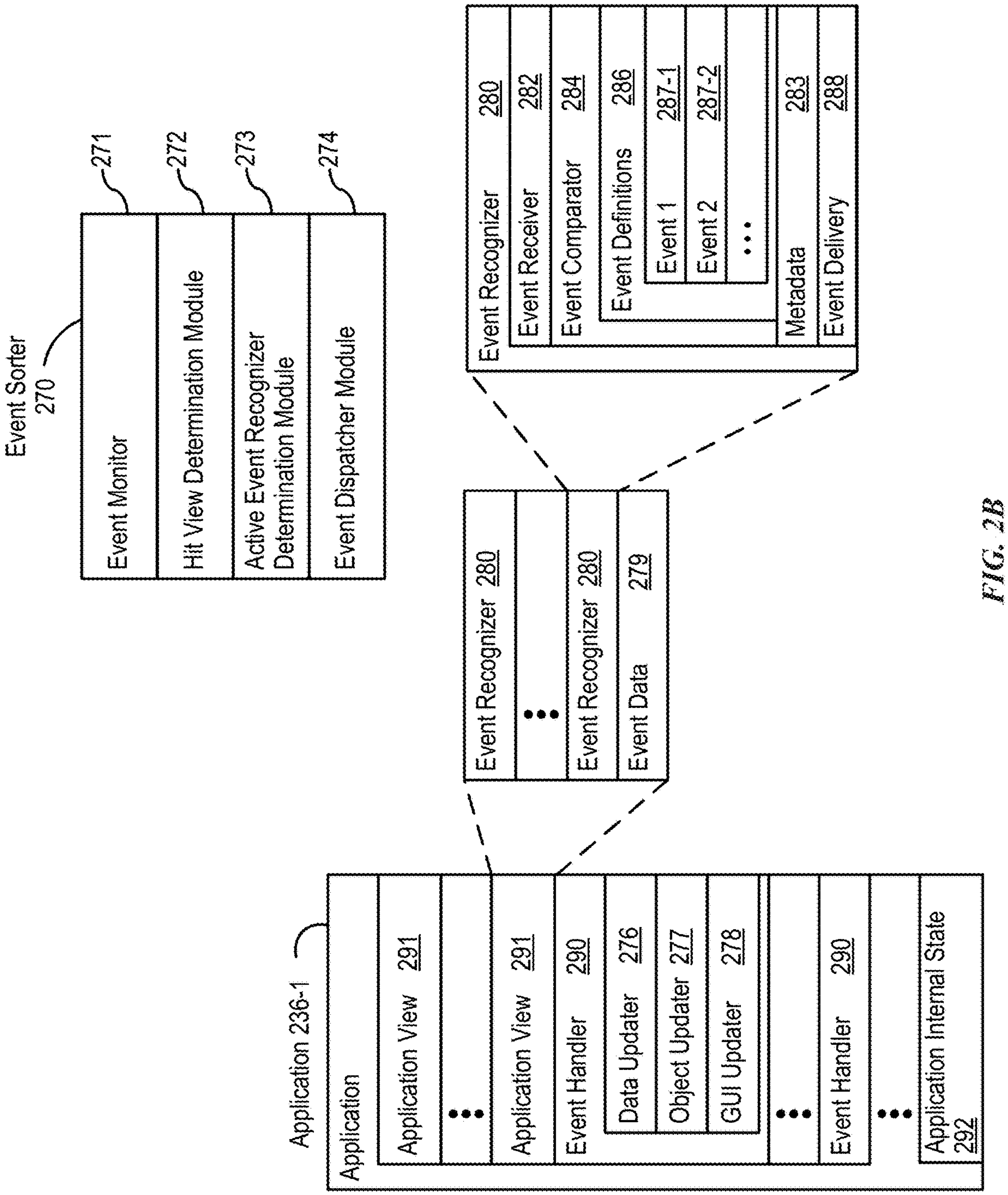
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
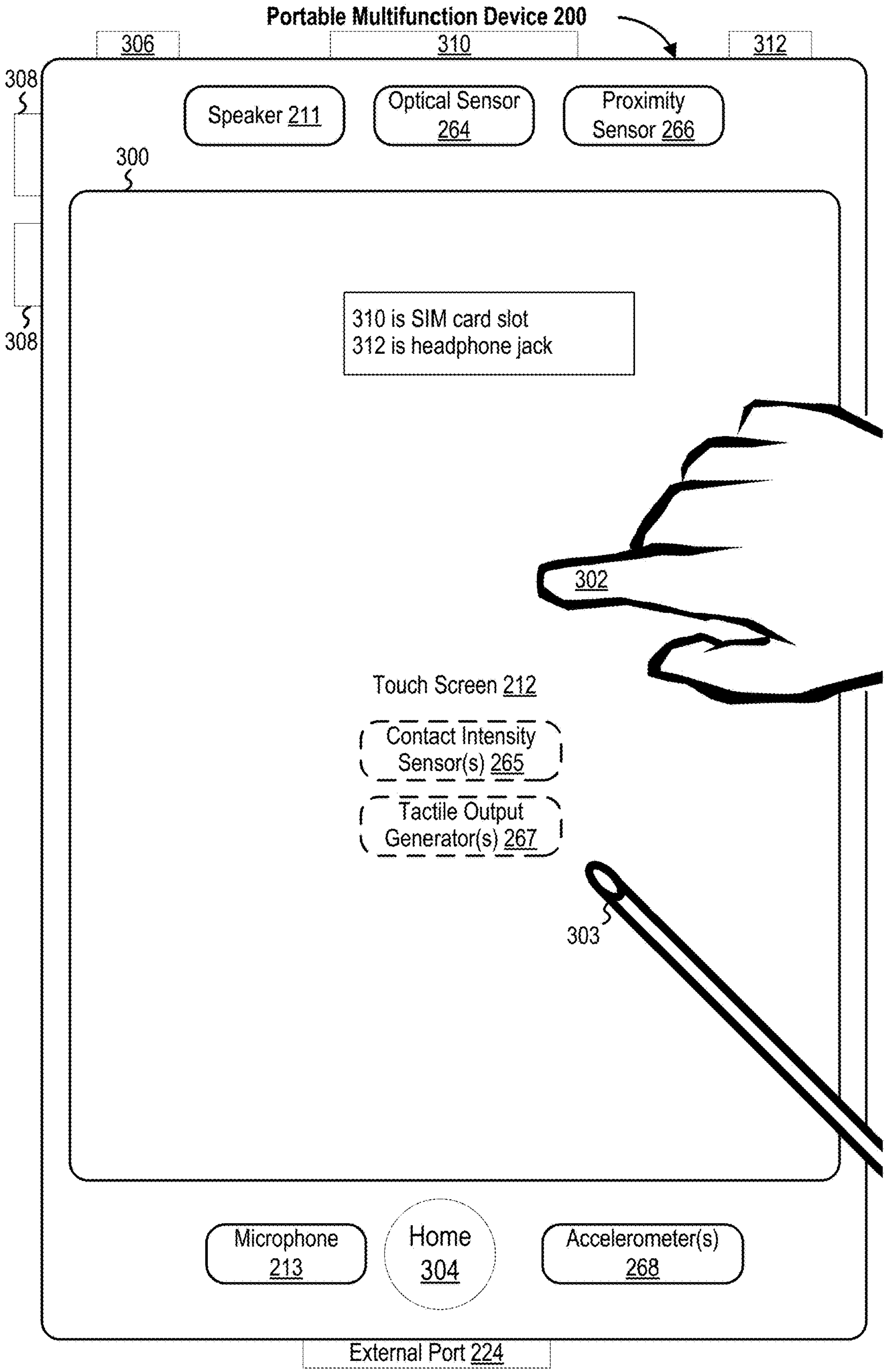
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
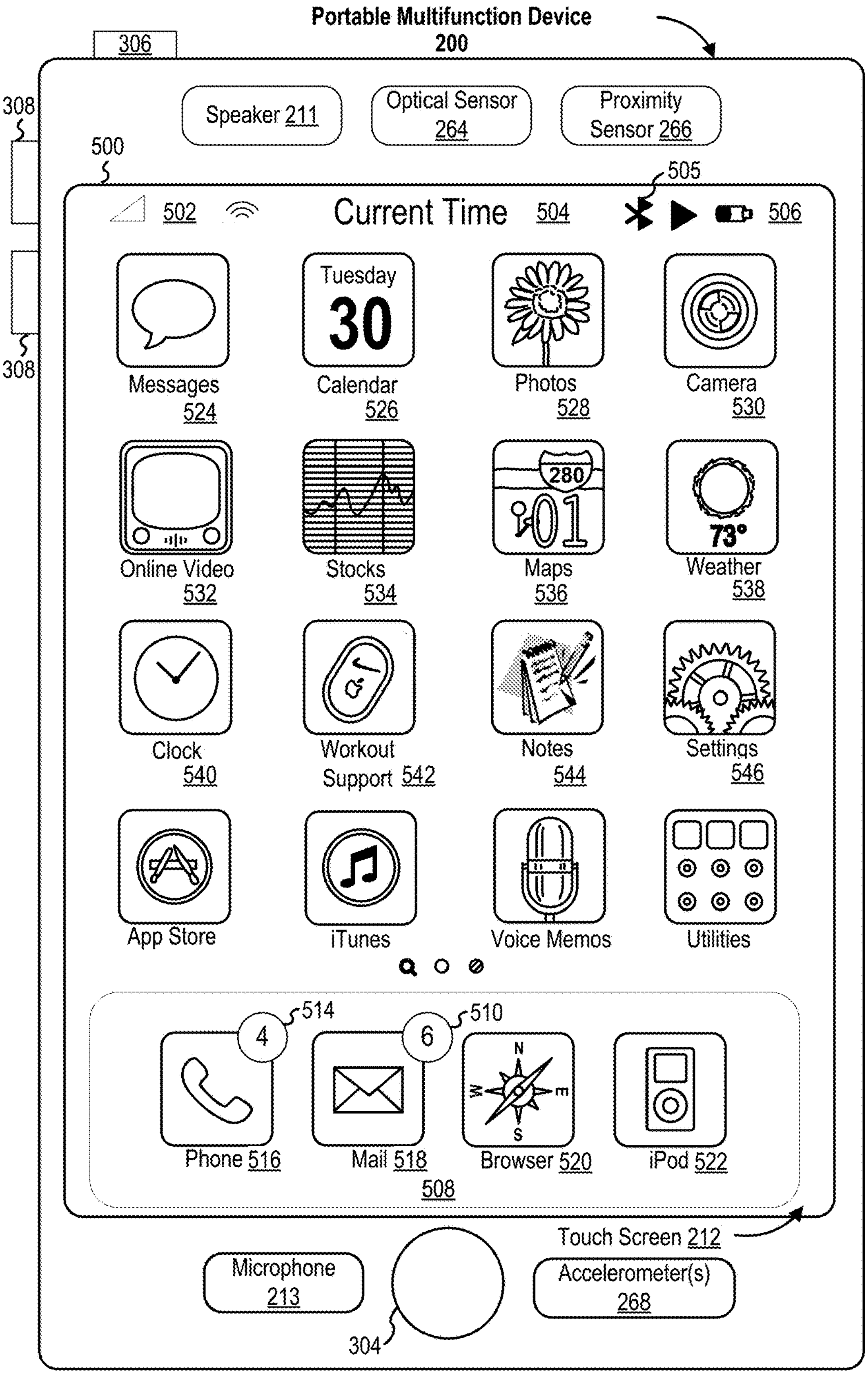
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
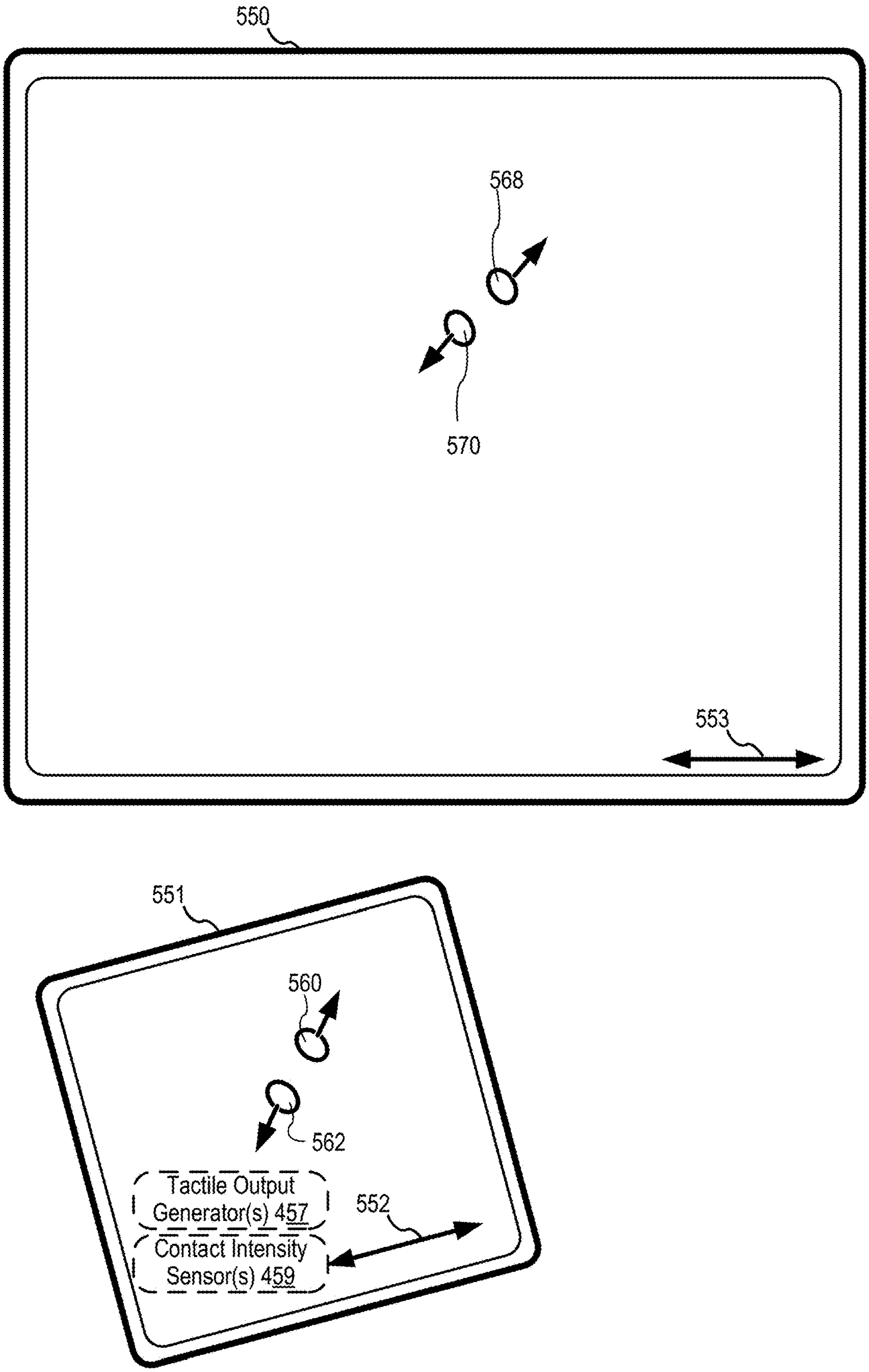
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
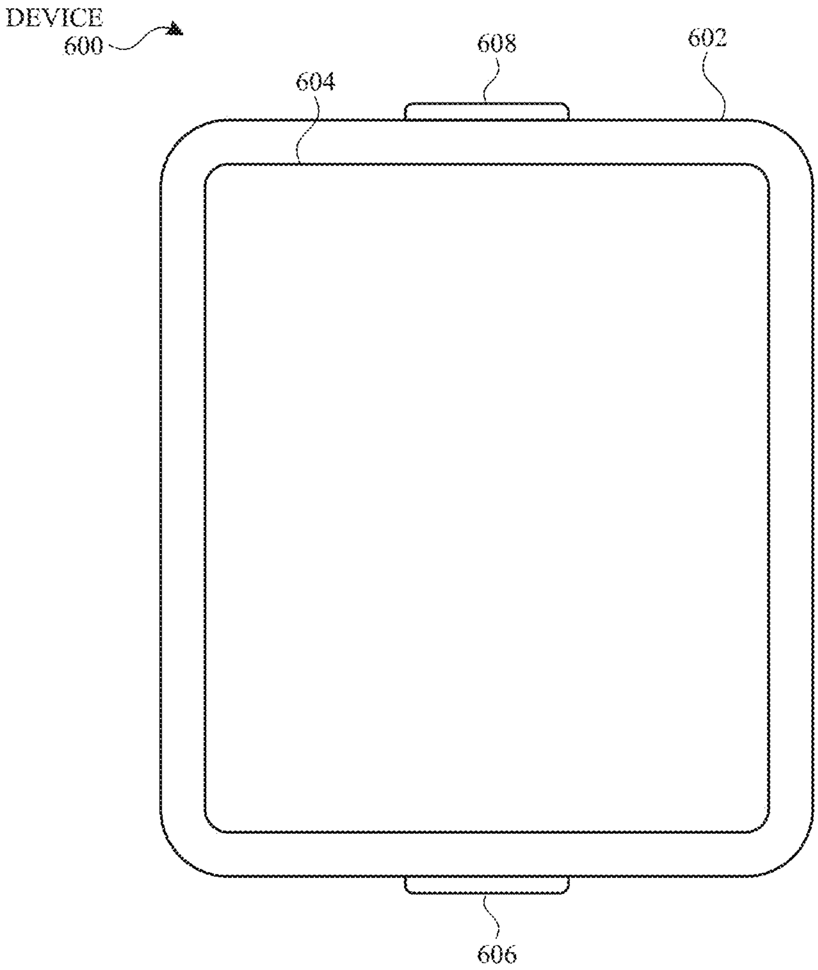
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
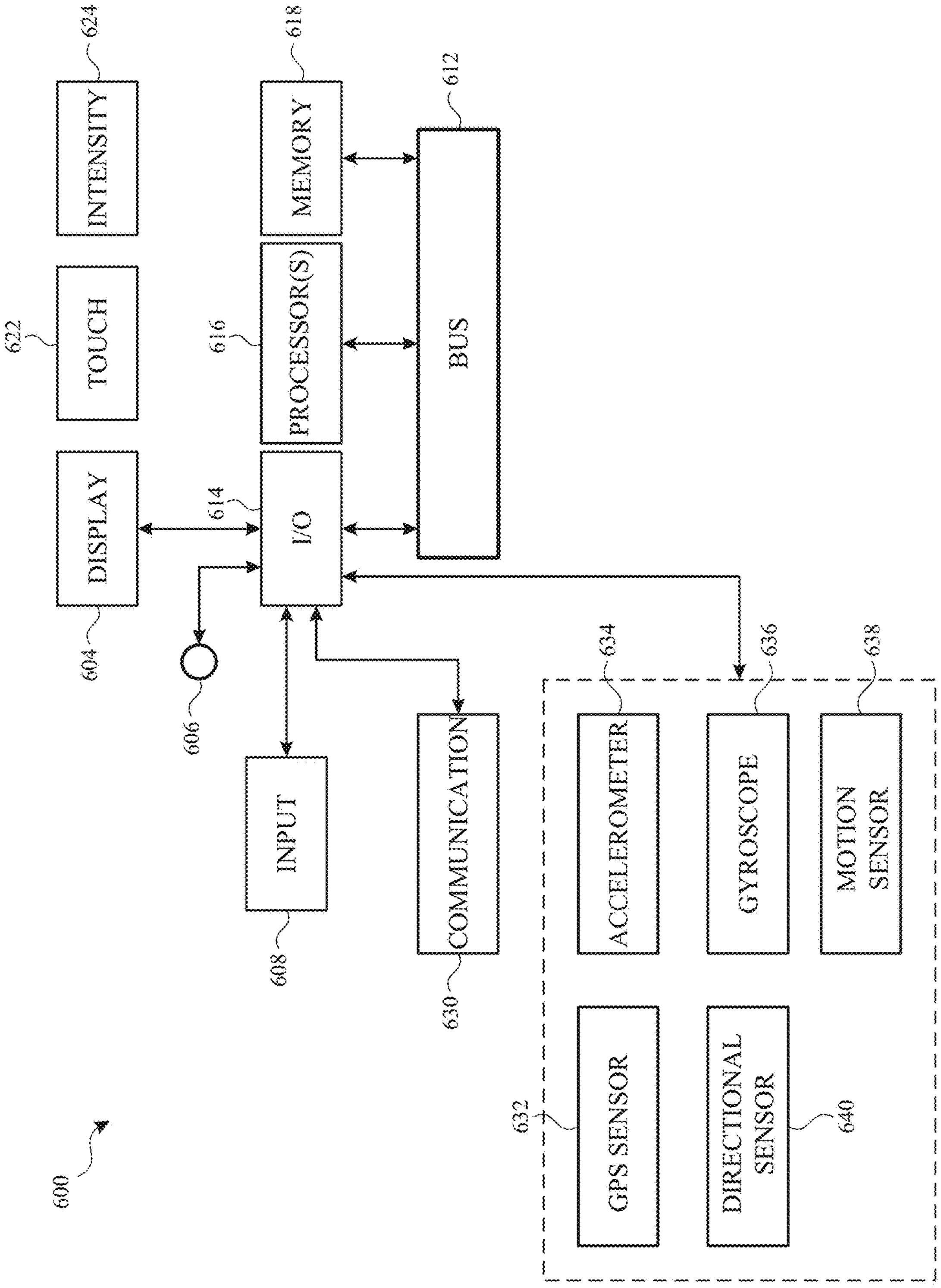
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
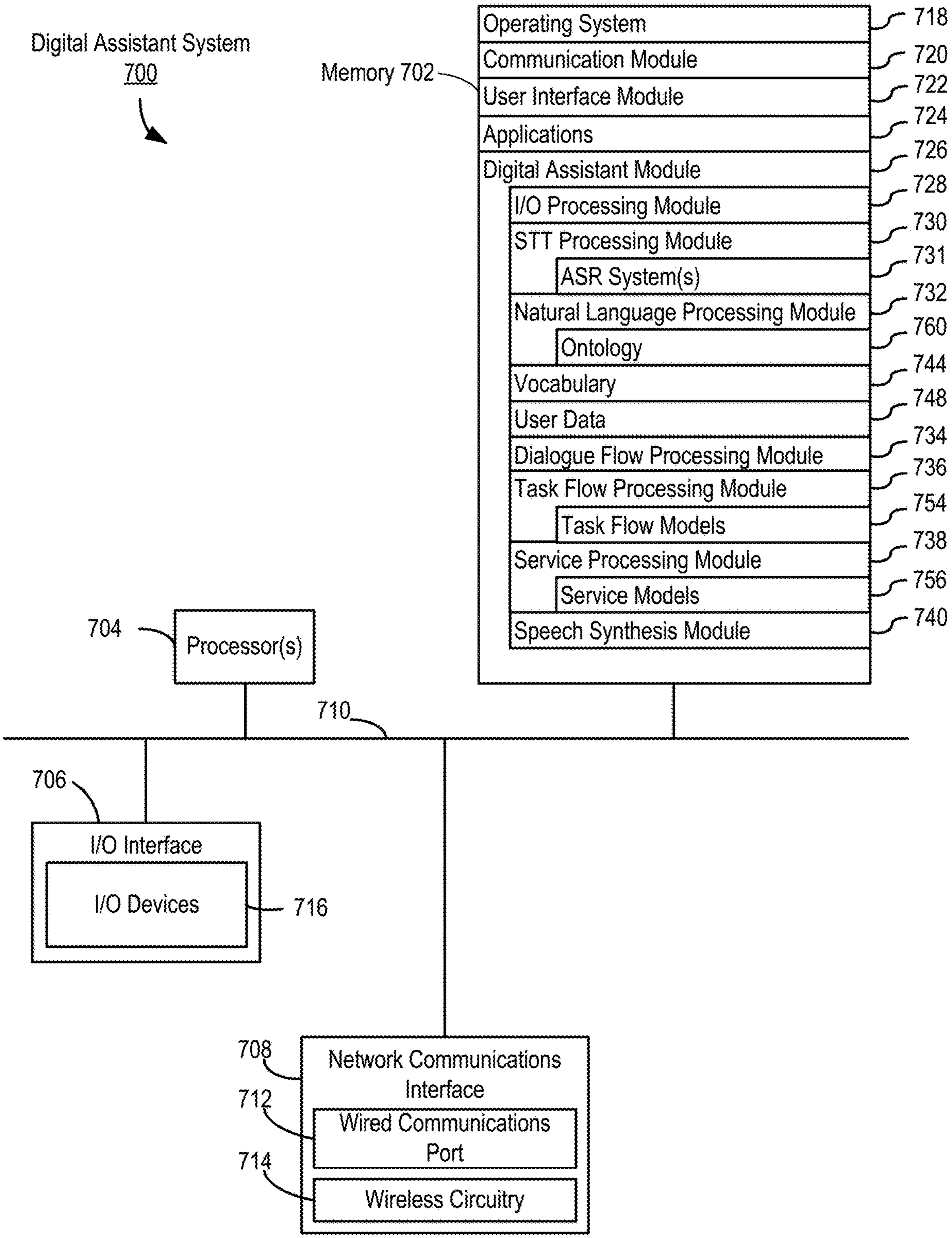
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIG. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules has access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
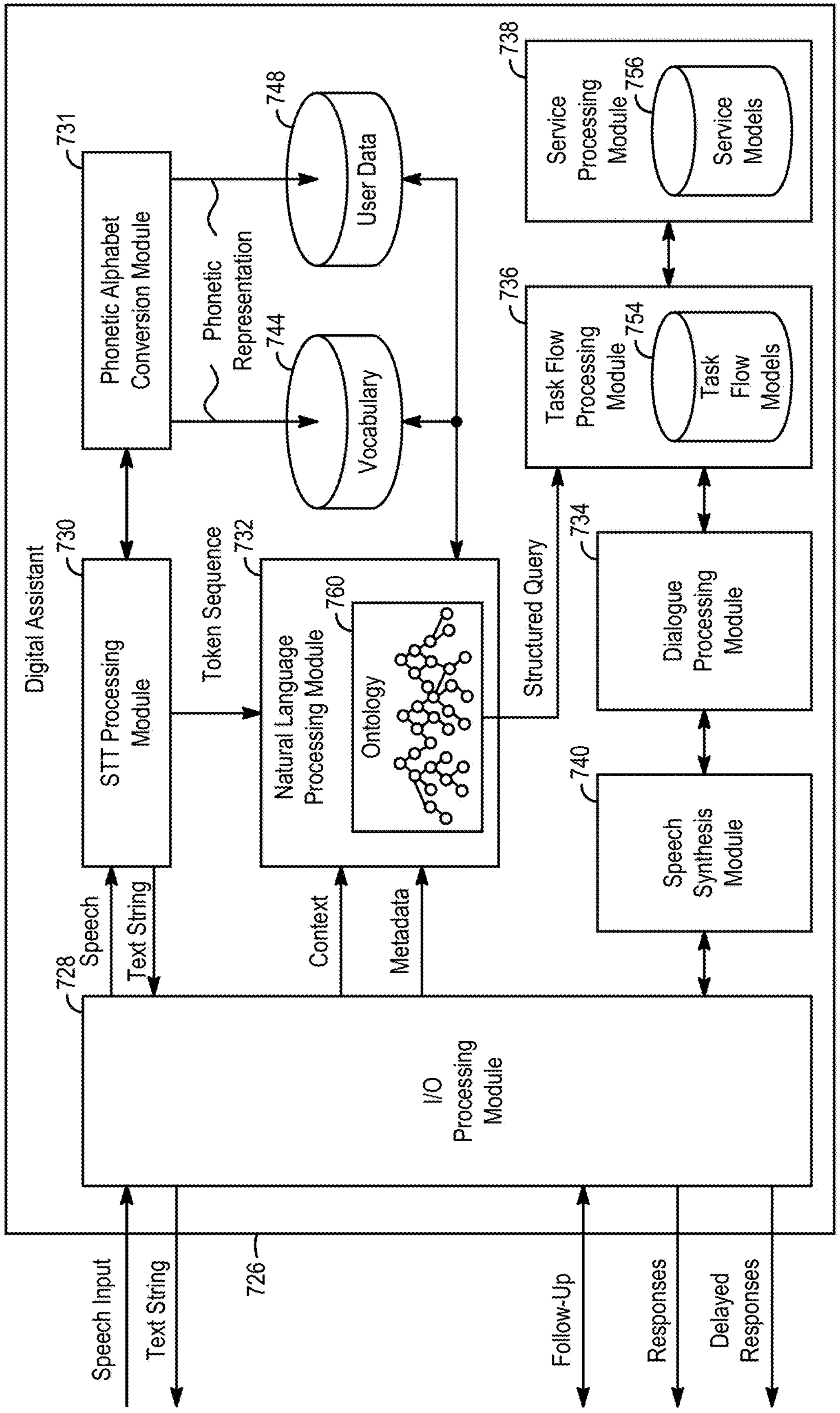
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems. The one or more ASR systems can process the speech input that is received through I/O processing module 728 to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪɾoʊ/ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'mcɪroʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
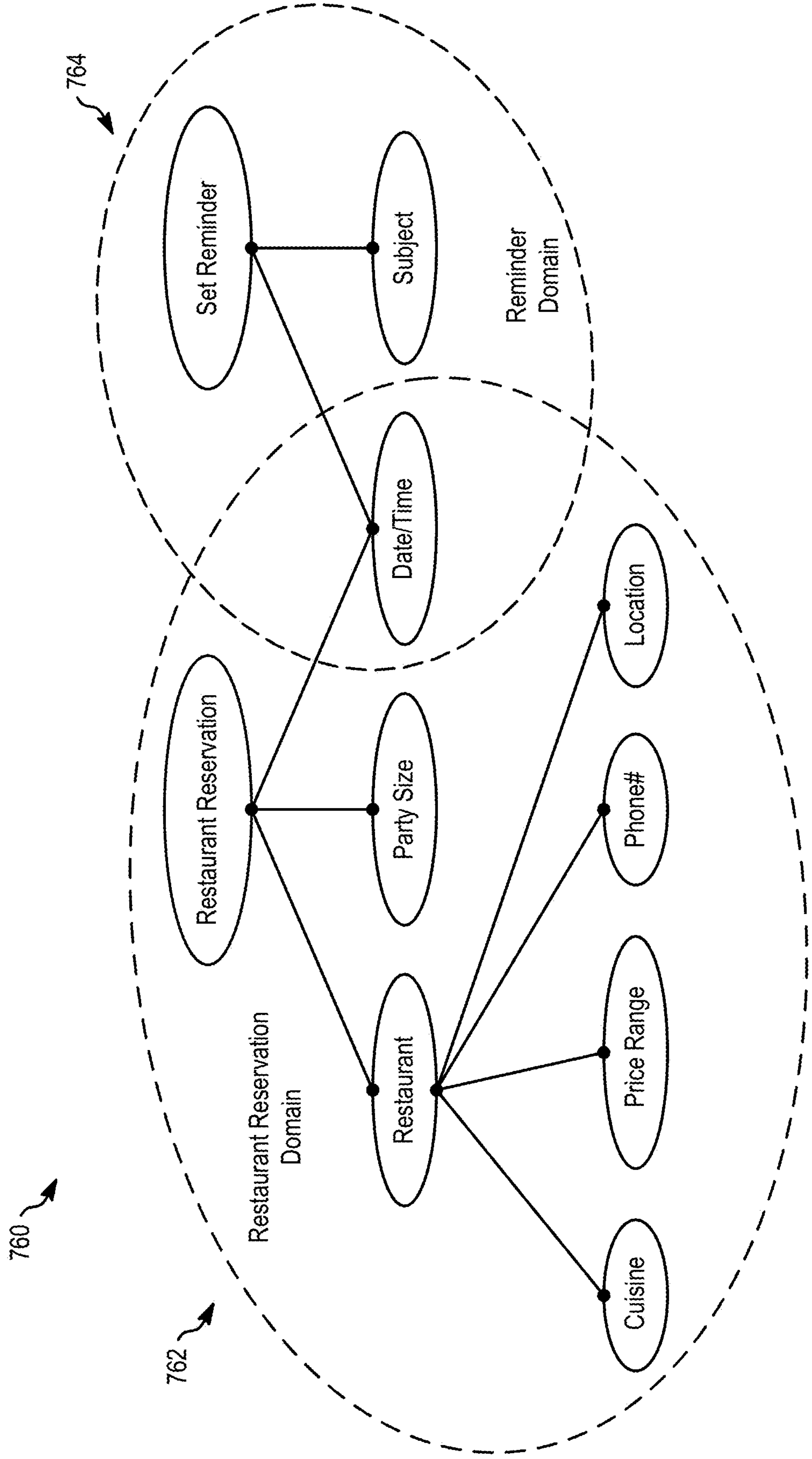
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked concept nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanism are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi" } and {Time="7 pm" }. However, in this example, the user's utterance contains insufficient information to complete the structured query associated with the domain. Therefore, other necessary parameters such as {Party Size} and {Date} is not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generate requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis module 740 is configured to synthesize speech outputs for presentation to the user. Speech synthesis module 740 synthesizes speech outputs based on text provided by the digital assistant. For example, the generated dialogue response is in the form of a text string. Speech synthesis module 740 converts the text string to an audible speech output. Speech synthesis module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 is configured to synthesize individual words based on phonemic strings corresponding to the words. For example, a phonemic string is associated with a word in the generated dialogue response. The phonemic string is stored in metadata associated with the word. Speech synthesis model 740 is configured to directly process the phonemic string in the metadata to synthesize the word in speech form.

In some examples, instead of (or in addition to) using speech synthesis module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Multi-Modal Interfaces

Figure 8A:
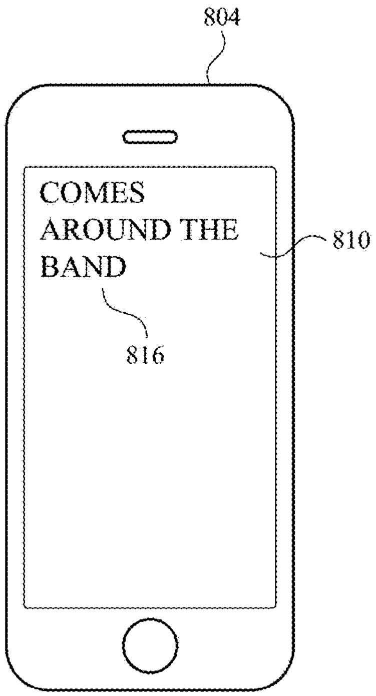
FIGS. 8A-C provide illustrations of multi-modal interaction with an electronic device, according to various examples.
Figure 8B:
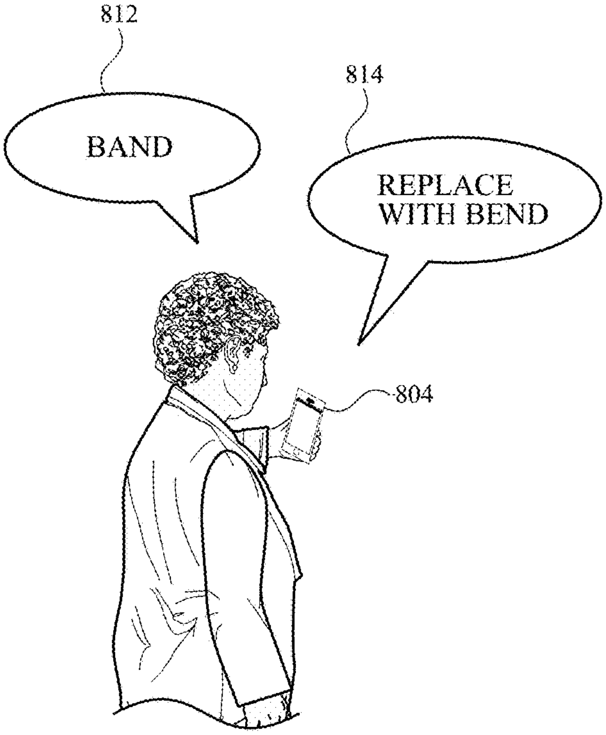
Figure 8C:
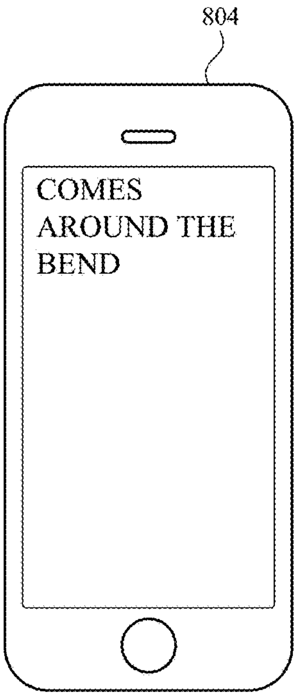

FIGS. 8A-C illustrate various electronic devices of an environment and exemplary user interfaces of the electronic devices, according to various examples. These figures are also used to illustrate one or more of the processes described below, including the process 1300 of FIG. 13.

FIG. 8A illustrates an electronic device 804. The electronic device 804 may be any device described herein, including but not limited to devices 104, 200, 400, and 600 (FIGS. 1, 2A, 4, and 6A-6B). Thus, while the electronic device 804 is depicted as a mobile device, it will be appreciated that the electronic device 804 may be a device of any type, such as a phone, laptop computer, desktop computer, tablet, wearable device (e.g., smart watch), set-top box, television, home automation device (e.g., thermostat), or any combination or subcombination thereof.

In operation, the electronic device 804 receives a first user input from a user of the electronic device 804. The first user input may be a user input of any type including, but not limited to, a touch input, a speech input (e.g., natural-language speech input), a switch input (e.g., a user toggles a physical switch of the electronic device), and/or a typed input (e.g., user enters text using a keyboard interfaced with the electronic device 804).

In some examples, the first user includes a plurality of words. In the illustrated example, a typed user input received by the electronic device 804 includes the words "Comes around the band", which are in turn displayed on a display (e.g., touch-sensitive display) of the electronic device 804. The plurality of words may be provided during operation of a messaging application, email application, word processing application, or any other application of the electronic device 804.

In examples in which the first user input is a speech input (e.g., natural-language speech input), the electronic device may provide a text representation of the speech input and display the text representation as described. In some examples, providing a text representation in manner may include providing one or more candidate text representations (e.g., text strings) of the speech input, for instance, using an STT processing module of the electronic device 804, such as the STT processing module 730. As described, each of the candidate text representations may be associated with a speech recognition confidence score, and the candidate text representations may be ranked accordingly. The highest ranking candidate text representation may be selected as the text representation of the speech input and displayed on the display of the electronic device 804.

In some examples, the first user input includes a command, for instance to send a message or email to a contact (e.g., "send a message to Tom saying I'll be there in five"). In response, the electronic device 804 may initiate the proper application, populate the interface of the application with one or more words provided in the first user input ("I'll be there in five.")

Thereafter, the electronic device 804 receives a second user input from a user of the electronic device 804. The second user input may be a user input of any type, including but not limited to, a touch input, a speech input, a switch input, a typed input, and/or an input provided by a device interfaced with the electronic device 804 (e.g., mouse click). In some examples, the second user input is a user input of a different user input type than the first user input. The first user input may be a typed user input and the second user input may be a speech input, for instance.

In some examples, the second user input may indicate a selection of one or more words of the plurality of words. By way of example, the second user input can specify a word of the plurality of words. With reference to FIG. 8B, the user input 812 may be a natural-language speech input reciting the word "band" of the words of the first user input. The user's reference to the term "band" may serve as a selection of the word "band" of the plurality of words. In other examples, the second user input can reference a word of the plurality of words. In the illustrated example, a user could, for instance, provide a speech input reciting "fourth word", "last word", or "first word of third line" to reference the word "band" of the plurality of words.

In some examples, the second user input is based on one or more characteristics of the user's appearance or behavior. By way of example, the electronic device 804 may determine a direction and/or target of a user's gaze (e.g., using known facial recognition methods), and based on the direction and/or target of the user's gaze, determine if the user is looking at a particular location of the display of the electronic device 804. If it is determined that the user is looking at one or more words displayed by the electronic device 804, the user's gaze may serve as a selection of the one or more words. With reference to FIGS. 8A-8B, instead of reciting "band", the user may look at a location 816 on the display of the electronic device 804 where the word "band" is displayed.

Figure 9A:
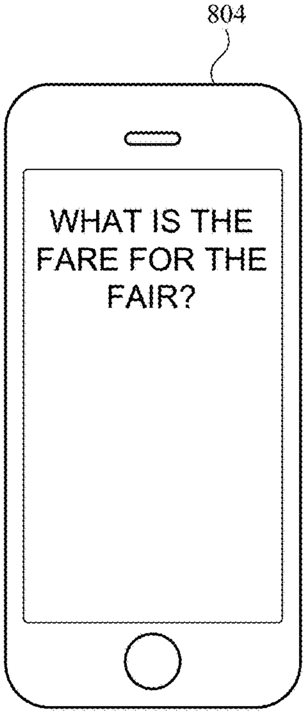
FIGS. 9A-9C provide illustrations of multi-modal interaction with an electronic device, according to various examples.
Figure 9B:
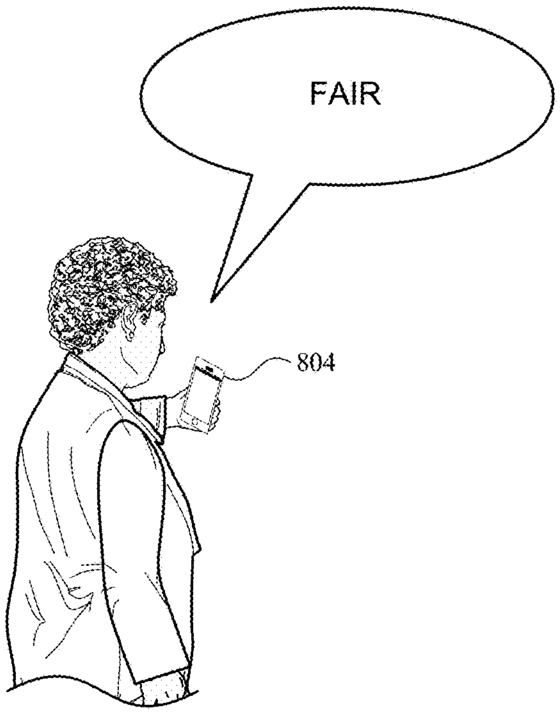
Figure 9C:
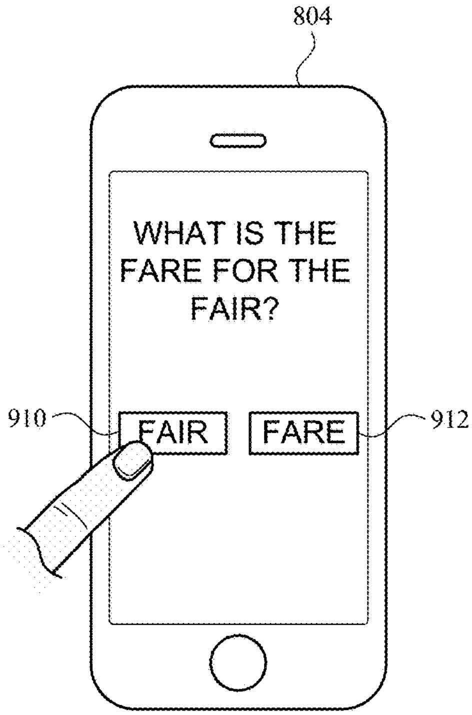

In some examples, determining the selected one or more words of the second user input may require disambiguation. With reference to FIGS. 9A-9C, the electronic device 804 may request a user provide additional user input to disambiguate the selected one or more words. As illustrated, the electronic device 804 may receive a first user input and display words of the first user input on a display of the electronic device 804 (FIG. 9A). The user may thereafter provide a second user input (e.g., "Fair") indicating a selection of a word of the first user input (FIG. 9B). The electronic device 804 then determines whether the selected word requires disambiguation. If so, the electronic device 804 determines a plurality of candidate words for the selected word(s) and provides (e.g., displays) the plurality of candidate words to the user. The user may select a candidate word of the plurality of candidate words to be used as the selected word, as described herein. As depicted in FIG. 9C, the electronic device 804 may determine that each of the candidate words "fare" and "fair" potentially correspond to the word specified by the user in the second user input. Accordingly, the electronic device 804 may provide a respective affordance for each of the candidate words by which each candidate word can be selected. The user may select the affordance 910 using a touch input, for instance, to identify "fair" as the selected word. While description is made herein with respect to disambiguation of a term of the second user input, it will be appreciated that one or more words of other inputs (e.g., first user input, third user input) may be disambiguated in a same or similar manner.

The electronic device 804 further receives a third user input from a user of the electronic device 804. The third user input may be a user input of any type, including but not limited to, a touch input, a speech input, a switch input, a typed input, and/or an input provided by a device interfaced with the electronic device 804. In some examples, the third user input is a user input of a different type than the first user input. Further, in some examples, the third user input is a user input of a same user input type than the second user input.

In some examples, the third user input includes a command (e.g., request to a digital assistant of the electronic device 804). The command may, for instance, be a command to modify one or more words of the plurality of words of the first user input, such as the selected word(s) indicated by the second user input. In some examples, the command is a command to modify formatting and/or text effects of the one or more words. The command may, for instance, specify that one or more words are to be capitalized, italicized, bolded, or underlined (e.g., "Italicize"). In other examples, the command may specify that spelling of a word is to be corrected and/or otherwise modified ("Pluralize it" or "Use the British spelling").

In some examples, the command is a command to replace the selected word with another word provided by the user of the electronic device 804. The replacement word may be specified by the third user input in some instances. With reference to FIG. 8B, the user input 814 may be a natural-language speech input including a request for a digital assistant of the electronic device 804, for instance, to replace the word "band" with the word "bend" (e.g., "Replace with bend").

In some examples, the electronic device 804 determines a task based on the third user input. The electronic device 804 may, for instance, determine a task corresponding to a command of the third user input. By way of example, the electronic device 804 may determine one or more candidate intents based on a text representation of the third input (or may determine candidate intents for each of the n-best candidate text representations of the third input), for instance, using the natural language processing module 732. Each of the candidate intents may be associated with an intent confidence score, and the candidate intents may be ranked accordingly. Further, in some examples, a structured query (partial or complete) is generated for each candidate intent.

Thereafter, candidate tasks are determined based on the m-best (e.g., highest ranked) candidate intents, for instance, using the task flow processing module 736. In some examples, the candidate tasks are identified based on the structured query for each of the m-best (e.g., highest ranked) candidate intents. By way of example, as described, the structured queries may be implemented according to one or more task flows, such as task flows 754, to determine tasks associated with the candidate intents. The electronic device 804 can then identify the highest ranking candidate task as the task associated with the command of the third input.

The electronic device 804 modifies the selected word(s) based on the third user input to provide a modified word (or words). If the third user input includes a command, for instance, the electronic device 804 modifies the selected word(s) according to the command. With reference to FIG. 8C, the electronic device replaces the selected word "band" with the word "bend" according to the user input 814 (FIG. 8B), and displays the modified word(s) on the display of the electronic device 804. In examples in which the electronic device 804 determines candidate user intents based on the third user input and selects a task associated with the highest ranking user intent, modifying the selected word(s) includes performing the task associated with the selected user intent.

While description is made herein with respect to the electronic device 804 receiving separate second and third user inputs (e.g., user inputs 812, 814), it will be appreciated that in some examples, the second and third user inputs may be provided to the electronic device 804 as a single user input (e.g., "Replace band with bend"). The combined user input may both indicate a selection of a word of the first user input (e.g., "band") and specify a command for modifying and/or replacing the selected word (e.g., "replace with bend"). Thus, in some examples, the electronic device 804 may be configured to semantically parse user inputs to identify portions of user inputs indicating a selection a word and portions of user inputs specifying a manner in which selected words are to be modified or replaced.

The operations described above with reference to FIG. 8 are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 804. It would be clear to a person having ordinary skill in the art how other processes are implemented based on the components depicted in FIGS. 1-4, 6A-6B, and 7A-7C.

Figure 10A:
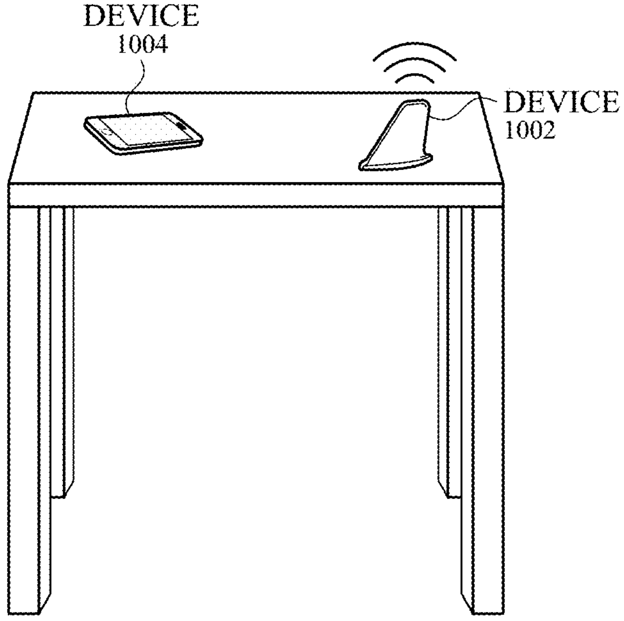
FIG. 10A illustrates various electronic devices of an environment, according to various examples.
Figure 10B:
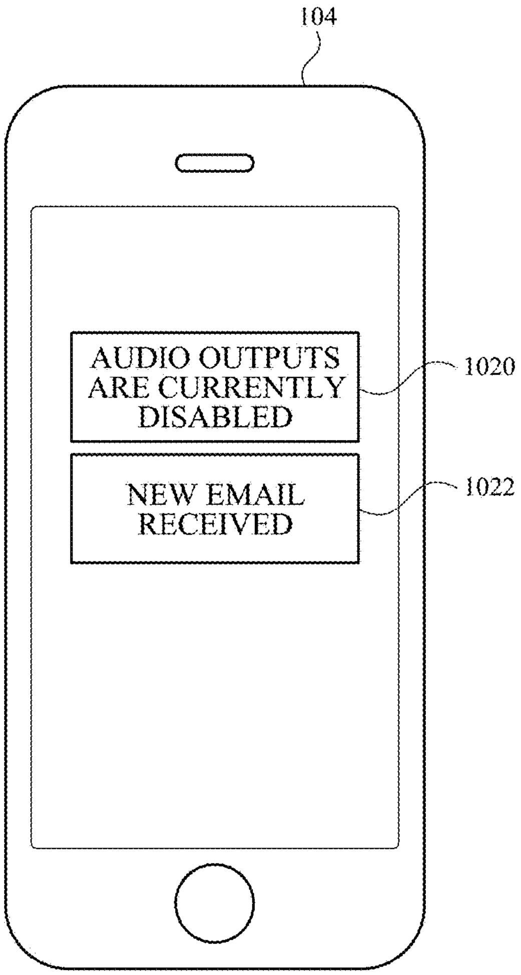
FIGS. 10B-C illustrate exemplary user interfaces of an electronic device, according to various examples.
Figure 10C:
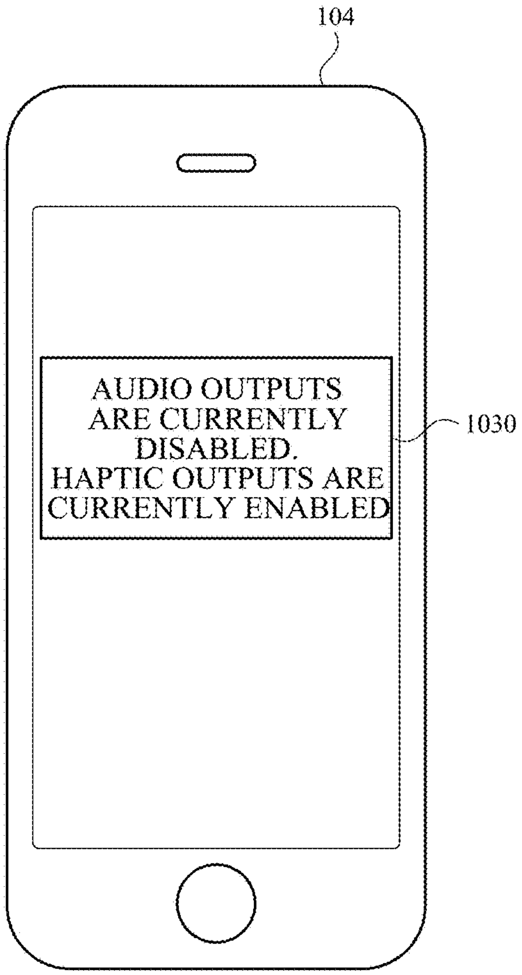

FIGS. 10A-C illustrates various electronic devices of an environment and exemplary user interfaces of the electronic devices, according to various examples. These figures are also used to illustrate one or more of the processes described below, including the process 1400 of FIG. 14.

FIG. 10A illustrates electronic devices 1002, 1004, 1006 of an environment. Each of the devices 1002-1006 may be any device described herein, including but not limited to devices 104, 200, 400, and 600 (FIGS. 1, 2A, 4, and 6A-6B). Accordingly, each device may be a device of any type, such as a phone, laptop computer, desktop computer, tablet, wearable device (e.g., smart watch), set-top box, television, or any combination or subcombination thereof. In the illustrated example, the electronic device 1002 is an electronic device configured to provide a signal (e.g., wireless signal) to one or more electronic devices of the environment, such as the electronic device 1004. The electronic device 1004 is a mobile device in some examples, as depicted. While the illustrated example is described herein with reference to electronic devices 1002 and 1004, it will be appreciated that a fewer or greater number of devices may be used in other implementations. Further, while operation of an electronic device is described with reference to electronic device 1004, it will be appreciated that such operation could be implemented using any electronic device(s) described herein.

In operation, the electronic device 1004 receives context information of (e.g., associated with) the electronic device 1004. Context information of the electronic device 1004 includes information indicative of an environment of the electronic device 1004 in some examples. By way of example, context information may include information describing the acoustic environment of the electronic device 1004. The context information may indicate noise intensity (e.g., volume) of the environment and/or one or more types of noise of the environment. As another example, context information may include information describing visual aspects of the environment of the electronic device 1004. The context information may indicate light intensity of the environment and/or type of light (e.g., infrared) of the environment. As yet another example, context information may include information describing haptic aspects of the environment of the electronic device 1004. The context information may indicate whether the electronic device is moving (e.g., in a car), stationary (e.g., on a table as illustrated in FIG. 10A), held by a user, resting on a surface, or any combination thereof. As yet another example, the context information may include information describing a location of the electronic device 1004. The context may indicate, for instance, whether the electronic device is 1004 at a home or office of the user, at a theater, concert, airport, etc.

Context information of the electronic device 1004 includes information stored on the electronic device and/or indicative of a state of the electronic device 1004 in some examples. By way of example, the context information may include a calendar stored on the electronic device 1004. The electronic device 1004 may determine a location of the electronic device 1004 based on the calendar in some examples. As another example, context information may include information indicating whether one or switches (e.g., physical switches) of the electronic device are in a particular position. As yet another example, context information may include information indicating which output types of the electronic device 1004 are enabled. Output types include but are not limited to, auditory outputs, visual outputs, haptic outputs, and/or electronic outputs (e.g., providing a signal to, or otherwise communicating with, another device).

In some examples, context information may indicate whether the electronic device 1004 has received, or is currently receiving, one or more signals, such as a signal provided by another electronic device (e.g., electronic device 1002). The signal may, for instance, indicate one or more output types, a location of the electronic device 1002 (e.g., theater), one or more device types, or any combination thereof. Output types indicated by the signal may indicate those output types that are to be enabled in response to the signal and/or output types that are to be disabled in response to the signal, as described in further detail below.

In some examples, the electronic device 1004 determines context information of the electronic device 1004, for instance, using one or more sensors or components (e.g., camera, GPS unit) of the electronic device 1004. In other examples, the electronic device receives context information of the electronic device 1004 from one or more other electronic devices.

After receiving context information, the electronic device 1004 determines, based on the context information, whether one or more criteria for disabling an output type are met. In some examples, the electronic device 1004 determines whether the electronic device 1004 is located in one or more predetermined locations. The electronic device 1004 may, for instance, determine that criteria for disabling auditory outputs are met if the electronic device 1004 is determined to be in a location where auditory notifications are discouraged (e.g., theater or library). Additionally or alternatively, the electronic device may determine that criteria for disabling visual and auditory outputs are met if a user of the electronic device 1004 is scheduled to be in a meeting (e.g., determined based on calendar on device and/or location of device). In other examples, the electronic device 1004 determines whether a switch of the electronic device 1004 is in a particular position. The electronic device 1004 may, for instance, determine criteria for disabling auditory outputs are met if a switch of the electronic device 1004 is in a particular position. In yet other examples, the electronic device 1004 determines whether the electronic device 1004 is operating during a predetermined time or on a predetermined day (e.g., day of week, day of month, holiday). The electronic device 1004 may, for instance, determine criteria for disabling visual outputs are met if a current time is during a user's designated sleeping hours (e.g., 3:00 a.m.).

In some examples, the electronic device 1004 determines whether a particular signal is being (or has been) provided to the electronic device 1004 by another electronic device, such as the electronic device 1002. As described, the signal may identify one or more output types. For each of the identified output types, the electronic device 1004 may determine that criteria are met. In some examples, the signal does not specify output types. Rather, the electronic device 1004 may determine that criteria are met for one or more predetermined output types in response to the signal. As an example, the electronic device 1004 may be located in a concert hall and receive a signal from another electronic device, such as the electronic device 1002. Responsive to the signal, the electronic device 1004 may determine that criteria for disabling auditory outputs are met. The signal may further specify one or more device types (e.g., mobile device, speaker). Accordingly, criteria may be met only if a specified device type matches that of the electronic device 1004 in some examples.

In some examples, determining whether criteria for disabling an output type are met includes determining whether one or more thresholds are exceeded. Thresholds applied in this manner may include, but are not limited to, noise intensity thresholds, light intensity thresholds, haptic thresholds, or any combination thereof. As an example, if the environment of the electronic device 1004 has light intensity below a threshold light intensity, the electronic device may determine that criteria for disabling an output type, such as auditory outputs, are met.

If the electronic device 1004 determines that criteria for disabling an output type are met, the electronic device 1004 disables the output type. As described, output types may include visual outputs, auditory outputs, and/or haptic outputs. Accordingly, in response to determining that criteria for disabling an output type are met, the electronic device 1004 can disable visual outputs, auditory outputs, and/or haptic outputs of the electronic device 1004. It will be appreciated that such output types are intended to be exemplary and the electronic device 1004 may disable any type of output in this manner.

With reference to FIG. 10B, in some examples, the electronic device 1004 provides an output (e.g., output 1020) indicating that one or more output types have been disabled. The output is provided using a different output type than the one or more disabled output types in some examples (e.g., the electronic device may indicate that auditory outputs are disabled using a visual output). With reference to FIG. 10C, in some examples, the electronic device further provides an output identifying one or more enabled output types (e.g., output 1030).

In some examples, one or more output types may be disabled (e.g., manually disabled) by a user. The user can disable an output type by selecting an affordance provided by the electronic device 1004, toggling a switch of the electronic device 1004, and/or providing a request to a digital assistant of the electronic device 1004 to disable one or more specified output types (e.g., "Hey Siri, disable audio and vibration"). In some examples, a user may specify conditions for disabling the output types. The user may, for instance, specify a duration for which one or more output types are to be disabled (e.g., "Hey Siri, no interruptions for an hour"), or may specify a location at which one or more output types are to be disabled ("Hey Siri, no sound while I'm at school"). The electronic device 1004 may determine whether the electronic device 1004 is at the specified location, for instance, based on a physical location of the electronic device 1004 (e.g., GPS location indicates the electronic device 1004 is at a school of the user) or by referencing a calendar of a user of the electronic device 1004 (e.g., calendar of the user indicates the user is currently attending a class).

Once an output type has been disabled, the electronic device 1004 thereafter provides outputs according to the disabled outputs. By way of example, the electronic device may receive an input (e.g., natural-language speech input) from a user, determine a response to the input, and identify an output type associated with the response. If the output type associated with the response is enabled, the electronic device 1004 provides the output. If the output type associated with the response is disabled, the electronic device 1004 forgoes providing the output.

In some examples, the electronic device 1004 may provide an indication (e.g., using an enabled output type) that a response could not be provided. As an example, the electronic device 1004 may determine that because auditory output types are disabled, a natural-language speech output cannot be provided to a user in response to an input. Accordingly, the electronic device 1004 can instead provide a haptic output or visual output to indicate to a user that the auditory output was not provided.

In some examples, if the electronic device 1004 determines that an output type associated with a response is disabled, the electronic device 1004 identifies an alternative output type associated with the response and provides the response using the alternative output type. In this manner, the electronic device 1004 may provide a response to an input despite one or more output types being disabled. With reference to FIG. 10B, in some examples, the electronic device 1004 may be configured to provide an auditory output in response to receipt of an email when all output types are enabled. If auditory outputs are disabled (as indicated by output 1020), however, the electronic device 1004 may instead provide a visual output indicating that an email has been received (e.g., output 1022). As another example, in some instances, an auditory output may be a natural-language speech output. If auditory output types are disabled, the electronic device 1004 may instead provide the natural-language output as a natural-language text output on a display of the electronic device 1004.

The operations described above with reference to FIG. 8A-8C are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 1004. It would be clear to a person having ordinary skill in the art how other processes are implemented based on the components depicted in FIGS. 1-4, 6A-6B, and 7A-7C.

Figure 11A:
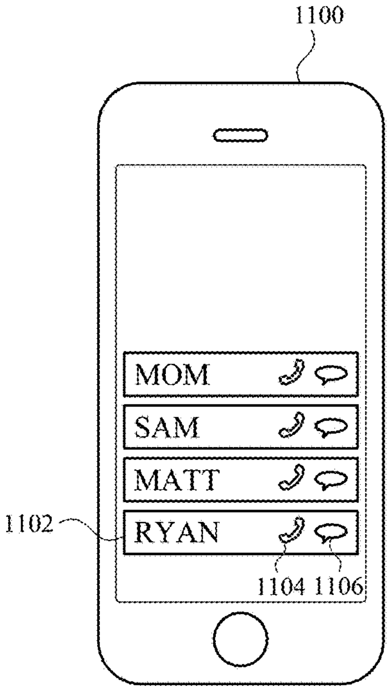
FIGS. 11A-11C provide illustrations of multi-modal interaction with an electronic device, according to various examples.
Figure 11B:
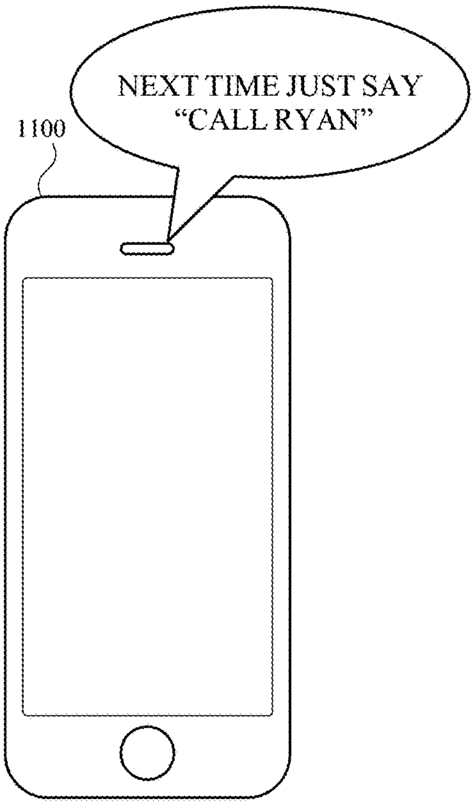
Figure 11C:
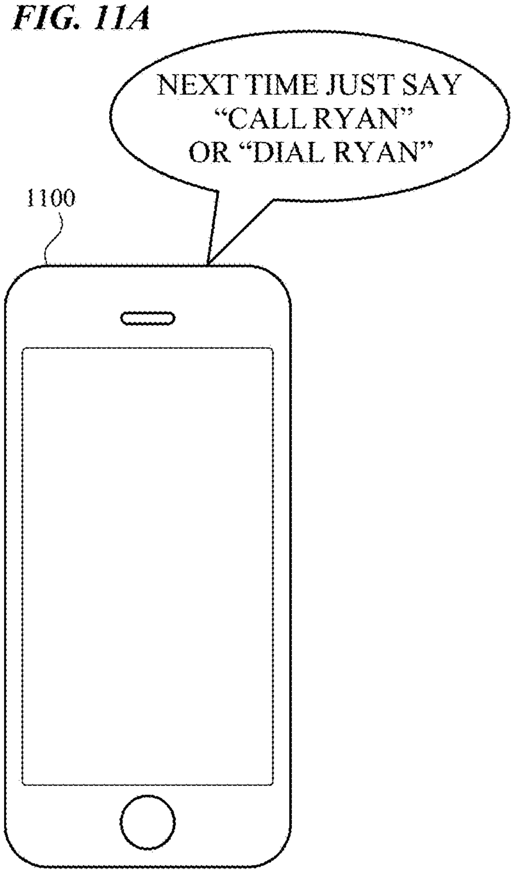

FIGS. 11A-11C illustrate exemplary techniques for providing multi-modal interfaces in accordance with some embodiments. These figures are also used to illustrate one or more of the processes described below, including the process 1500 of FIG. 15.

FIG. 11A shows an electronic device 1100. The electronic device 1100 may be any device described herein, including but not limited to devices 104, 200, 400, and 600 (FIGS. 1, 2A, 4, and 6A-6B). In the illustrated example, the electronic device 1100 is an electronic device having a touch-sensitive display, though it will be appreciated that the electronic device may be a device of any type, such as a phone, laptop computer, desktop computer, tablet, wearable device (e.g., smart watch), set-top box, television, or any combination or subcombination thereof.

In operation, the electronic device 1100 receives a user input from a user of the electronic device 1100. The user input may be a user input of any type. In some examples, the user input is a touch input, for instance, received using a touch-sensitive display of the electronic device 1100. In other examples, the user input is an auditory input (e.g., natural-language speech input). In yet other examples, the user input is a haptic (e.g., vibrational) input, or button press. With reference to FIG. 11A, the user input may be a touch input indicating a selection of an affordance provided (e.g., displayed) on the touch-sensitive display of the electronic device 1100. The user input may be selection of the affordance 1104 or the affordance 1106. In some examples, the user input is indicative of a task. Selection of the affordance 1104 may indicate a task for initiating a telephone call with a contact 1102 (i.e., "Ryan"), and selection of the affordance 1106 may indicate a task for initiating a messaging session with the contact 1102.

In response to the user input, the electronic device 1100 performs the task indicated by the user input. As described, in response to a user input selecting the affordance 1104, the electronic device 1100 initiates a telephone call with the contact 1102, and in response to selection of the affordance 1106, the electronic device 110 initiates a messaging session with the contact 1102.

After performing the task, the electronic device 1100 determines whether the task can be performed in response to a second, alternative user input different than the user input provided to the electronic device 1100. In some examples, the electronic device 1100 determines whether the task can be performed in response to an alternative user input having a same input type as the user input. Each of the user input and the alternative user input may be touch inputs, for instance. In other examples, the electronic device 1100 determines whether the task can be performed in response to an alternative user input having a different input type than the user input. The user input may be a touch input, and the alternative user input may be a speech input (e.g., natural-language speech input), for instance. In the illustrated example, the electronic device 1100 can determine whether the electronic device 1100 can initiate a phone call for the contact 1102 in response to an alternative touch input (e.g., selection of a different affordance) and/or a natural-language speech input ("Call Ryan"). In some examples, the electronic device 1100 determines the alternative user input a predetermined amount of time after performing the task.

In some examples, the electronic device 1100 selectively determines whether the task can be performed in response to an alternative user input. In at least one example, the electronic device 1100 determines a number of times that the task indicated by the user input has been performed. If the task indicated by the user input has been performed a number of times satisfying a predetermined threshold, the electronic device 1100 determines whether the task can be performed in response to an alternative user input. If the task indicated by the user input has not been performed a number of times satisfying the threshold, the electronic device 1100 forgoes determining whether the task can be performed in response to an alternative user input. In some examples, the electronic device 1100 determines a number of times that the task indicated by the user input has been performed in response to the user input. By way of example, the electronic device 1100 can determine the number of times a task has been performed in response to selection of a same affordance. The electronic device 1100 may then determine whether the determined number satisfies a threshold, as described, to selectively determine whether the task can be performed in response to an alternative user input.

If the electronic device 1100 determines that the task can be performed in response to an alternative user input different than the user input, the electronic device 1100 provides (e.g., outputs) the alternative user input to the user. In examples in which the alternative user input is a touch input, the electronic device 1100 may highlight one or more portions (e.g., affordances) of the touch-sensitive display of the electronic device 1100 to indicate to a user where on the touch-sensitive display to provide the alternative input to perform the task. The electronic device 1100 may further indicate to the user, using a natural-language output, that an alternative touch input is available ("Next time you can press here to make a call").

With reference to FIG. 11B, in examples in which the alternative user input is a natural-language speech input (e.g., "Call Ryan"), the electronic device 1100 can provide the alternative user input by including the alternative user input in a natural-language speech output (e.g., "Next time just say 'Call Ryan'") provided to the user. In some examples, the electronic device 1100 further displays the alternative speech input on a display of the electronic device 1100.

In some examples, the electronic device determines the natural-language speech input based on the task. For instance, the electronic device 1100 can determine one or more actionable intents associated with the task and determine one or more text representations of the natural-language speech input based on the one or more actionable intents. The electronic device 1100 can then select one of the one or more text representations to provide the user as the natural-language speech input. In some examples, each of the actionable intents and/or text representations are associated with a respective score and the electronic device 1100 selects a text representation based on the respective scores.

In some examples, the electronic device 1100 selectively provides the alternative user input to the user. In at least one example, the electronic device 1100 provides an output (e.g., natural-language output) requesting an additional user input, and based on the additional user input, the electronic device 1100 selectively provides the alternative user input to the user. After determining the alternative user input, the electronic device 1100 may, for instance, provide the natural-language output "There is a quicker way to do that next time. Would you like to know how?" In response, the user may indicate whether he or she would like to receive an output indicating the alternative user input. If the user answers affirmatively, the electronic device 1100 provides the alternative user input to the user. If the user answers negatively, the electronic device 1100 forgoes providing the alternative user input to the user.

In some examples, the electronic device 1100 determines and/or provides multiple alternative user inputs to the user. The electronic device 1100 may, for instance, determine multiple natural-language speech inputs that may be used to perform a task and present each of the multiple natural-language speech inputs to the user. With reference to FIG. 11C, the electronic device can indicate to a user that either of the natural-language speech inputs "Call Ryan" or "Dial Ryan" may be used to perform the task of initiating a telephone call for the contact 1102. In some examples, the electronic device 110 determines and/or provides alternative user inputs of different input types. The electronic device can, for instance, indicate that the natural-language speech input "Call Ryan" or a particular affordance may be used to perform a task.

In some examples, alternative user inputs are provided to the user based on user preferences and/or previous usage of the electronic device. In some examples, alternative user inputs provided by the electronic device are a same user input type as user inputs primarily used to perform the task using the electronic device 1100. If the user primarily performs the task using natural-language speech inputs, the electronic device 1100 may provide alternative user inputs that are natural-language speech inputs. In other examples, alternative user inputs provided by the electronic device are different user input types than user inputs typically used to operate the electronic device 1100. If the user primarily performs the task using natural-language speech inputs, the electronic device 1100 may provide alternative user inputs that are touch inputs.

While reference is made herein with respect to the electronic device 1100 determining and/or providing alternative user inputs after performing a task, it will be appreciated that the electronic device 1100 may determine and/or provide alternative user inputs prior to performing a task and/or concurrently while performing the task.

The operations described above with reference to FIG. 8A-8C are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 1100. It would be clear to a person having ordinary skill in the art how other processes are implemented based on the components depicted in FIGS. 1-4, 6A-6B, and 7A-7C.

Figure 12A:
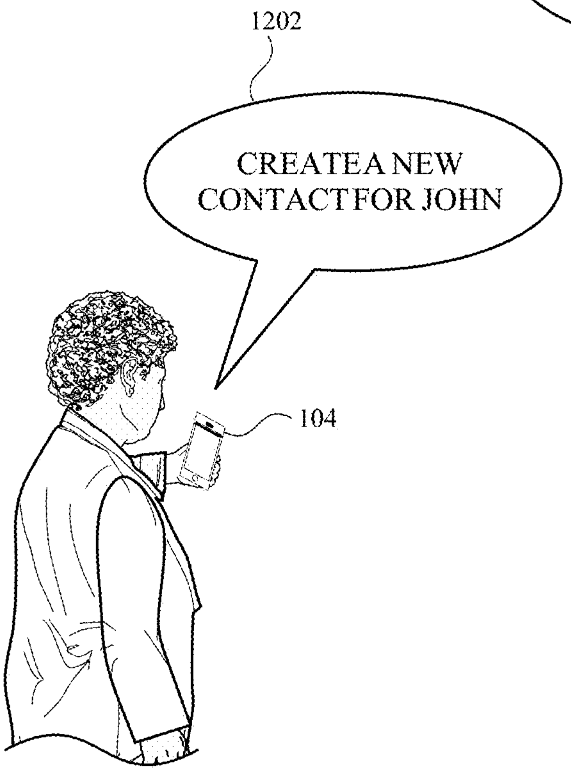
FIGS. 12A-12B provide illustrations of multi-modal interaction with an electronic device, according to various examples.
Figure 12B:
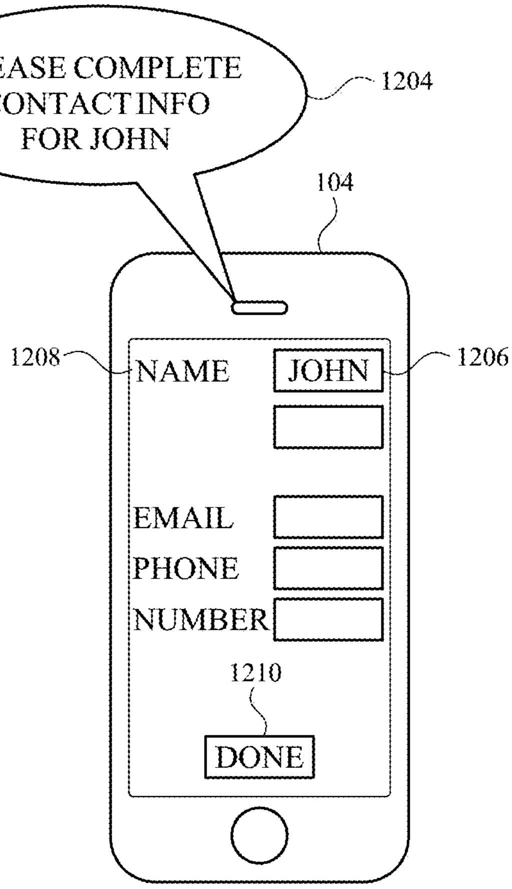

FIGS. 12A-12B illustrate exemplary techniques for providing multi-modal interfaces in accordance with some embodiments. These figures are also used to illustrate one or more of the processes described below, including the process 1600 of FIG. 16.

FIG. 12A shows an electronic device 1200. The electronic device 1200 may be any device described herein, including but not limited to devices 104, 200, 400, and 600 (FIGS. 1, 2A, 4, and 6A-6B). In the illustrated example, the electronic device 1200 is an electronic device having a touch-sensitive display, though it will be appreciated that the electronic device may be a device of any type, such as a phone, laptop computer, desktop computer, tablet, wearable device (e.g., smart watch), set-top box, television, or any combination or subcombination thereof.

In operation, the electronic device 1200 receives a first user input from a user of the electronic device 1200. The first user input may be a user input of any type. In some examples, the first user input is a speech input (e.g., natural-language speech input). With reference to FIG. 12A, the first user input 1202 may be a speech input indicative of a request to a digital assistant of the electronic device 1200, for instance, to create a new contact with a specified name (e.g., "Create a new contact for John"). In other examples, the first user input is a touch input received using a touch-sensitive display of the electronic device 1200. In yet other examples, the first user input is a haptic (e.g., vibrational) input, or button press.

In examples in which the first user input is a natural-language speech input, the electronic device 1200 processes the first user input 1202 to provide one or more candidate text representations (e.g., text strings) of the natural-language speech input, for instance, using the STT processing module 730. As described, each of the candidate text representations may be associated with a speech recognition confidence score, and the candidate text representations may be ranked accordingly. In other examples, the first user input is a textual input (e.g., inputted via a touchpad of the electronic device 800) and is provided as a candidate text representation, where n=1. Textual inputs provided as candidate text representations in this manner may be assigned a maximum speech recognition confidence score, or any other speech recognition confidence score. With reference to FIG. 12A, the digital assistant provides one or more candidate text representations including a text string "Create a new contact for John".

In some examples, the electronic device 1200 provides one or more candidate intents based on the n-best (e.g., highest ranked) candidate text representations, for instance, using the natural language processing module 732. Each of the candidate intents may be associated with an intent confidence score, and the candidate intents may be ranked accordingly. In some examples, multiple candidate intents are identified for each candidate text representation. Further, in some examples, a structured query (partial or complete) is generated for each candidate intent. With reference to FIG. 12A, the digital assistant of electronic device 1200 provides a candidate intent of "create contact" based on the candidate text representation "Create a new contact for John". Further, the digital assistant of the electronic device determines a structured query {create contact, name=John}.

Thereafter, candidate tasks are determined based on the m-best (e.g., highest ranked) candidate intents, for instance, using the task flow processing module 736. In some examples, the candidate tasks are identified based on the structured query for each of the m-best (e.g., highest ranked) candidate intents. By way of example, as described, the structured queries may be implemented according to one or more task flows, such as task flows 754, to determine tasks associated with the candidate intents.

In some examples, the electronic device 1200 determines whether additional input is required to perform the task. By way of example, the electronic device 1200 can determine whether a parameter needs to be confirmed, for instance, by a user of the electronic device 1200. The electronic device 1200 can determine that user input confirming or correcting spelling of a word is required to perform the task. In the illustrated example, the electronic device 1200 may determine that the spelling of the name "John" is required to be confirmed prior to generating the requested contact. In another example, the electronic device 1200 can determine whether additional parameters are required to perform the task. With reference to FIG. 12B, the electronic device 1200 may determine that additional information (e.g., surname, contact information) pertaining to the contact John is required prior to generating the requested contact.

In some examples, the electronic device determines whether additional input is required to perform the task based on context information of the electronic device. By way of example, the electronic device 1200 may require additional input based on an environment of the electronic device 1200. If the electronic device 1200 is in a loud environment, for instance, the electronic device 1200 may require confirmation of speech recognition prior to performing a task (e.g., saving text in a note). As another example, the electronic device 1200 may require additional input based on information stored in the electronic device. With reference to FIGS. 12A-12B, if a user requests that a contact be generated for a person named John, the electronic device 1200 may require entry of a surname if one or more existing contacts stored on the electronic device 1200 have a first name of John.

In some examples, the electronic device 1200 identifies a type of the task and determines whether additional input is required to perform the task based on the type of the task. Certain tasks, for instance, may require touch input confirmation prior to the task being performed. As an example, if the task is a task to send a message to another user, the electronic device 1200 may determine that confirmation of the message contents (e.g., by touch input) is required before the message may be sent message (e.g., the user confirms the message is correct).

In some examples, the electronic device 1200 determines whether additional input is required to perform a task by determining whether one or more structured queries are complete such that a task associated with each structured query may be successfully performed.

If the electronic device 1200 determines that additional input is required to perform a task, the electronic device 1200 requests a second user input. In some examples, the first user input and the second user input are user inputs of a same user input type (e.g., speech inputs). In other examples, the first user input and the second user input are user inputs of different types. The first user input is a speech input and the second user input is a touch input in some examples.

In some examples, requesting the additional user input includes requesting the second user input from a user of the electronic device 1200. Requesting the second user input includes prompting a user to provide the user input in some examples. As an example, with reference to FIG. 12B, the electronic device 1200 can provide an output (e.g., natural-language output) requesting that the user provide the second user input (e.g., "Please Complete Contact Info for John"). As another example, the electronic device 1200 can provide (e.g., display) one or more text entry fields and/or affordances by which the user can provide the additional user input.

In some examples, the electronic device 1200 identifies a data type associated with the task and/or the additional user input required to perform the task, determines an input type associated with the data type, and requests a user input of the determined input type. In this manner, the electronic device 1200 may request user input of an input type determined to be best for providing the requested user input. By way of example, the electronic device 1200 may determine that contact information (e.g., phone number) is required prior to generating a contact, and further determine that the contact information is best provided by way of touch input. The electronic device 1200 may thereafter provide a natural-language output requesting that a user provide the contact information by way of touch input (e.g., "Please use the displayed keypad to enter a phone number for the contact John in the highlighted field").

The electronic device 1200 thereafter receives the requested user input (e.g., second user input) from the user of the electronic device 1200.

In some examples, the electronic device 1200 determines that multiple user inputs are required before a task may be performed. Accordingly, the electronic device 1200 can request any number of user inputs such that the electronic device 1200 receives the additional input required to perform the task.

Once the additional input (e.g., second user input) has been received, the electronic device 1200 performs the task based, at least in part, on the additional input. By way of example, based on a structured query, a task flow processing module of the electronic device 1200 (e.g., task flow processing module 736) invokes programs, methods, services, APIs, or the like, to perform the task. In examples in which the electronic device requests multiple additional inputs, the electronic device 1200 performs the task based, at least in part, on each of the multiple additional inputs.

The operations described above with reference to FIGS. 8A-8C are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 1200. It would be clear to a person having ordinary skill in the art how other processes are implemented based on the components depicted in FIGS. 1-4, 6A-6B, and 7A-7C.

5. Processes for Providing Multi-Modal Interfaces

Figure 13:
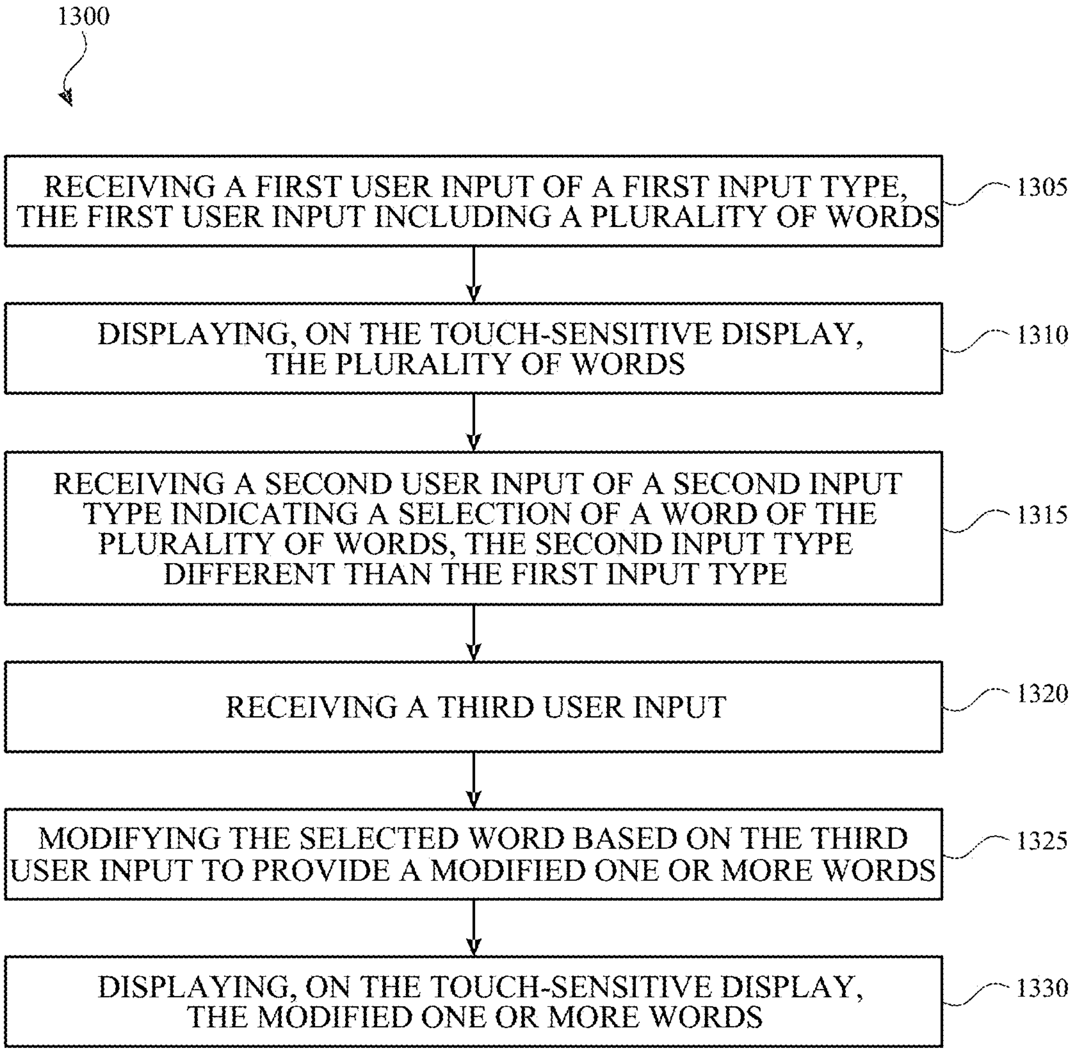
FIG. 13 illustrates a process for multi-modal interaction with an electronic device, according to various examples.

FIG. 13 illustrates a process 1300 for multi-modal interaction with an electronic device, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

At block 1305, the electronic device receives a first user input of a first input type. The first user input includes a plurality of words. In some examples, the first user input includes a first command. In some examples, the first user input includes a second command. In some examples, the first command is a command to modify capitalization of the selected word. In some examples, the first command is a command to modify spelling of the selected word. In some examples, the first command is a command to modify textual effects of the selected word.

At block 1310, the electronic device displays the plurality of words on a touch-sensitive display of the electronic device.

At block 1315, the electronic device receives a second user input of a second input type indicating a selection of a word of the plurality of words. The second input type is different than the first input type in some examples. In some examples, the second user input is associated with a direction of a user's gaze.

In some examples, the electronic device determines whether the selected word requires disambiguation. In accordance with a determination that the selected word requires disambiguation, the electronic device determines a plurality of candidate words and provides the plurality of candidate words.

At block 1320, the electronic device receives a third user input. In some examples, the first user input of the first input type is a typed input and the third user input is a speech input. In some examples, the third user input includes a replacement word. In some examples, the third user input includes a reference to a word of the plurality of words. In some examples, receiving a third user input includes receiving a selection of a candidate word of the plurality of candidate words.

In some examples, the electronic device determines a user intent based on the first input and determines a task associated with the user intent.

At block 1325, the electronic device modifies the selected word based on the third user input. In some examples, modifying the selected word based on the third user input to provide a modified one or more words includes modifying the one or more words based on the first command. In some examples, modifying the selected word based on the third user input to provide a modified one or more words includes performing the task. In some examples, modifying the selected word based on the third user input to provide a modified one or more words includes replacing the selected word with the replacement word. In some examples, modifying the selected word based on the third user input to provide a modified one or more words includes replacing the selected word with the selected candidate word.

At block 1330, the electronic device displays the modified one or more words on the touch-sensitive display. In some examples, displaying the modified one or more words includes determining a confidence score for each of the plurality of words and displaying the plurality of words based on the confidence score of each word of the plurality of words. In some examples, determining a confidence score includes determining a speech-to-text score, determining a natural-language score, and determining a confidence score based on the speech-to-text score and the natural-language score. In some examples, determining a confidence score for each of the plurality of words includes determining a confidence score each word of the plurality of words. In some examples, displaying the modified one or more words includes displaying the plurality of words using a word processing application, a messaging application, an email application, or any combination thereof.

Figure 14:
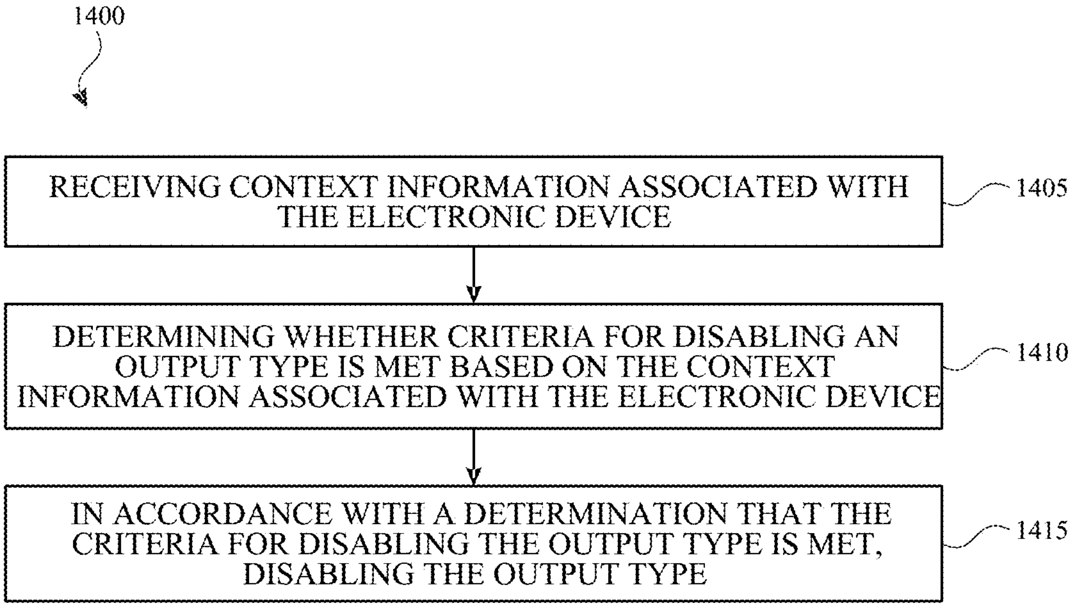
FIG. 14 illustrates a process for selectively disabling an output of an electronic device, according to various examples.

FIG. 14 illustrates a process 1400 for selectively disabling an output of an electronic device, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

At block 1405, the electronic device receives context information associated with the electronic device. In some examples, the context information is based on an environment of the electronic device. In some examples, receiving context information includes determining whether the electronic device is receiving a signal of a predetermined type. In some examples, the signal of the predetermined type is indicative of an output type.

At block 1410, the electronic device determines whether criteria for disabling an output type are met based on the context information associated with the electronic device.

At block 1415, in accordance with a determination that the criteria for disabling the output type are met, the electronic device disables the output type. In some examples, in accordance with a determination that the criteria for disabling the output type are met, the electronic device further provides a first output indicating that the output type is disabled. In some examples, providing the first output includes providing the first output using a second output typed different than the output type. In some examples, providing the first output indicating that the output type is disabled includes providing an output identifying one or more enabled output types.

In some examples, the electronic device receives a user input and disables one or more output types responsive to the user input.

In some examples, the electronic device receives an input and identifies an output type for providing a second output associated with the input. The electronic device determines if the identified output type is disabled. In accordance with a determination that the output type is disabled, the electronic device forgoes providing the second output. In accordance with a determination that the output type is not disabled, the electronic device provides the second output.

In some examples, in accordance with a determination that the output type is disabled, the electronic device provides a third output indicating that the second output was not provided.

In some examples, in accordance with a determination that the output type is disabled, the electronic device identifies an output type for providing a fourth output associated with the input and provides the fourth output.

Figure 15:
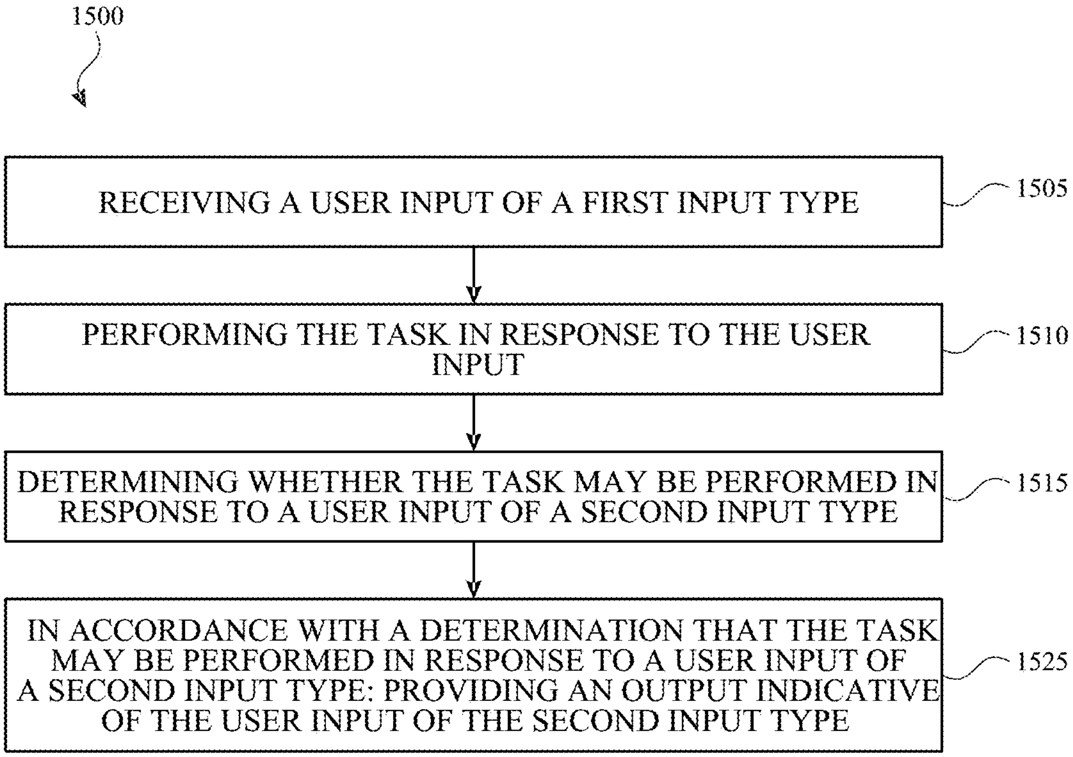
FIG. 15 illustrates a process for multi-modal interaction with an electronic device, according to various examples.

FIG. 15 illustrates a process 1500 for multi-modal interaction with an electronic device, according to various examples. In some examples, process 1500 is performed using a client-server system (e.g., system 100), and the blocks of process 1500 are divided up in any manner between the server (e.g., DA server 106) and a client device. In other examples, the blocks of process 1500 are divided up between the server and multiple client devices (e.g., a mobile phone and a smart watch). Thus, while portions of process 1500 are described herein as being performed by particular devices of a client-server system, it will be appreciated that process 1500 is not so limited. In other examples, process 1500 is performed using only a client device (e.g., user device 104) or only multiple client devices. In process 1500, some blocks are, optionally, combined, the order of some blocks is, optionally, changed, and some blocks are, optionally, omitted. In some examples, additional steps may be performed in combination with the process 1500.

At block 1505, the electronic device receives a user input of a first input type. The user input is indicative of a task in some examples.

At block 1510, the electronic device performs the task in response to the user input of the first input type. In some examples, the user input of the first input type is a touch input.

At block 1515, the electronic device determines whether the task may be performed in response to a user input of a second input type. In some examples, the user input of the second input type is a natural-language input. In some examples, determining whether the task may be performed in response to a user input of a second input type includes determining a number of times the task has been performed in response to the user input, determining whether the number of times the task has been performed in response to the user input satisfies a threshold, and in accordance with a determination that the number of times the task has been performed in response to the user input exceeds the threshold, determining whether the task may be performed in response to a user input of a second input type.

At block 1520, in accordance with a determination that the task may be performed in response to a user input of the second type, the electronic device provides an output indicative of the user input of the second input type. In some examples, the output is a natural-language output. In some examples, providing an output indicative of the user input of the second input type includes providing the output indicative of the user input of the second input type a predetermined amount of time after performing the task. In some examples, provides an output indicative of the user input of the second input type includes providing a second natural-language output, receiving a second user input requesting the output, and responsive to the second user input, providing the output.

In some examples, the electronic device determines whether the task may be performed in response to a second user input of the second input type. In accordance with a determination that the task may be performed in response to the second user input of the second input type, the electronic device provides output indicative of the second user input of the second input type.

Figure 16:
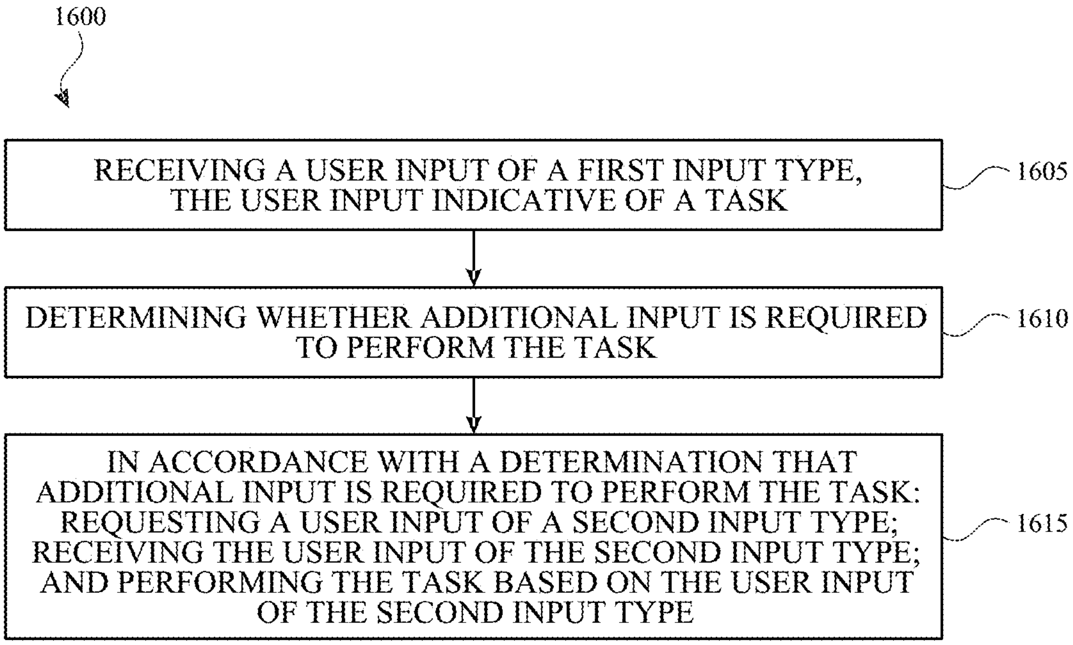
FIG. 16 illustrates a process for multi-modal interaction with an electronic device, according to various examples.

FIG. 16 illustrates a process 1600 for multi-modal interaction with an electronic device, according to various examples. Process 1600 is performed, for example, using one or more electronic devices implementing a digital assistant. In some examples, process 1600 is performed using a client-server system (e.g., system 100), and the blocks of process 1600 are divided up in any manner between the server (e.g., DA server 106) and a client device. In other examples, the blocks of process 1600 are divided up between the server and multiple client devices (e.g., a mobile phone and a smart watch). Thus, while portions of process 1600 are described herein as being performed by particular devices of a client-server system, it will be appreciated that process 1600 is not so limited. In other examples, process 1600 is performed using only a client device (e.g., user device 104) or only multiple client devices. In process 1600, some blocks are, optionally, combined, the order of some blocks is, optionally, changed, and some blocks are, optionally, omitted. In some examples, additional steps may be performed in combination with the process 1600.

At block 1605, the electronic device receives a user input of a first input type. The user input is indicative of a task in some examples.

At block 1610, the electronic device determines whether additional input is required to perform the task. In some examples, determining whether additional input is required to perform the task includes determining, based on context of the electronic device, whether additional input is required to perform the task. In some examples, determining whether additional input is required to perform the task includes identifying a type of the task.

At block 1615, in accordance with a determination that additional input is required to perform the task, the electronic device requests a user input of a second input type, receives the user input of the second input type, and performs the task based on the user input of the second input type. In some examples, requesting a user input of a second input type includes prompting a user to enter the user input of the second input type. In some examples, requesting a user input of a second input type includes identifying a data type associated with the task, determining an input type associated with the data type, and requesting a user input of the determined input type.

In some examples, the electronic device requests a user input of a third input type, receives the user input of the third input type, and performs the task based on the user input of the third input type.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
- one or more processors;
- a memory; and
- one or more programs, wherein the one or more programs are stored in the memory and configured to be executed by the one or more processors, the one or more programs including instructions for:
  - receiving a user input of a first input type, the user input indicative of a task;
  - performing the task in response to the user input;
  - determining whether the task may be performed in response to a user input of a second input type;
  - in accordance with a determination that the task may be performed in response to a user input of a second input type:
    - providing an output indicative of the user input of the second input type; and
  - in accordance with a determination that the second input type includes a touch input type, highlighting one or more portions of a display of the electronic device to indicate to a user where on the display to provide the user input of the second input type.

2. The electronic device of claim 1, wherein the user input of the first user input type is a touch input.

3. The electronic device of claim 1, wherein the one or more programs further include instructions for:
- determining whether the task may be performed in response to a second user input of the second input type; and
- in accordance with a determination that the task may be performed in response to the second user input of the second input type:
  - providing an output indicative of the second user input of the second input type.

4. The electronic device of claim 1, wherein determining whether the task may be performed in response to a user input of a second input type comprises:
- determining a number of times the task has been performed in response to the user input;
- determining whether the number of times the task has been performed in response to the user input satisfies a threshold; and
- in accordance with a determination that the number of times the task has been performed in response to the user input exceeds the threshold, determining whether the task may be performed in response to a user input of a second input type.

5. The electronic device of claim 1, wherein the output is a first natural-language output.

6. The electronic device of claim 1, wherein the user input of the second input type is a natural-language input.

7. The electronic device of claim 1, wherein providing an output indicative of the user input of the second input type comprises, providing the output indicative of the user input of the second input type a predetermined amount of time after performing the task.

8. The electronic device of claim 1, wherein providing an output indicative of the user input of the second input type comprises:
- providing a second natural-language output;
- receiving a second user input requesting the output; and
- responsive to the second user input, providing the output.

9. A method, comprising:
- at an electronic device having one or more processors:
  - receiving a user input of a first input type, the user input indicative of a task;
  - performing the task in response to the user input;
  - determining whether the task may be performed in response to a user input of a second input type;
  - in accordance with a determination that the task may be performed in response to a user input of a second input type:
    - providing an output indicative of the user input of the second input type; and
  - in accordance with a determination that the second input type includes a touch input type, highlighting one or more portions of a display of the electronic device to indicate to a user where on the display to provide the user input of the second input type.

10. A non-transitory computer-readable storage medium storing one or more programs, the one or more programs comprising instructions, which when executed by one or more processors of a first electronic device, cause the first electronic device to:
- receive a user input of a first input type, the user input indicative of a task;
- perform the task in response to the user input; determine whether the task may be performed in response to a user input of a second input type; and in accordance with a determination that the task may be performed in response to a user input of a second input type:

provide an output indicative of the user input of the second input type; and in accordance with a determination that the second input type includes a touch input type, highlight one or more portions of a display of the electronic device to indicate to a user where on the display to provide the user input of the second input type.

11. The method of claim 9, wherein the user input of the first user input type is a touch input.

12. The method of claim 9, further comprising:

determining whether the task may be performed in response to a second user input of the second input type; and in accordance with a determination that the task may be performed in response to the second user input of the second input type:

providing an output indicative of the second user input of the second input type.

13. The method of claim 9, wherein determining whether the task may be performed in response to a user input of a second input type comprises:

determining a number of times the task has been performed in response to the user input;

determining whether the number of times the task has been performed in response to the user input satisfies a threshold; and in accordance with a determination that the number of times the task has been performed in response to the user input exceeds the threshold, determining whether the task may be performed in response to a user input of a second input type.

14. The method of claim 9, wherein the output is a first natural-language output.

15. The method of claim 9, wherein the user input of the second input type is a natural-language input.

16. The method of claim 9, wherein providing an output indicative of the user input of the second input type comprises, providing the output indicative of the user input of the second input type a predetermined amount of time after performing the task.

17. The method of claim 9, wherein providing an output indicative of the user input of the second input type comprises:

providing a second natural-language output;

receiving a second user input requesting the output; and responsive to the second user input, providing the output.

18. The non-transitory computer-readable storage medium of claim 10, wherein the user input of the first user input type is a touch input.

19. The non-transitory computer-readable storage medium of claim 10, wherein the one or more programs further comprise instructions, which when executed by the one or more processors of the first electronic device, further cause the first electronic device to:

determine whether the task may be performed in response to a second user input of the second input type; and in accordance with a determination that the task may be performed in response to the second user input of the second input type:

provide an output indicative of the second user input of the second input type.

20. The non-transitory computer-readable storage medium of claim 10, wherein determining whether the task may be performed in response to a user input of a second input type comprises:

determining a number of times the task has been performed in response to the user input;

determining whether the number of times the task has been performed in response to the user input satisfies a threshold; and in accordance with a determination that the number of times the task has been performed in response to the user input exceeds the threshold, determining whether the task may be performed in response to a user input of a second input type.

21. The non-transitory computer-readable storage medium of claim 10, wherein the output is a first natural-language output.

22. The non-transitory computer-readable storage medium of claim 10, wherein the user input of the second input type is a natural-language input.

23. The non-transitory computer-readable storage medium of claim 10, wherein providing an output indicative of the user input of the second input type comprises, providing the output indicative of the user input of the second input type a predetermined amount of time after performing the task.

24. The non-transitory computer-readable storage medium of claim 10, wherein providing an output indicative of the user input of the second input type comprises:

providing a second natural-language output;

receiving a second user input requesting the output; and responsive to the second user input, providing the output.

* * * * *